(12) United States Patent
Kuriyama et al.

(10) Patent No.: US 9,994,772 B2
(45) Date of Patent: Jun. 12, 2018

(54) LIQUID CRYSTAL DISPLAY DEVICE

(71) Applicant: DIC Corporation, Tokyo (JP)

(72) Inventors: Takeshi Kuriyama, Kitaadachi-gun (JP); Jouji Kawamura, Kitaadachi-gun (JP); Mika Yamamoto, Kitaadachi-gun (JP); Yasuhiro Kuwana, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 0 days. days.

(21) Appl. No.: 15/312,724

(22) PCT Filed: Jul. 14, 2015

(86) PCT No.: PCT/JP2015/070123
§ 371 (c)(1),
(2) Date: Nov. 21, 2016

(87) PCT Pub. No.: WO2016/010026
PCT Pub. Date: Jan. 21, 2016

(65) Prior Publication Data
US 2017/0190972 A1 Jul. 6, 2017

(30) Foreign Application Priority Data

Jul. 15, 2014 (JP) .................................. 2014-144990

(51) Int. Cl.
| | | |
|---|---|---|
| G02F 1/1333 | (2006.01) | |
| C09K 19/38 | (2006.01) | |
| C09K 19/30 | (2006.01) | |
| C09K 19/34 | (2006.01) | |
| C09K 19/32 | (2006.01) | |
| G02F 1/13363 | (2006.01) | |
| C09K 19/04 | (2006.01) | |

(52) U.S. Cl.
CPC ...... *C09K 19/3814* (2013.01); *C09K 19/3003* (2013.01); *C09K 19/3066* (2013.01); *C09K 19/322* (2013.01); *C09K 19/3402* (2013.01); *G02F 1/13363* (2013.01); *G02F 1/133365* (2013.01); *C09K 2019/0448* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3422* (2013.01); *G02F 2001/133633* (2013.01); *G02F 2001/133638* (2013.01); *G02F 2413/01* (2013.01); *G02F 2413/02* (2013.01); *G02F 2413/11* (2013.01); *G02F 2413/13* (2013.01)

(58) Field of Classification Search
CPC ............ C09K 19/3814; C09K 19/3066; C09K 19/3003; C09K 19/3402; C09K 19/322; C09K 2019/0466; C09K 2019/3004; C09K 2019/3009; C09K 2019/301; C09K 2019/3016; C09K 2019/3019; C09K 2019/3021; C09K 2019/3422; C09K 2019/0448; G02F 1/1333; G02F 1/13363; G02F 1/133365; G02F 2413/02; G02F 2413/01; G02F 2413/11; G02F 2413/13; G02F 2001/133633; G02F 2001/133638
USPC .......................... 252/299.01, 299.6; 349/182
See application file for complete search history.

(56) References Cited

U.S. PATENT DOCUMENTS 8,736,795 B2 * 5/2014 Okuno ................ G02F 1/13363
252/299.01
2009/0050844 A1 2/2009 Yamazaki et al.

FOREIGN PATENT DOCUMENTS

| CN | 1875083 A | 12/2006 |
|---|---|---|
| CN | 101437924 A | 5/2009 |
| CN | 103562345 A | 2/2014 |
| JP | 2009-098596 A | 5/2009 |
| JP | 2012-078431 A | 4/2012 |
| KR | 10-2008-0094069 A | 10/2008 |
| KR | 10-2014-0021989 A | 2/2014 |
| WO | 2007/094450 A1 | 8/2007 |
| WO | 2011/007669 A1 | 1/2011 |

OTHER PUBLICATIONS

International Search Report dated Oct. 13, 2015, issued for PCT/JP2015/070123.

* cited by examiner

*Primary Examiner* — Geraldina Visconti
(74) *Attorney, Agent, or Firm* — Locke Lord LLP

(57) ABSTRACT

The present invention provides a liquid crystal display device that is free from a reduction in the voltage holding ratio (VHR) of the liquid crystal layer and an increase in ion density (ID) and that enables problems of defective display, such as white spots, uneven alignment, and image-sticking, to be eliminated. In particular, the present invention provides a liquid crystal display device in which a liquid crystal composition containing a liquid crystal compound having a specific structure is used in the liquid crystal layer and in which an optically anisotropic body formed through polymerization of a polymerizable liquid crystal composition containing a specific amount of a polymerizable liquid crystal compound having a specific structure is used as an in-cell retardation layer.

20 Claims, 9 Drawing Sheets

LIQUID CRYSTAL DISPLAY DEVICE

TECHNICAL FIELD

The present invention relates to a liquid crystal display device.

BACKGROUND ART

Liquid crystal display devices have come to be applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest•host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. A typical drive system is static driving; however, multiplex driving has become common, and a passive matrix and, in recent years, an active matrix (AM) in which a TFT (thin film transistor), a TFD (thin film diode), or another device is used for driving have become mainstream.

In general, liquid crystal display devices have a view angle dependency attributed to the birefringence properties of the liquid crystal molecules. In order to address the view angle dependency, an optical film (also referred to as optical compensation film) having different birefringence properties from liquid crystal molecules is used. In a liquid crystal display device in which rod-like liquid crystal molecules having a positive dielectric anisotropy are used, for example, a liquid crystal cell provided with just a polarizing plate has a problem with viewing angle characteristics, in which light leaking from the liquid crystal cell is observed when it is viewed in an oblique direction.

Techniques for addressing such a problem with viewing angle characteristics have been employed; for instance, one biaxial retardation layer is placed between a liquid crystal cell and each of upper and lower polarizing plates, both one uniaxial retardation layer and one completely axial retardation layer are placed on each of the upper and lower sides of a liquid cell, or a uniaxial retardation layer and a completely biaxial retardation layer are disposed on one side of a liquid crystal cell.

A liquid crystal display device of which a retardation layer is disposed outside the liquid crystal cell (out-cell type) has been common; however, in order to enhance productivity by reducing the thickness and weight of a liquid crystal display device and by eliminating an attachment step, a liquid crystal display device of which a retardation layer is disposed inside the liquid crystal cell (in-cell type) has recently come to be developed. Representative known examples of such a technique are, for instance, as follows: disposing a positive A plate inside a liquid crystal cell (see PTL 1), disposing a positive C plate inside a liquid crystal cell (PTL 2), and providing retardation layers of a positive A plate and positive C plate (see PTL 3).

Since the electric properties of a display device are greatly affected by impurities remaining in a liquid crystal material used in a liquid crystal layer, the impurity content has been highly controlled. Furthermore, it is known that an alignment film is directly in contact with a liquid crystal layer and that the electric properties of the liquid crystal layer are affected by the movement of impurities remaining in the alignment film to the liquid crystal layer; hence, the characteristics of the liquid crystal display device that are attributed to impurities remaining in a material used for forming the alignment film has been studied.

In an in-cell liquid crystal display device of which a retardation layer is present inside the cell, a transparent electrode layer and an alignment film are between the liquid crystal layer and the retardation layer, and the direct effect of the retardation layer on the liquid crystal layer has been believed to be greatly smaller than the direct effect of a material used for forming the alignment film. The thickness of the alignment film is, however, generally not more than 0.1 μm, and the thickness of the transparent electrode layer is substantially similar. The liquid crystal layer and the retardation layer are not necessarily completely separated from each other; thus, it is speculated that impurities remaining in the retardation layer in an in-cell type have an effect on the liquid crystal layer as in a material used for forming the alignment film. The retardation layer containing impurities that have passed through the alignment film and the transparent electrode may cause a reduction in the voltage holding ratio (VHR) of the liquid crystal layer and defective display such as generation of white spots due to increased ion density (ID), uneven alignment, and image-sticking. The effects of impurities remaining in the retardation layer on the liquid crystal layer, however, have not been studied.

CITATION LIST

Patent Literature

PTL 1: Japanese Unexamined Patent Application Publication No. 2009-98596
PTL 2: Japanese Unexamined Patent Application Publication No. 2012-78431
PTL 3: WO 11/007669

SUMMARY OF INVENTION

Technical Problem

It is an object of the present invention to provide a liquid crystal display device in which a liquid crystal composition containing a liquid crystal compound having a specific structure and an in-cell retardation layer containing a polymerizable liquid crystal composition that contains a polymerizable liquid crystal compound having a specific structure in the intended amount are used to prevent a reduction in the voltage holding ratio (VHR) of the liquid crystal layer and an increase in ion density (ID) and to eliminate problems of defective display such as white spots, uneven alignment, and image-sticking.

Solution to Problem

In order to achieve the above-mentioned object, the inventors have intensively studied a combination of the structure of polymerizable liquid crystal used in a retardation layer and the structure of a liquid crystal material used in a liquid crystal layer and found that a liquid crystal display device of which a liquid crystal composition containing a liquid crystal compound having a specific structure is used in the liquid crystal layer and of which an optically anisotropic body formed through polymerization of a polymerizable liquid crystal composition containing a polymerizable liquid crystal compound with a specific structure in the intended amount is used in the retardation layer is free from a reduction in the voltage holding ratio (VHR) of the liquid crystal layer and an increase in ion density (ID) and enables problems of defective display such as white spots, uneven alignment, and image-sticking to be eliminated, thereby accomplishing the present invention.

In particular, the present invention provides a liquid crystal display device including a first substrate, a second substrate, a liquid crystal layer disposed between the first and second substrates, a retardation layer disposed between the pair of substrates, and at least a pair of electrodes, wherein the liquid crystal layer contains a liquid crystal composition containing at least one compound represented by General Formula (I)

[Chem. 1]

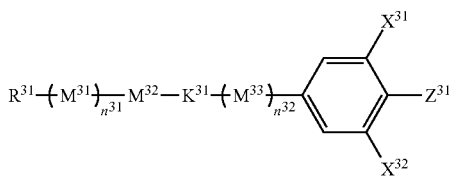

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, at least one —$CH_2$— in the trans-1,4-cyclohexylene group is optionally substituted with —O— such that oxygen atoms are not directly bonded to each other, and at least one hydrogen atom in the phenylene group is optionally substituted with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $K^{31}$ represents —$CH_2O$—, —$OCH_2$—, —$CF_2O$—, or —$OCF_2$—; $n^{31}$ and $n^{32}$ each independently represent 0, 1, or 2, and $n^{31}+n^{32}$ is 0, 1, or 2; and in the case where $M^{31}$ and $M^{33}$ are multiple, corresponding ones of them may be the same as or different from each other) and at least one compound selected from the group consisting of compounds represented by General Formulae (II-a) to (II-f)

[Chem. 2]

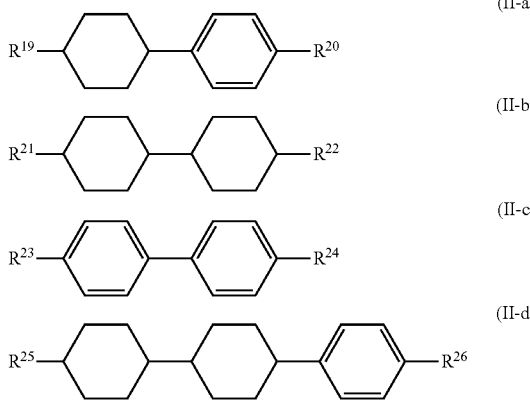

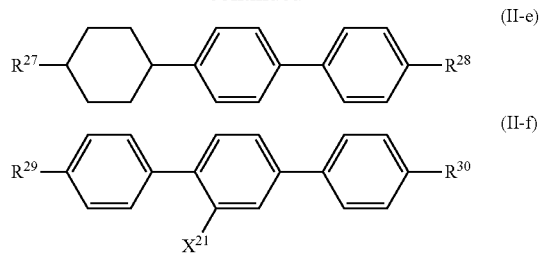

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and the retardation layer is an optically anisotropic body formed through polymerization of a polymerizable liquid crystal composition containing 25 weight % or more of a liquid crystal compound having at least two polymerizable functional groups.

Advantageous Effects of Invention

In the liquid crystal display device of the present invention, a liquid crystal composition containing a liquid crystal compound having a specific structure is used in the liquid crystal layer, and an optically anisotropic body formed through polymerization of a polymerizable liquid crystal composition that contains a polymerizable liquid crystal compound with a specific structure in the intended amount is used in the retardation layer, which prevents a reduction in the voltage holding ratio (VHR) of the liquid crystal layer and an increase in ion density (ID) and eliminates generation of defective display such as white spots, uneven alignment, and image-sticking.

Figure 1:
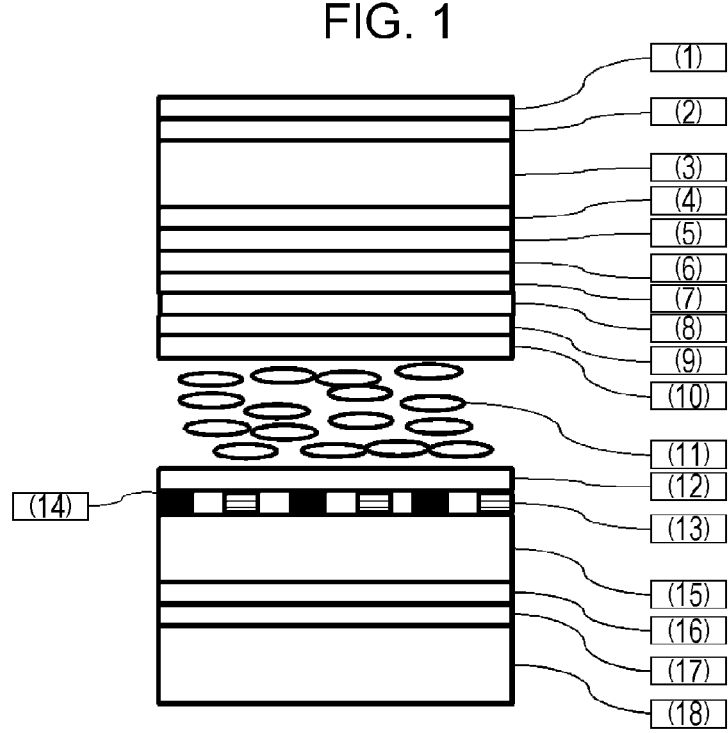
FIG. 1 illustrates an example of the liquid crystal display device of the present invention.

REFERENCE SIGNS LIST (1) Polarization layer
(2) Adhesive layer
(3) Light-transmitting substrate
(4) Color filter layer
(5) Planarization layer
(6) Alignment film for retardation layer
(7) Retardation layer 1 using a specific polymerizable liquid crystal composition
(8) Alignment film for retardation layer
(9) Retardation layer 2 using a specific polymerizable liquid crystal composition
(10) Alignment film
(11) Specific liquid crystal composition
(12) Alignment film
(13) Transparent electrode layer
(14) Pixel electrode layer
(15) Light-transmitting substrate
(16) Adhesive layer
(17) Polarization layer
(18) Backlight
(19) Retardation layer of stretched film
(20) Insulating layer

DESCRIPTION OF EMBODIMENTS

FIG. 1 illustrates an example of the liquid crystal display device of the present invention. The liquid crystal display device includes a polarizing plate consisting of a polarization layer (1), an adhesive layer (2), and a light-transmitting substrate (3); a color filter layer (4); and a planarization layer (5). The liquid crystal display device further includes an alignment film for a retardation layer (6), an alignment film (10), a first retardation layer (7) using a specific polymerizable composition, an alignment film for a retardation layer (8), and a second retardation layer (9) using a specific polymerizable composition, the layers (7) to (9) being interposed between the retardation layer (6) and the alignment film (10). A specific liquid crystal composition (11) is disposed between the alignment film (10) and an alignment film (12).

The liquid crystal display device further includes a transparent electrode layer (13), which serves as a common electrode, and a pixel electrode layer (14), each being disposed between the alignment film (12) and a light-transmitting substrate (15). The light-transmitting substrate (15) disposed on a backlight (18) side is provided with an adhesive layer (16) and a polarization layer (17) as well.

Figure 2:
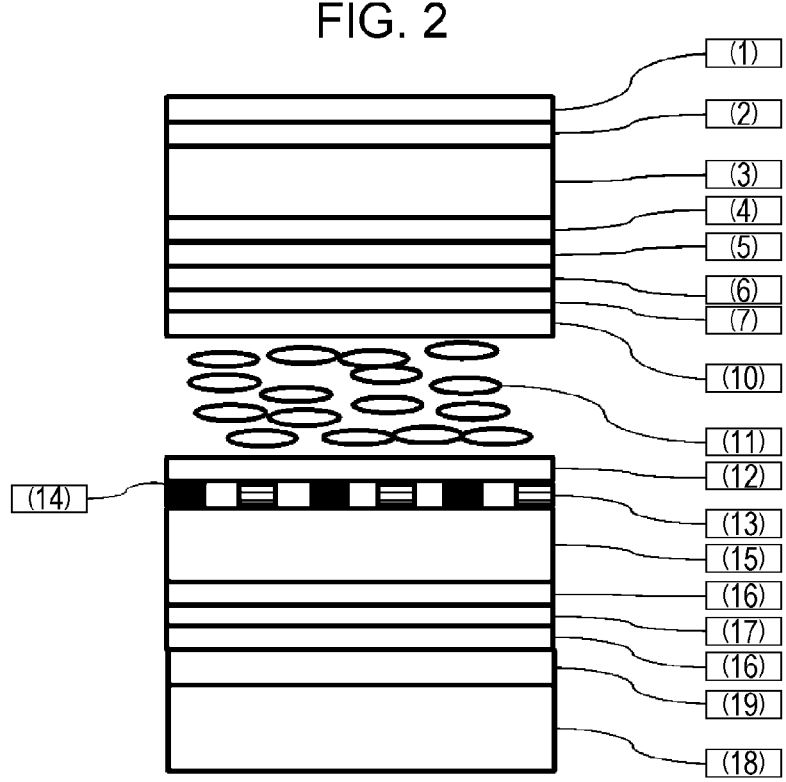
FIG. 2 illustrates another example of the liquid crystal display device of the present invention.

In the display device, the two substrates are attached to each other with a sealant and sealing material placed at the peripheries thereof, and particulate spacers or columnar spacers formed of resin by photolithography are disposed between the substrates to maintain the distance therebetween in many cases. FIG. 2 illustrates an example of a liquid crystal display device in which the retardation layer (9) using a specific polymerizable liquid crystal composition is not used and in which a retardation layer (19) of a stretched film is disposed outside the light-transmitting substrate (15).

(Liquid Crystal Layer)

The liquid crystal layer in the present invention contains a liquid crystal composition containing at least one compound represented by General Formula (I) and at least one compound selected from the group consisting of compounds represented by General Formulae (II-a) to (II-f).

[Chem. 3]

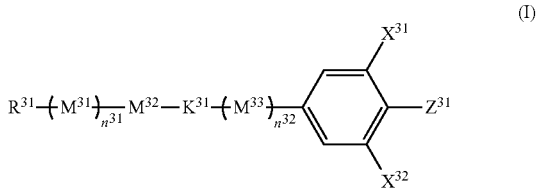

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, at least one —$CH_2$— in the trans-1,4-cyclohexylene group is optionally substituted with —O— such that oxygen atoms are not directly bonded to each other, and at least one hydrogen atom in the phenylene group is optionally substituted with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $K^{31}$ represents —$CH_2O$—, —$OCH_2$—, —$CF_2O$—, or —$OCF_2$—; $n^{31}$ and $n^{32}$ each independently represent 0, 1, or 2, and $n^{31}+n^{32}$ is 0, 1, or 2; and in the case where $M^{31}$ and $M^{33}$ are multiple, corresponding ones of them may be the same as or different from each other)

[Chem. 4]

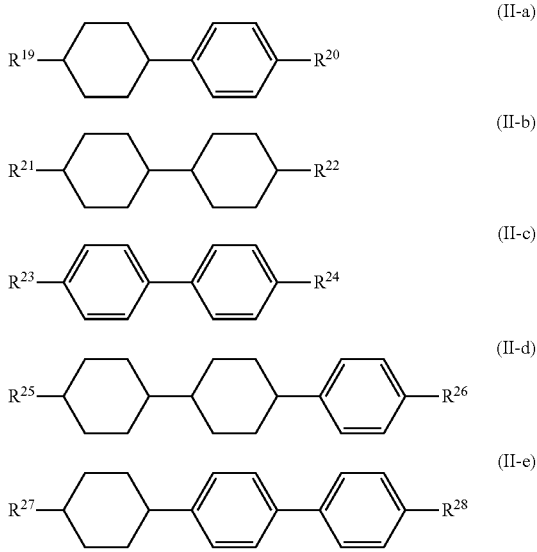

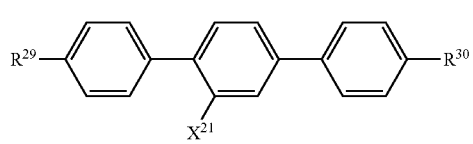
(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom)

In General Formula (I), in the case where the ring structure bonded to $R^{31}$ is a phenyl group (aromatic), $R^{31}$ is preferably a linear alkyl group having 1 to 5 carbon atoms, a linear alkoxy group having 1 to 4 (or more) carbon atoms, or an alkenyl group having 4 or 5 carbon atoms; in the case where the ring structure bonded to $R^{31}$ is a saturated ring such as cyclohexane, pyran, or dioxane, $R^{31}$ is preferably a linear alkyl group having 1 to 5 carbon atoms, a linear alkoxy group having 1 to 4 (or more) carbon atoms, or a linear alkenyl group having 2 to 5 carbon atoms. In view of good chemical stability to heat and light, $R^{31}$ is preferably an alkyl group. In order to produce a liquid crystal display device in which the viscosity is small and which quickly responds, $R^{31}$ is preferably an alkenyl group. In order to give small viscosity and high nematic-isotropic phase transition temperature (Tni) and to make response speed faster, it is preferred that an alkenyl group of which the end group is not an unsaturated bond be employed, and it is especially preferred that a methyl group exist adjacent to an alkenyl group to serve as the end group. In order to give good solubility at low temperature, an approach in which $R^{31}$ is an alkoxy group is preferred, and another approach in which different $R^{31}$'s are present in combination is also preferred. For example, compounds in which $R^{31}$'s are alkyl groups or alkenyl groups having 2, 3, or 4 carbon atoms are preferably used in combination; compounds in which $R^{31}$'s have 3 or 5 carbon atoms are also preferably used in combination; and compounds in which $R^{31}$'s have 3, 4, or 5 carbon atoms are also preferably used in combination.

$M^{31}$ to $M^{33}$ are preferably any of the following rings.

[Chem. 5]

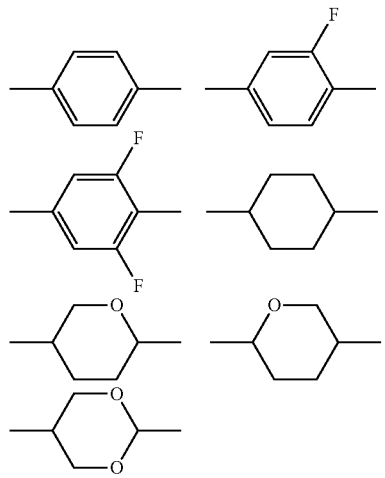

$M^{31}$ is preferably any of the following rings.

[Chem. 6]

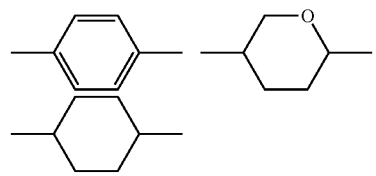

$M^{31}$ is more preferably any of the following rings.

[Chem. 7]

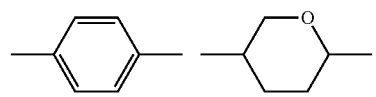

$M^{32}$ is preferably any of the following rings.

[Chem. 8]

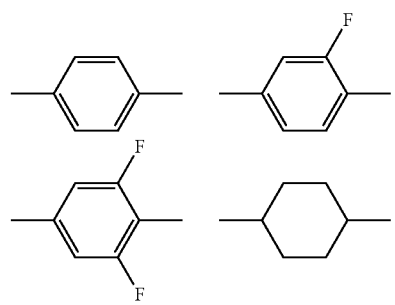

$M^{32}$ is more preferably any of the following rings.

[Chem. 9]

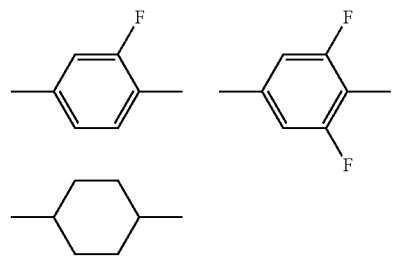

$M^{32}$ is further preferably any of the following rings.

[Chem. 10]

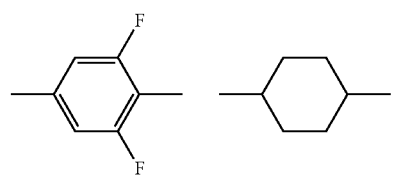

$M^{33}$ is preferably any of the following rings.

[Chem. 11]

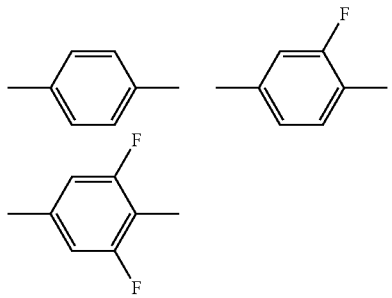

$M^{33}$ is more preferably any of the following rings.

[Chem. 12]

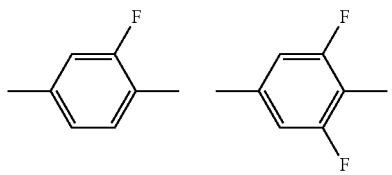

$M^{33}$ is further preferably any of the following rings.

[Chem. 13]

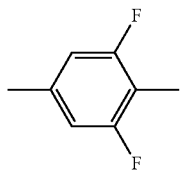

It is preferred that at least any one of $X^{31}$ and $X^{32}$ be a fluorine atom, and it is more preferred that both of them be fluorine atoms.

$Z^{31}$ is preferably a fluorine atom or a trifluoromethoxy group. $X^{31}$, $X^{32}$, and $Z^{31}$ are as follows in an embodiment: $X^{31}$=F, $X^{32}$=F, and $Z^{31}$=F. In another embodiment, $X^{31}$, $X^{32}$, and $Z^{31}$ are as follows: $X^{31}$=F, $X^{32}$=H, and $Z^{31}$=F. In another embodiment, $X^{31}$, $X^{32}$, and $Z^{31}$ are as follows: $X^{31}$=F, $X^{32}$=H, and $Z^{31}$=OCF$^3$. In another embodiment, $X^{31}$, $X^{32}$, and $Z^{31}$ are as follows: $X^{31}$=F, $X^{32}$=F, and $Z^{31}$=OCF$^3$. In another embodiment, $X^{31}$, $X^{32}$, and $Z^{31}$ are as follows: $X^{31}$=H, $X^{32}$=H, and $Z^{31}$=OCF$^3$.

$n^{31}$ is preferably 1 or 2; $n^{32}$ is preferably 0 or 1, and more 0. $n^{31}+n^{32}$ preferably is preferably 1 or 2, and more preferably 2.

The lower limit of the preferred amount of the compound represented by General Formula (I) is 1%, 2%, 5%, 8%, 10%, 13%, 15%, 18%, 20%, 22%, 25%, or 30% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (I) is preferably a compound selected from the group consisting of compounds represented by General Formula (M-1).

[Chem. 14]

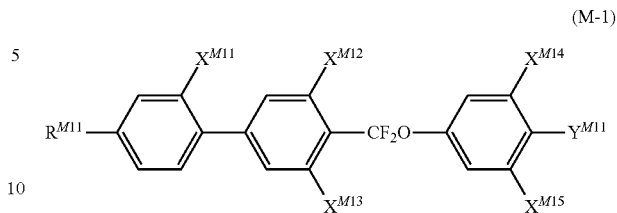

(M-1)

(in the formula, $R^{M11}$ represents an alkyl group having 1 to 5 carbon atoms, an alkenyl group having 2 to 5 carbon atoms, or an alkoxy group having 1 to 4 carbon atoms; $X^{M11}$ to $X^{M15}$ each independently represent a hydrogen atom or a fluorine atom; and $Y^{M11}$ represents a fluorine atom, a chlorine atom, or OCF$_3$)

Such compounds can be used in any combination; a combination of the compounds is determined on the basis of predetermined properties such as solubility at low temperature, transition temperature, electric reliability, and birefringence. In an embodiment of the present invention, for example, one of such compounds is used. Furthermore, two of the compounds are used in another embodiment, and three or more of the compounds are used in another embodiment.

The lower limit of the preferred amount of the compound represented by General Formula (M-1) is 1%, 2%, 5%, 8%, 10%, 13%, 15%, 18%, 20%, 22%, 25%, or 30% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition used in the liquid crystal layer in the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

In particular, the compound represented by General Formula (M-1) is preferably any of compounds represented by Formulae (M-1.1) to (M-1.4), more preferably any of the compounds represented by Formulae (M-1.1) and (M-1.2), and further preferably the compound represented by Formula (M-1.2). Combined use of the compounds represented by Formulae (M-1.1) and (M-1.2) is also preferred.

[Chem. 15]

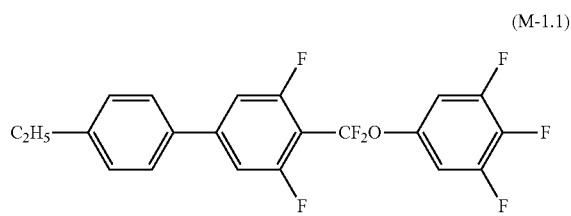

(M-1.1)

-continued

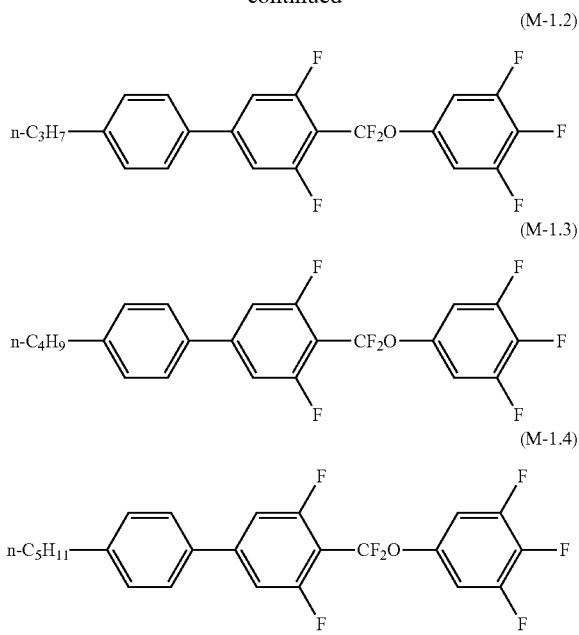

The lower limit of the preferred amount of the compound represented by Formula (M-1.1) is 1%, 2%, 5%, or 6% relative to the amount of the whole liquid crystal composition used in the liquid crystal layer in the present invention. The upper limit of the preferred amount is 15%, 13%, 10%, 8%, or 5% relative thereto.

The lower limit of the preferred amount of the compound represented by Formula (M-1.2) is 1%, 2%, 5%, or 6% relative to the amount of the whole liquid crystal composition used in the liquid crystal layer in the present invention. The upper limit of the preferred amount is 30%, 25%, 23%, 20%, 18%, 15%, 13%, 10%, or 8% relative thereto.

The lower limit of the preferred amount of a combination of the compounds represented by Formulae (M-1.1) and (M-1.2) is 1%, 2%, 5%, or 6% relative to the amount of the whole liquid crystal composition used in the liquid crystal layer in the present invention. The upper limit of the preferred amount thereof is 30%, 25%, 23%, 20%, 18%, 15%, 13%, 10%, or 8% relative thereto.

Furthermore, the compound represented by General Formula (I) is, for example, preferably a compound selected from the group consisting of compounds represented by General Formula (M-2).

[Chem. 16]

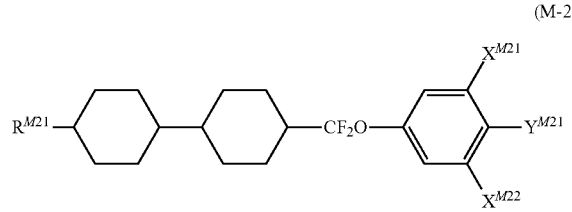

(in the formula, $R^{M21}$ represents an alkyl group having 1 to 5 carbon atoms, an alkenyl group having 2 to 5 carbon atoms, or an alkoxy group having 1 to 4 carbon atoms; $X^{M21}$ and $X^{M22}$ each independently represent a hydrogen atom or a fluorine atom; and $Y^{M21}$ represents a fluorine atom, a chlorine atom, or $OCF_3$)

The lower limit of the preferred amount of the compound represented by General Formula (M-2) is 1%, 2%, 5%, 8%, 10%, 13%, 15%, 18%, 20%, 22%, 25%, or 30% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition used in the liquid crystal layer in the present invention needs to have a Tni kept at a high level to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (M-2) is preferably any of compounds represented by Formulae (M-2.1) to (M-2.5), and also preferably the compound represented by Formula (M-2.3) and/or the compound represented by Formula (M-2.5).

[Chem. 17]

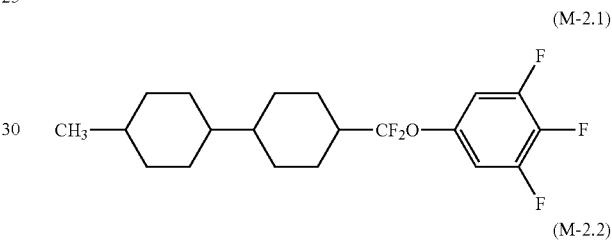

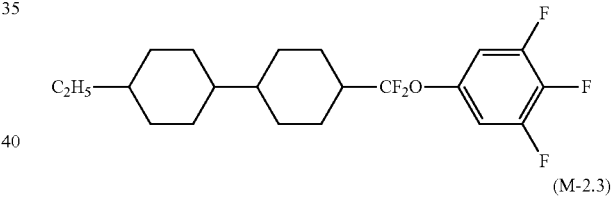

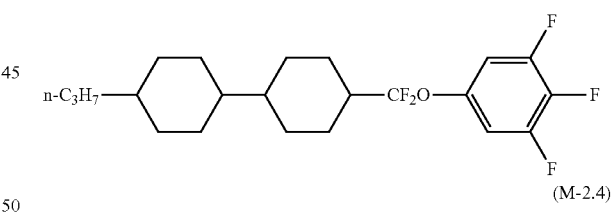

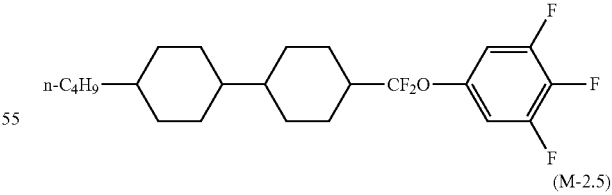

The lower limit of the preferred amount of the compound represented by Formula (M-2.2) is 1%, 2%, 5%, or 6% relative to the amount of the whole liquid crystal composition used in the liquid crystal layer in the present invention. The upper limit of the preferred amount is 15%, 13%, 10%, 8%, or 5% relative thereto.

The lower limit of the preferred amount of the compound represented by Formula (M-2.3) is 1%, 2%, 5%, or 6% relative to the amount of the whole liquid crystal composition used in the liquid crystal layer in the present invention. The upper limit of the preferred amount is 30%, 25%, 23%, 20%, 18%, 15%, 13%, 10%, or 8% relative thereto.

The lower limit of the preferred amount of the compound represented by Formula (M-2.5) is 1%, 2%, 5%, or 6% relative to the amount of the whole liquid crystal composition used in the liquid crystal layer in the present invention. The upper limit of the preferred amount is 30%, 25%, 23%, 20%, 18%, 15%, 13%, 10%, or 8% relative thereto.

The lower limit of the preferred amount of a combination of the compounds represented by Formulae (M-2.2), (M-2.3) and (M-2.5) is 1%, 2%, 5%, or 6% relative to the amount of the whole liquid crystal composition used in the liquid crystal layer in the present invention. The upper limit of the preferred amount thereof is 30%, 25%, 23%, 20%, 18%, 15%, 13%, 10%, or 8% relative thereto.

The amount is preferably not less than 1%, more preferably not less than 5%, further preferably not less than 8%, further preferably not less than 10%, further preferably not less than 14%, and especially preferably not less than 16% relative to the amount of the whole liquid crystal composition used in the liquid crystal layer in the present invention. In view of solubility at low temperature, transition temperature, electric reliability, and another property, the content percentage is preferably adjusted to be up to 30%, more preferably up to 25%, further preferably up to 22%, and especially preferably less than 20%.

The compound represented by General Formula (I) is preferably any of compounds represented by General Formula (M-3).

[Chem. 18]

(M-3)

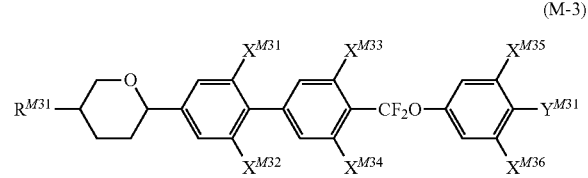

(in the formula, $R^{M31}$ represents an alkyl group having 1 to 5 carbon atoms, an alkenyl group having 2 to 5 carbon atoms, or an alkoxy group having 1 to 4 carbon atoms; $X^{M31}$ to $X^{M36}$ each independently represent a hydrogen atom or a fluorine atom; and $Y^{M31}$ represents a fluorine atom, a chlorine atom, or $OCF_3$)

Such compounds can be used in any combination; in view of solubility at low temperature, transition temperature, electric reliability, birefringence, and another property, the compounds are preferably used alone or in combination.

The upper limit and lower limit of the amount of the compound represented by General Formula (M-3) are determined for an embodiment in view of properties such as solubility at low temperature, transition temperature, electric reliability, and birefringence.

The lower limit of the preferred amount of the compound represented by General Formula (M-3) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 20%, 18%, 15%, 13%, 10%, 8%, or 5% relative thereto.

Specifically, the compound represented by General Formula (M-3) is preferably any of compounds represented by Formulae (M-3.1) to (M-3.4); in particular, the compound represented by Formulae (M-3.1) and/or the compound represented by Formulae (M-3.2) are preferably used.

[Chem. 19]

(M-3.1)

(M-3.2)

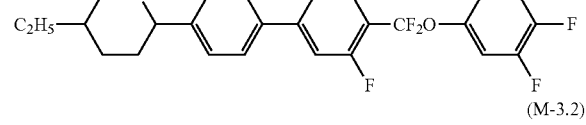

(M-3.3)

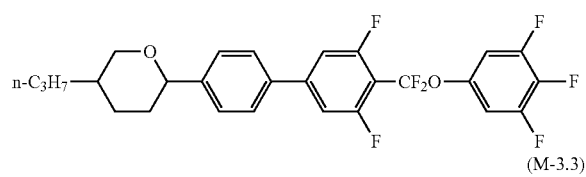

(M-3.4)

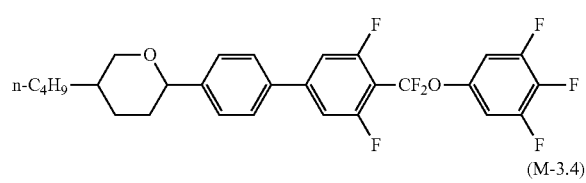

The lower limit of the preferred amount of the compound represented by Formula (M-3.1) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 20%, 18%, 15%, 13%, 10%, 8%, or 5% relative thereto.

The lower limit of the preferred amount of the compound represented by Formula (M-3.2) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 20%, 18%, 15%, 13%, 10%, 8%, or 5% relative thereto.

The lower limit of the preferred amount of a combination of the compounds represented by Formulae (M-3.1) and (M-3.2) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 20%, 18%, 15%, 13%, 10%, 8%, or 5% relative thereto.

The compound represented by General Formula (I) is preferably a compound selected from the group consisting of compounds represented by General Formula (M-4).

[Chem. 20]

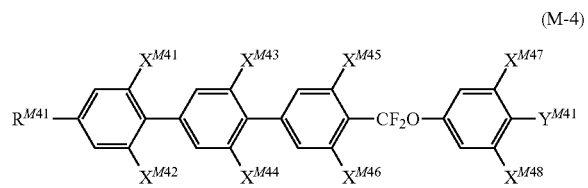

(M-4)

(in the formula, $R^{M41}$ represents an alkyl group having 1 to 5 carbon atoms, an alkenyl group having 2 to 5 carbon atoms, or an alkoxy group having 1 to 4 carbon atoms; $X^{M41}$ to $X^{M48}$ each independently represent a fluorine atom or a hydrogen atom; and $Y^{M41}$ represents a fluorine atom, a chlorine atom, or $OCF_3$)

Such compounds can be used in any combination; in view of solubility at low temperature, transition temperature, electric reliability, birefringence, and another property, the compounds are preferably used alone, or two or three or more thereof are used in combination.

The upper limit and lower limit of the amount of the compound represented by General Formula (M-4) are determined for an embodiment in view of properties such as solubility at low temperature, transition temperature, electric reliability, and birefringence.

The lower limit of the preferred amount of the compound represented by Formula (M-4) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition of the liquid crystal layer in the present invention is used in a liquid crystal display device having a small cell gap, the appropriate amount of the compound represented by General Formula (M-4) is at a higher level. In the case where the liquid crystal composition is used in a liquid crystal display device which is driven at a small driving voltage, the appropriate amount of the compound represented by General Formula (M-4) is at a higher level. In the case where the liquid crystal composition is used in a liquid crystal display device which is used in a low-temperature environment, the appropriate amount of the compound represented by General Formula (M-4) is at a lower level. In the case where the liquid crystal composition is used in a liquid crystal display device which quickly responds, the appropriate amount of the compound represented by General Formula (M-4) is at a lower level.

Specifically, the compound represented by General Formula (M-4) is preferably any of compounds represented by Formulae (M-4.1) to (M-4.4); in particular, the compounds represented by Formulae (M-4.2) to (M-4.4) are preferably used, and the compound represented by Formula (M-4.2) is more preferably used.

[Chem. 21]

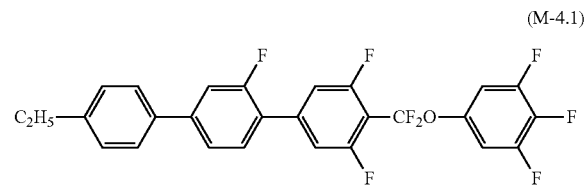

(M-4.1)

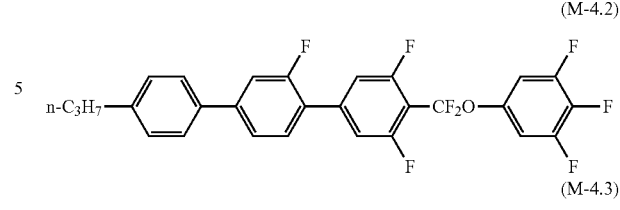

(M-4.2)

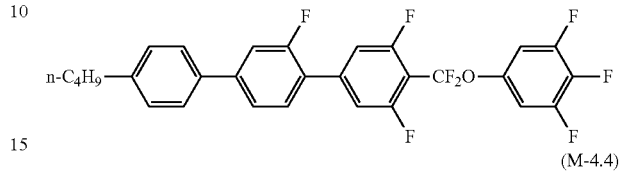

(M-4.3)

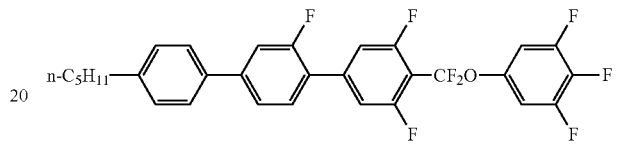

(M-4.4)

It is also preferred that the compound represented by General Formula (I) have the following part in its structure.

[Chem. 22]

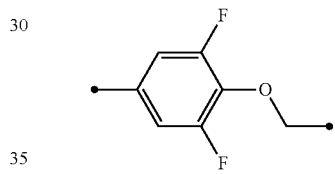

(in the formula, the black points each represent a carbon atom in the ring structure to which such a part has been linked)

The compound having such a part in its structure is preferably any of compounds represented by General Formulae (M-10) to (M-18).

The compound represented by General Formula (M-10) is as follows.

[Chem. 23]

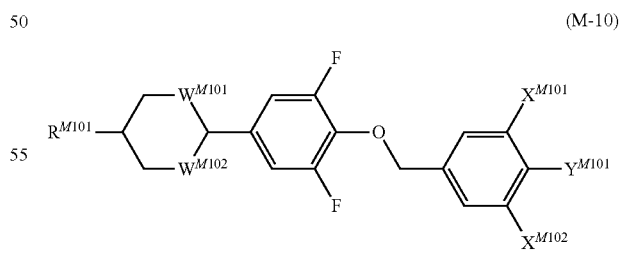

(M-10)

(in the formula, $X^{M101}$ and $X^{M102}$ each independently represent a fluorine atom or a hydrogen atom; $Y^{M101}$ represents a fluorine atom, a chlorine atom, or $-OCF_3$; $R^{M101}$ represents an alkyl group having 1 to 5 carbon atoms, an alkenyl group having 2 to 5 carbon atoms, or an alkoxy group having 1 to 4 carbon atoms; and $W^{M101}$ and $W^{M102}$ each independently represent $-CH_2-$ or $-O-$)

The lower limit of the preferred amount of the compound represented by General Formula (M-10) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-10) is preferably any of compounds represented by Formulae (M-10.1) to (M-10.12); in particular, the compounds represented by Formulae (M-10.5) to (M-10.12) are preferably used.

[Chem. 24]

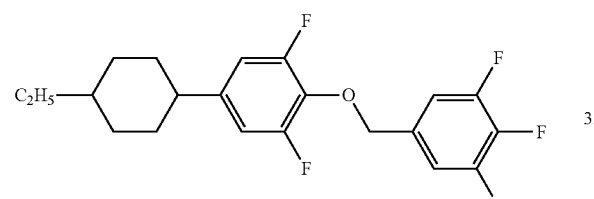

(M-10.1)

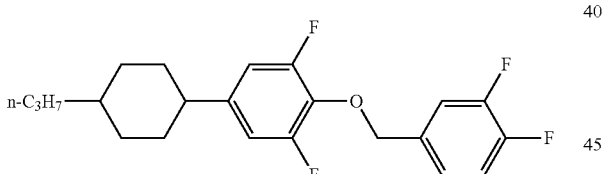

(M-10.2)

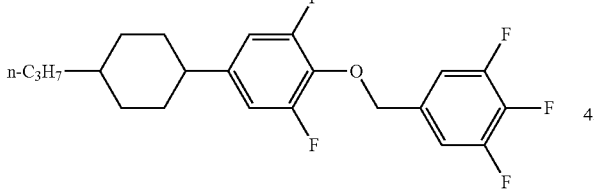

(M-10.3)

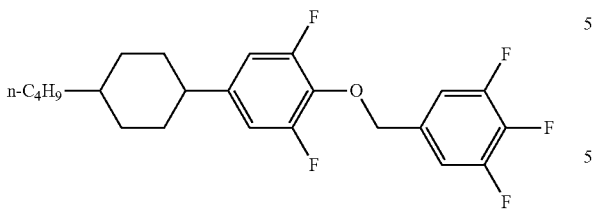

(M-10.4)

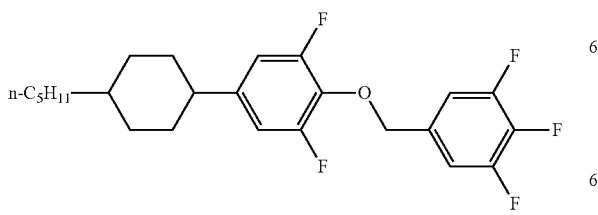

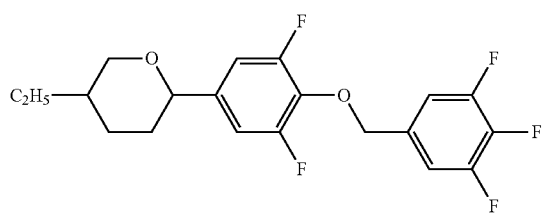

(M-10.5)

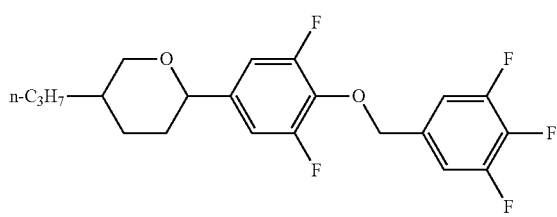

(M-10.6)

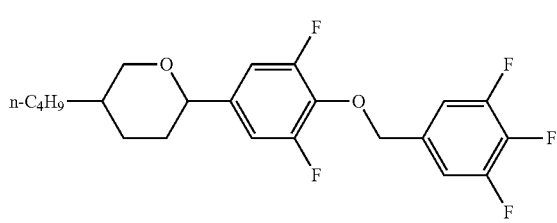

(M-10.7)

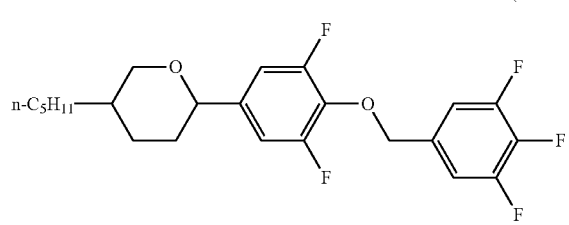

(M-10.8)

[Chem. 25]

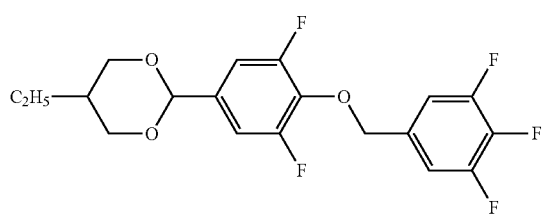

(M-10.9)

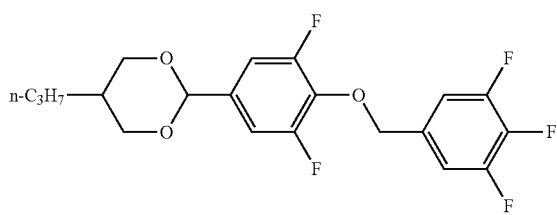

(M-10.10)

-continued (M-10.11)

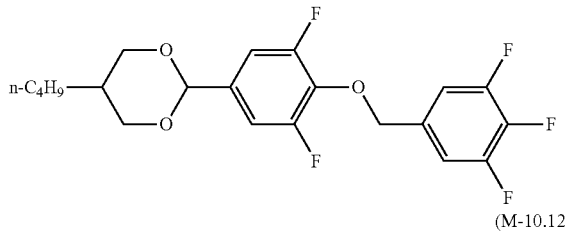

(M-10.12)

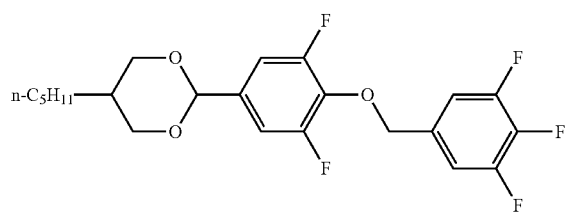

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-11) is as follows.

[Chem. 26]

(M-11)

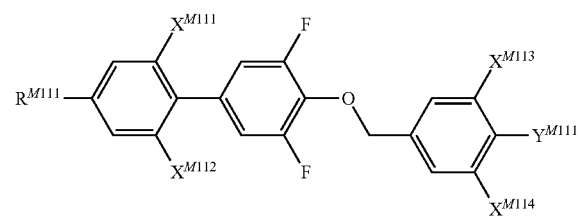

(in the formula, $X^{M111}$ to $X^{M114}$ each independently represent a fluorine atom or a hydrogen atom; $Y^{M111}$ represents a fluorine atom, a chlorine atom, or —$OCF_3$; and $R^{M111}$ represents an alkyl group having 1 to 5 carbon atoms, an alkenyl group having 2 to 5 carbon atoms, or an alkoxy group having 1 to 4 carbon atoms)

The lower limit of the preferred amount of the compound represented by General Formula (M-11) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-11) is preferably any of compounds represented by Formulae (M-11.1) to (M-11.8); in particular, the compounds represented by Formulae (M-11.1) to (M-11.4) are preferably used.

[Chem. 27]

(M-11.1)

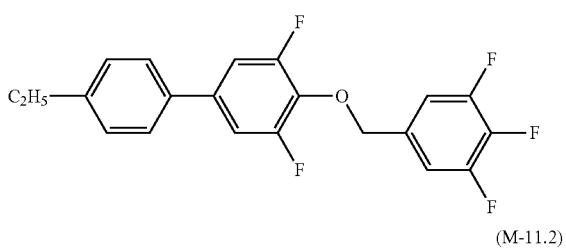

(M-11.2)

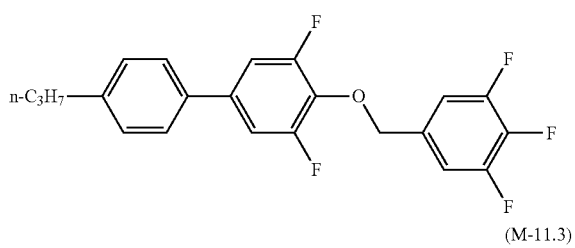

(M-11.3)

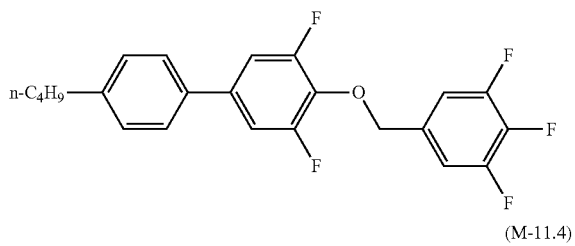

(M-11.4)

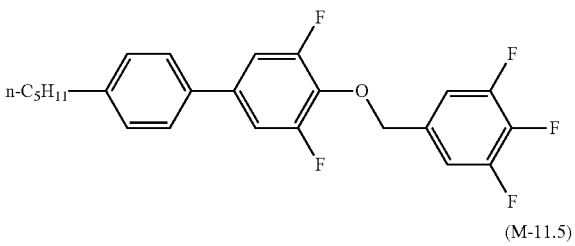

(M-11.5)

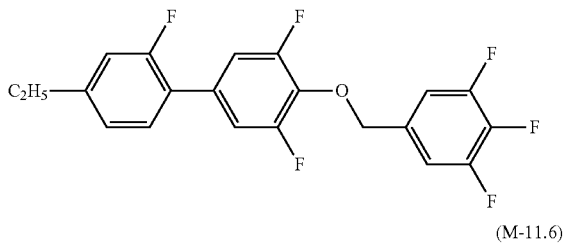

(M-11.6)

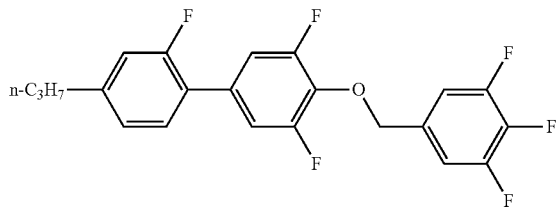

-continued

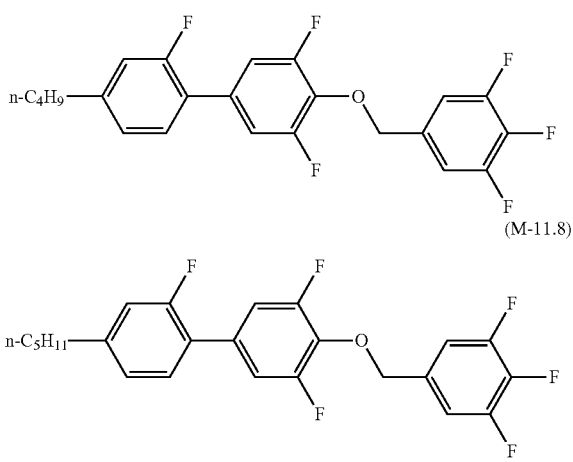

(M-11.7)

(M-11.8)

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-12) is as follows.

[Chem. 28]

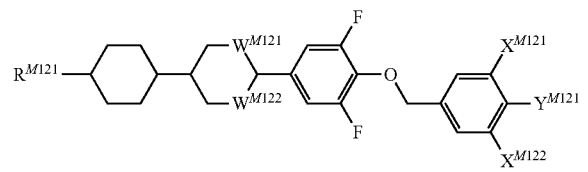

(M-12)

(in the formula, $X^{M121}$ and $X^{M122}$ each independently represent a fluorine atom or a hydrogen atom; $Y^{M121}$ represents a fluorine atom, a chlorine atom, or —OCF$_3$; $R^{M121}$ represents an alkyl group having 1 to 5 carbon atoms, an alkenyl group having 2 to 5 carbon atoms, or an alkoxy group having 1 to 4 carbon atoms; and $W^{M121}$ and $W^{M122}$ each independently represent —CH$_2$— or —O—)

The lower limit of the preferred amount of the compound represented by General Formula (M-12) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-12) is preferably any of compounds represented by Formulae (M-12.1) to (M-12.12); in particular, the compounds represented by Formulae (M-12.5) to (M-12.8) are preferably used.

[Chem. 29]

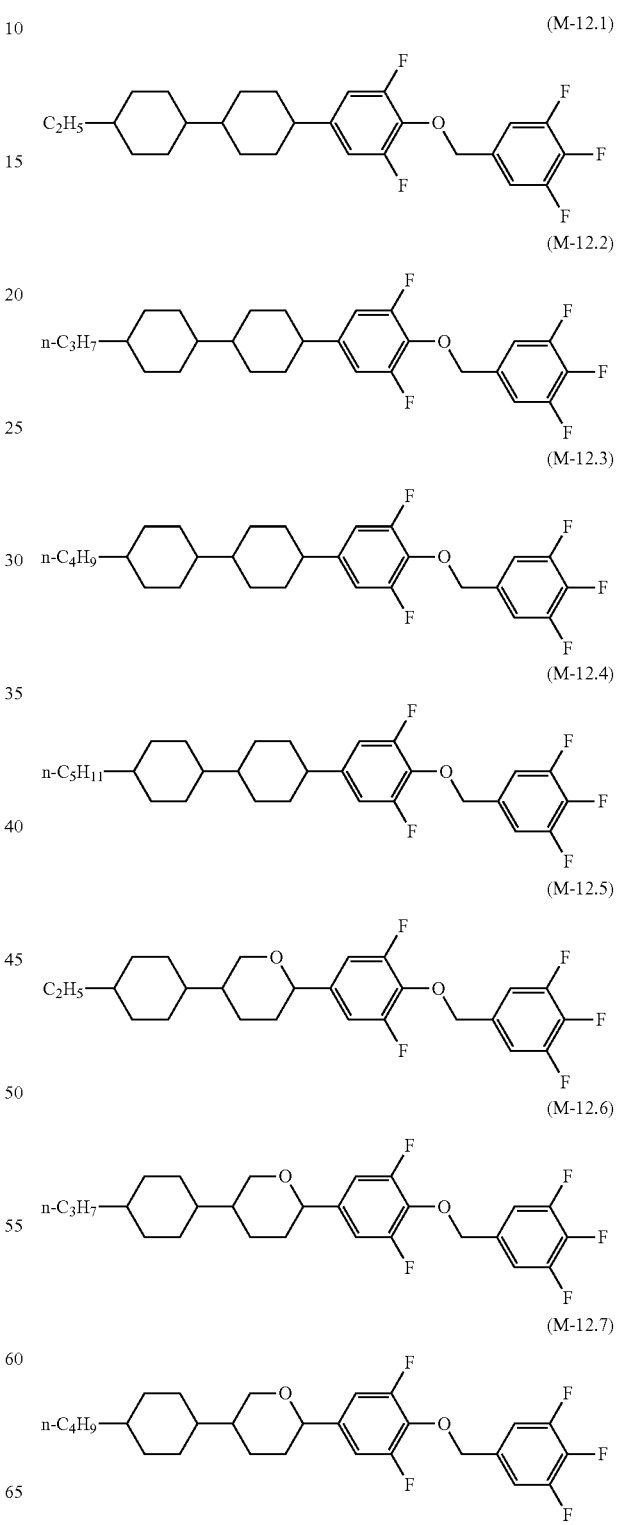

-continued (M-12.8)
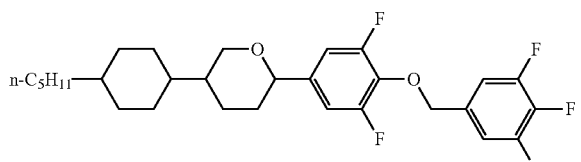

[Chem. 30]

(M-12.9)
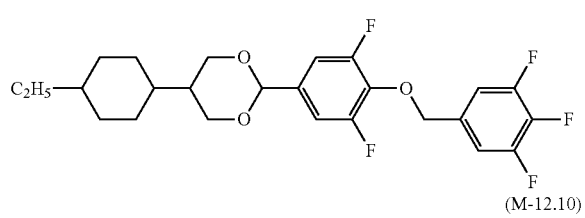

(M-12.10)
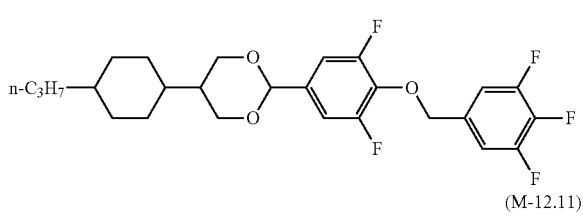

(M-12.11)
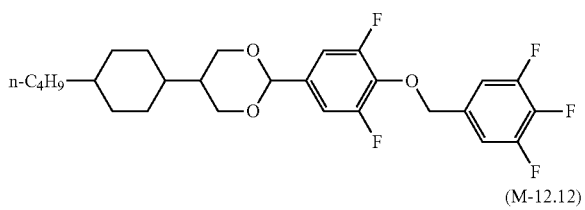

(M-12.12)
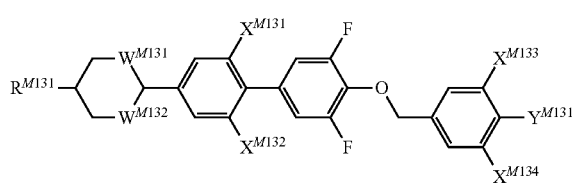

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-13) is as follows.

[Chem. 31]

(M-13)

$$R^{M131}-\underset{W^{M132}}{\overset{W^{M131}}{\rule{0pt}{0pt}}}\cdots$$

(in the formula, $X^{M131}$ to $X^{M134}$ each independently represent a fluorine atom or a hydrogen atom; $Y^{M131}$ represents a fluorine atom, a chlorine atom, or —OCF$_3$; $R^{M131}$ represents an alkyl group having 1 to 5 carbon atoms, an alkenyl group having 2 to 5 carbon atoms, or an alkoxy group having 1 to 4 carbon atoms; and $W^{M131}$ and $W^{M132}$ each independently represent —CH$_2$— or —O—)

The lower limit of the preferred amount of the compound represented by General Formula (M-13) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-13) is preferably any of compounds represented by Formulae (M-13.1) to (M-13.28); in particular, the compounds represented by Formulae (M-13.1) to (M-13.4), (M-13.11) to (M-13.14), and (M-13.25) to (M-13.28) are preferably used.

[Chem. 32]

(M-13.1)

(M-13.2)
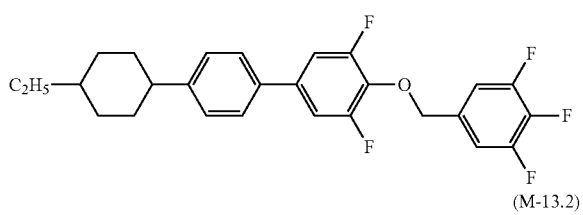

(M-13.3)

(M-13.4)
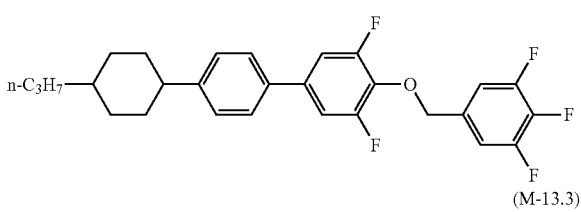

(M-13.5)
(M-13.6)
(M-13.7)
(M-13.8)
(M-13.11)
(M-13.12)
(M-13.13)
(M-13.14)
(M-13.15)
(M-13.16)
(M-13.17)
(M-13.18)
(M-13.21)
(M-13.22)

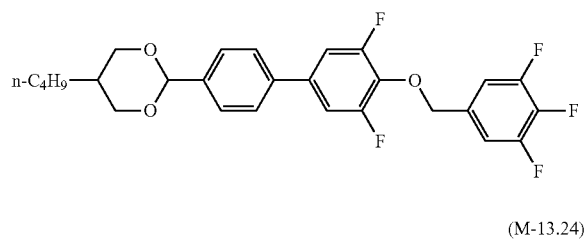
(M-13.23)

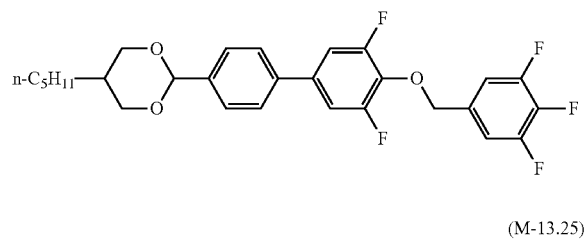
(M-13.24)

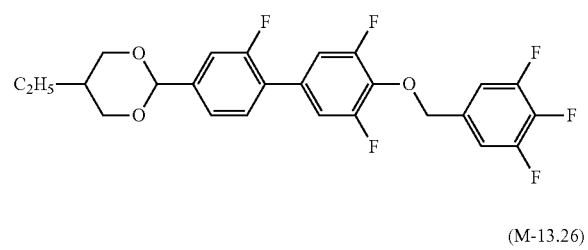
(M-13.25)

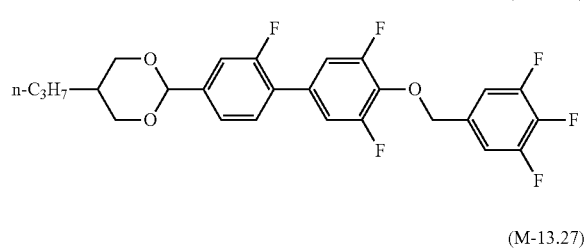
(M-13.26)

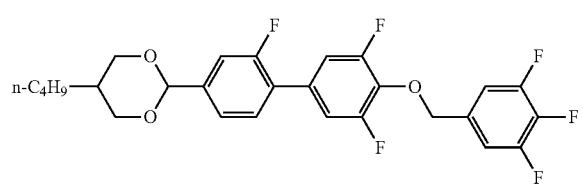
(M-13.27)

(M-13.28)

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-14) is as follows.

[Chem. 35]

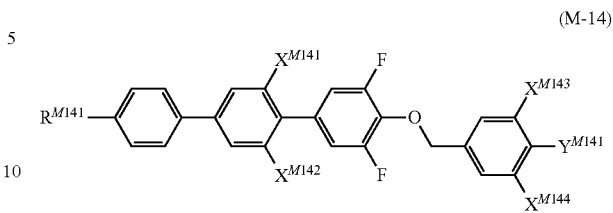
(M-14)

(in the formula, $X^{M141}$ to $X^{M144}$ each independently represent a fluorine atom or a hydrogen atom; $Y^{M141}$ represents a fluorine atom, a chlorine atom, or —OCF$_3$; $R^{M141}$ represents an alkyl group having 1 to 5 carbon atoms, an alkenyl group having 2 to 5 carbon atoms, or an alkoxy group having 1 to 4 carbon atoms; and $W^{M141}$ and $W^{M142}$ each independently represent —CH$_2$— or —O—)

The lower limit of the preferred amount of the compound represented by General Formula (M-14) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-14) is preferably any of compounds represented by Formulae (M-14.1) to (M-14.8); in particular, the compounds represented by Formulae (M-14.5) to (M-14.8) are preferably used.

[Chem. 36]

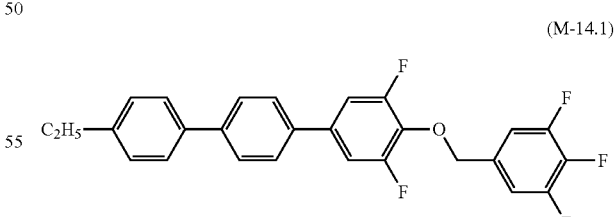
(M-14.1)

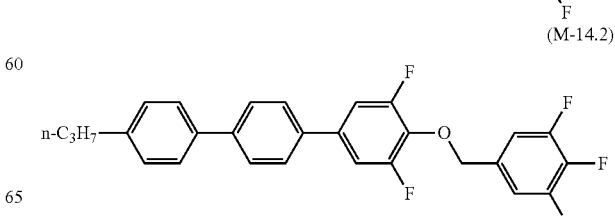
(M-14.2)

-continued (M-14.3)
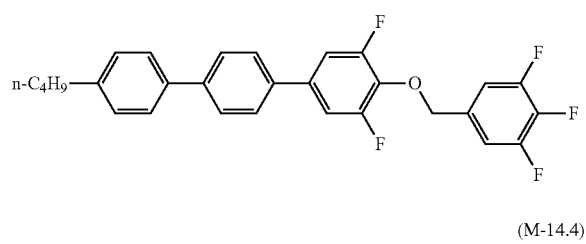

(M-14.4)
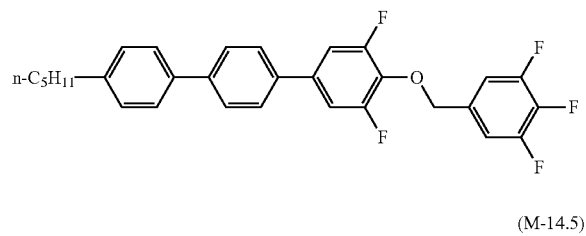

(M-14.5)
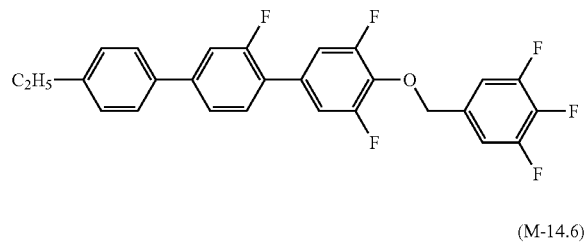

(M-14.6)

(M-14.7)

(M-14.8)
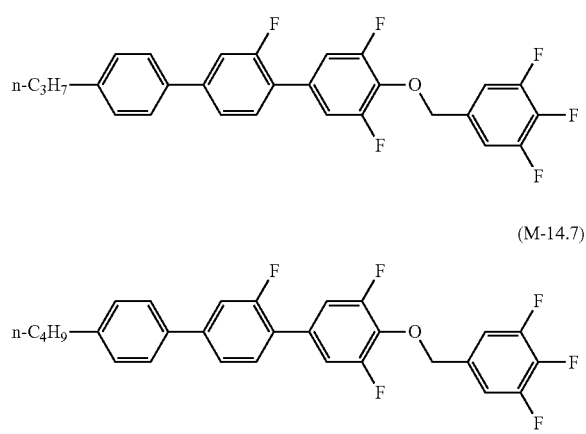

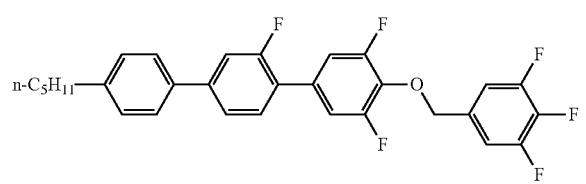

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-15) is as follows.

[Chem. 37]

(M-15)
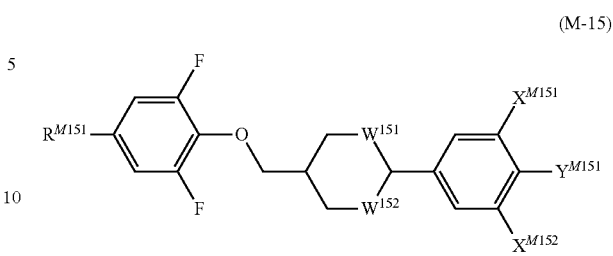

(in the formula, $X^{M151}$ and $X^{M152}$ each independently represent a fluorine atom or a hydrogen atom; $Y^{M151}$ represents a fluorine atom, a chlorine atom, or —$OCF_3$; $R^{M151}$ represents an alkyl group having 1 to 5 carbon atoms, an alkenyl group having 2 to 5 carbon atoms, or an alkoxy group having 1 to 4 carbon atoms; and $W^{M151}$ and $W^{M152}$ each independently represent —$CH_2$— or —O—)

The lower limit of the preferred amount of the compound represented by General Formula (M-15) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-15) is preferably any of compounds represented by Formulae (M-15.1) to (M-15.14); in particular, the compounds represented by Formulae (M-15.5) to (M-15.8) and (M-15.11) to (M-15.14) are preferably used.

[Chem. 38]

(M-15.1)
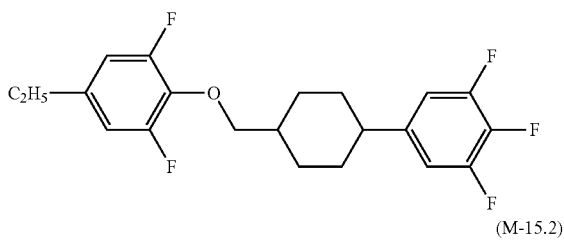

(M-15.2)
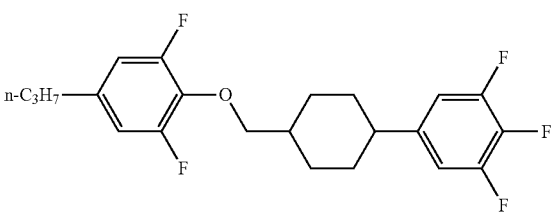

(M-15.3)
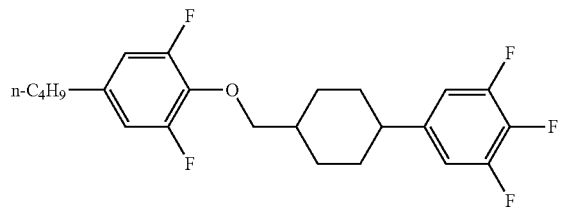

(M-15.4)
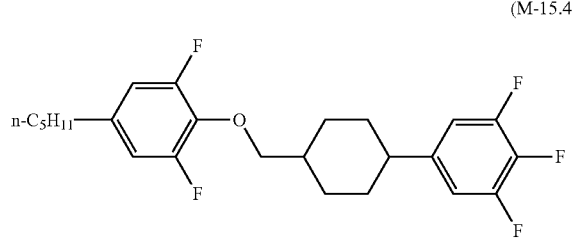

(M-15.5)
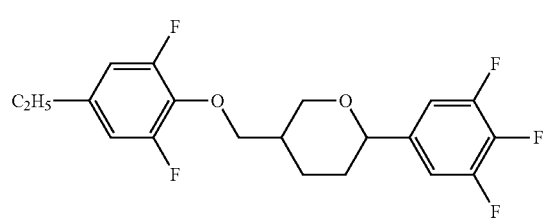

(M-15.6)
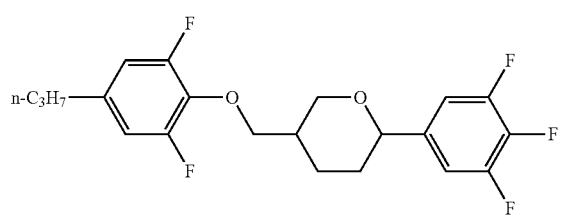

(M-15.7)
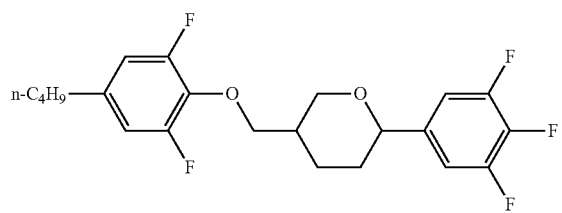

(M-15.8)
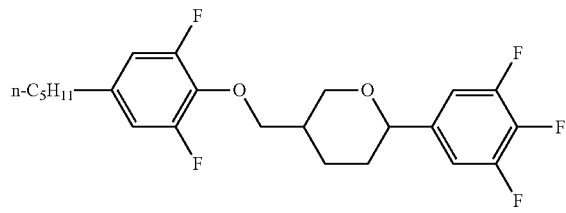

[Chem. 39]

(M-15.11)
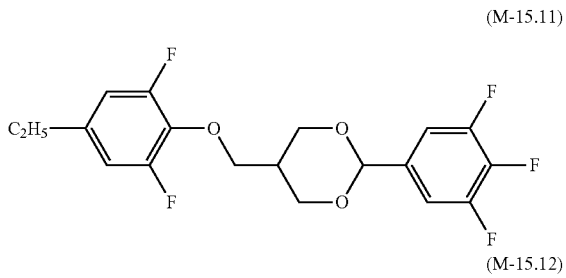

(M-15.12)
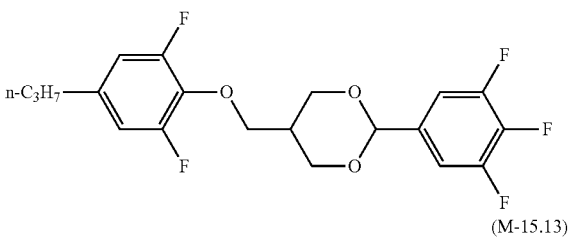

(M-15.13)
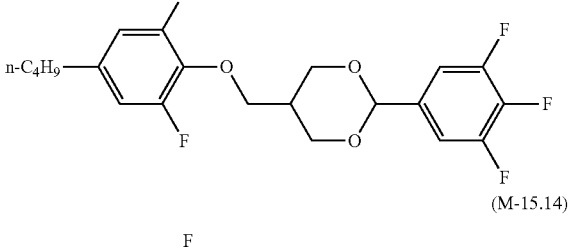

(M-15.14)
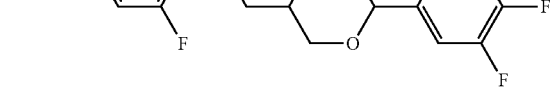

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-16) is as follows.

[Chem. 40]

(M-16)
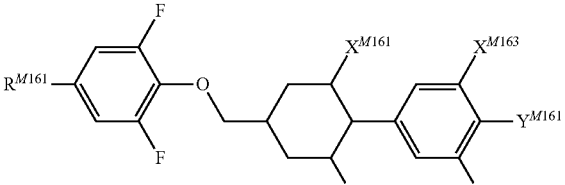

(in the formula, $X^{M161}$ to $X^{M164}$ each independently represent a fluorine atom or a hydrogen atom; $Y^{M161}$ represents a fluorine atom, a chlorine atom, or —$OCF_3$; and $R^{M161}$ represents an alkyl group having 1 to 5 carbon atoms, an alkenyl group having 2 to 5 carbon atoms, or an alkoxy group having 1 to 4 carbon atoms)

The lower limit of the preferred amount of the compound represented by General Formula (M-16) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-16), which is used in the liquid crystal composition of the liquid crystal layer in the present invention, is preferably any of compounds represented by Formulae (M-16.1) to (M-16.8); in particular, the compounds represented by Formulae (M-16.1) to (M-16.4) are preferably used.

[Chem.41]

(M-16.1)

(M-16.2)

(M-16.3)

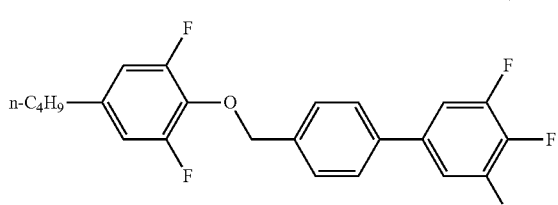

(M-16.4)

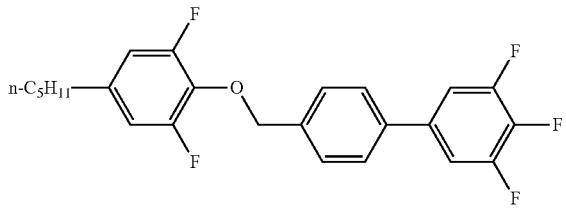

(M-16.5)

(M-16.6)

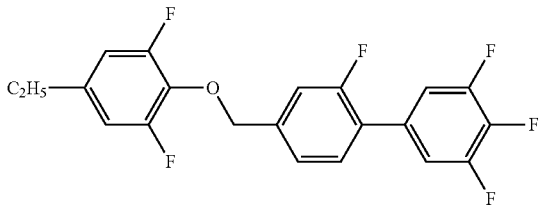

(M-16.7)

(M-16.8)

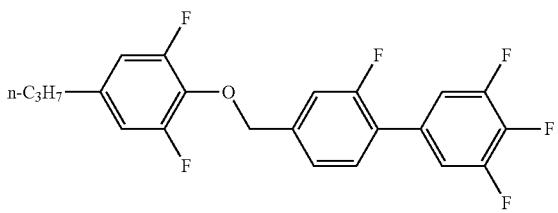

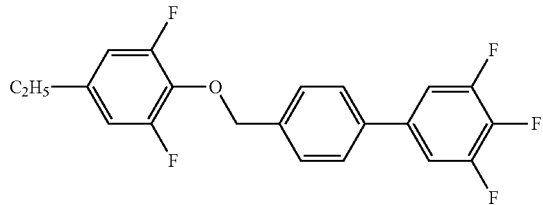

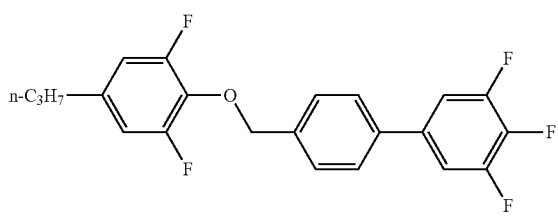

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-17) is as follows.

[Chem. 42]

(M-17)

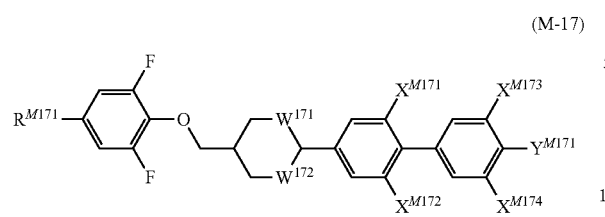

(in the formula, $X^{M171}$ to $X^{M174}$ each independently represent a fluorine atom or a hydrogen atom; $Y^{M171}$ represents a fluorine atom, a chlorine atom, or —OCF$_3$; $R^{M171}$ represents an alkyl group having 1 to 5 carbon atoms, an alkenyl group having 2 to 5 carbon atoms, or an alkoxy group having 1 to 4 carbon atoms; and $W^{M171}$ and $W^{M172}$ each independently represent —CH$_2$— or —O—)

The lower limit of the preferred amount of the compound represented by General Formula (M-17) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-17) is preferably any of compounds represented by Formulae (M-17.1) to (M-17.52); in particular, the compounds represented by Formulae (M-17.9) to (M-17.12), (M-17.21) to (M-17.28), and (M-17.45) to (M-17.48) are preferably used.

[Chem. 43]

(M-17.1)

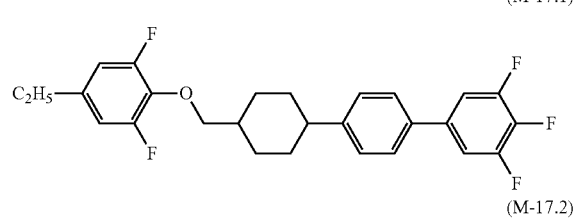

(M-17.2)

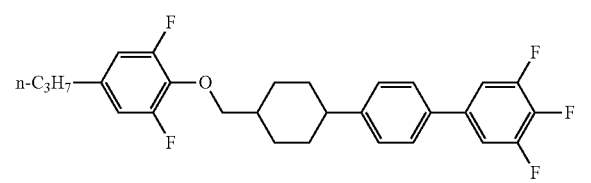

(M-17.3)

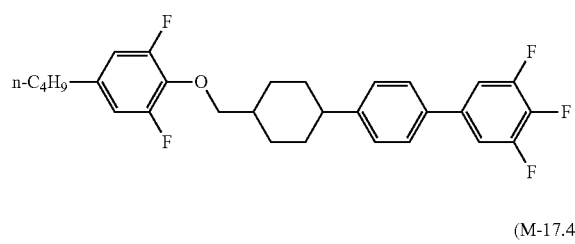

(M-17.4)

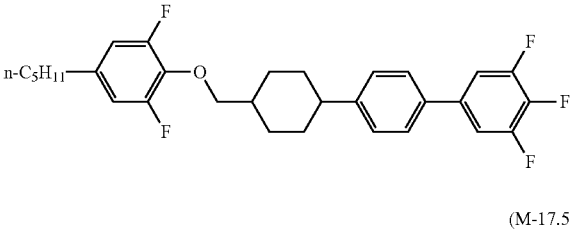

(M-17.5)

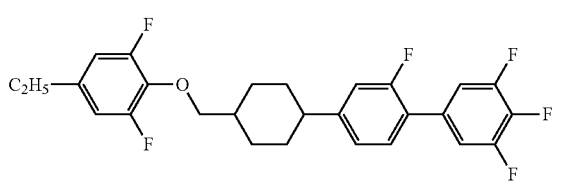

(M-17.6)

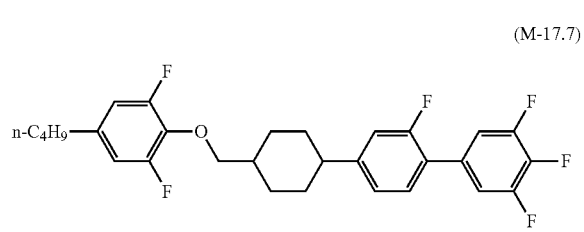

(M-17.7)

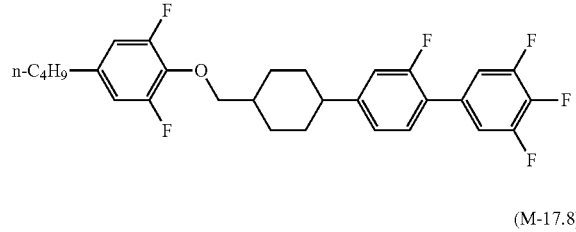

(M-17.8)

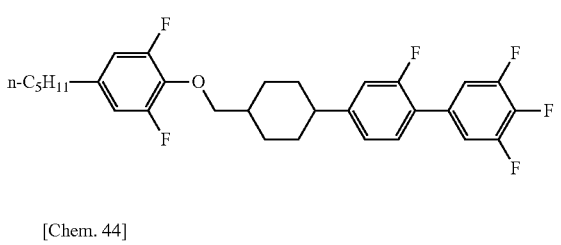

[Chem. 44]

(M-17.9)

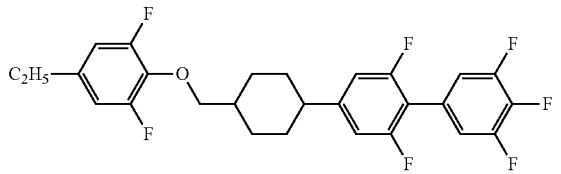

(M-17.10)
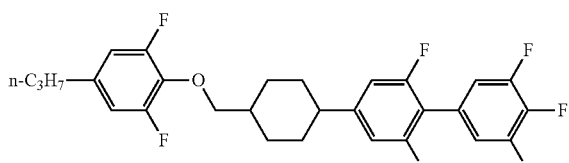
(M-17.11)
(M-17.12)
[Chem. 45]
(M-17.21)
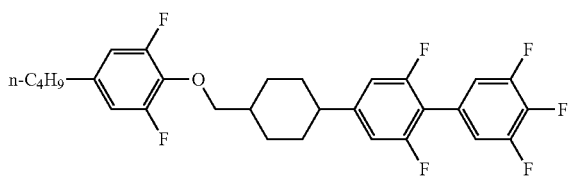
(M-17.22)
(M-17.23)
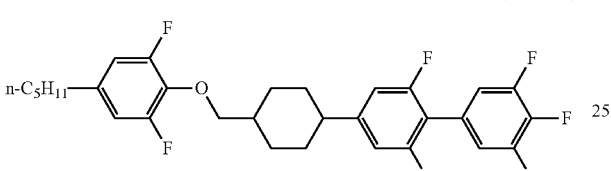
(M-17.24)
(M-17.25)
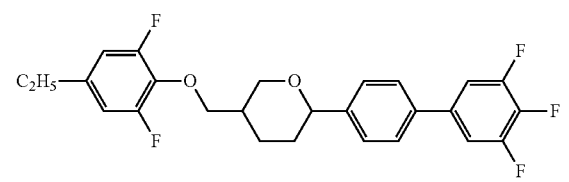
(M-17.26)
(M-17.27)
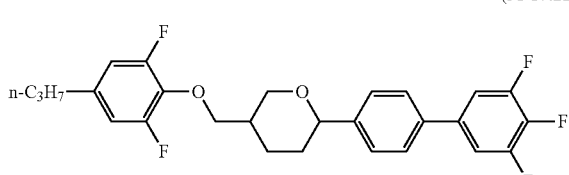
(M-17.28)
[Chem. 46]
(M-17.29)
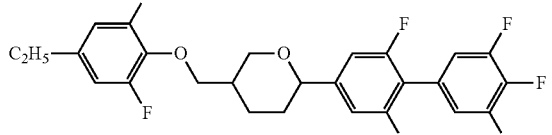
(M-17.30)
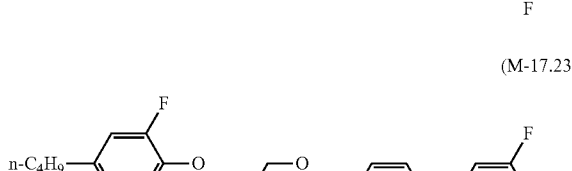
(M-17.31)
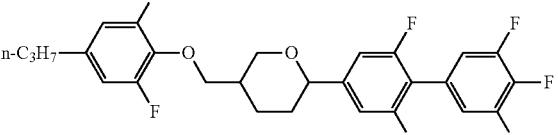
(M-17.32)
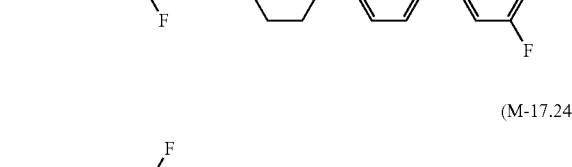
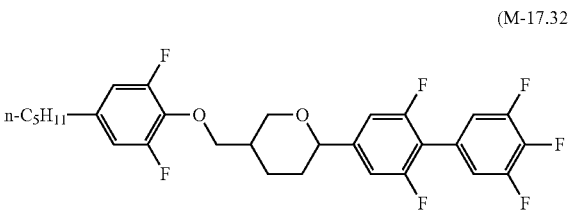

[Chem. 47]

(M-17.41)
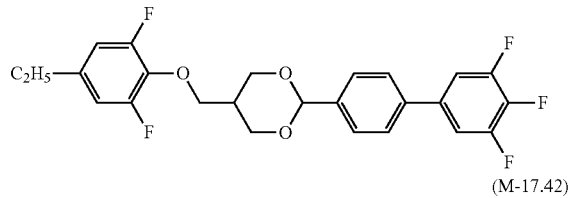

(M-17.42)

(M-17.43)

(M-17.44)

(M-17.45)

[Chem. 48]

(M-17.49)
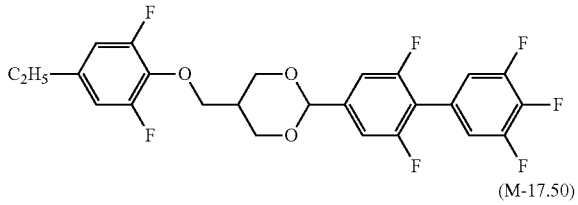

(M-17.50)

(M-17.51)

(M-17-52)

(M-17.46)
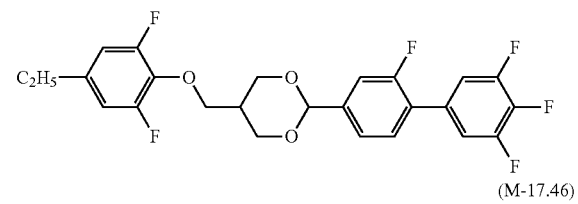

(M-17.47)
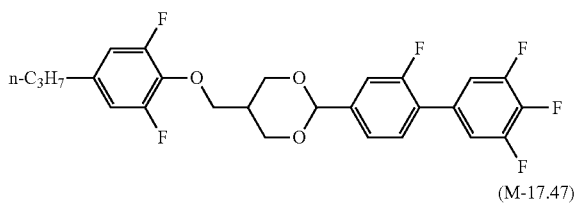

(M-17.48)
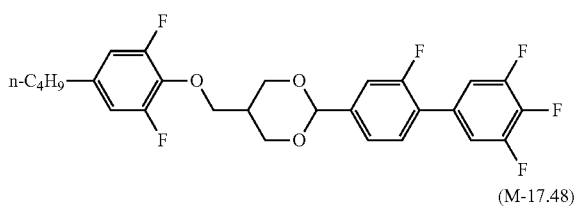

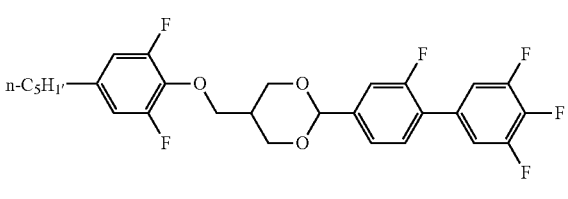

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

The compound represented by General Formula (M-18) is as follows.

[Chem. 49]

(M-18)
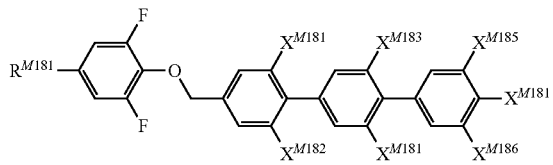

(in the formula, $X^{M181}$ to $X^{M186}$ each independently represent a fluorine atom or a hydrogen atom; $Y^{M181}$ represents a fluorine atom, a chlorine atom, or —OCF$_3$; and $R^{M181}$ represents an alkyl group having 1 to 5 carbon atoms, an alkenyl group having 2 to 5 carbon atoms, or an alkoxy group having 1 to 4 carbon atoms)

The lower limit of the preferred amount of the compound represented by General Formula (M-18) is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the liquid crystal composition used in the liquid crystal layer in the present invention needs to have a viscosity kept at a low level to contribute to a high response speed, it is preferred that the above-mentioned lower limit be low and that the upper limit be low. In the case where the liquid crystal composition needs to serve for a reduction in image-sticking, it is preferred that the above-mentioned lower limit be low and that the upper limit be low. In order to increase dielectric anisotropy for keeping driving voltage at a low level, it is preferred that the above-mentioned lower limit be high and that the upper limit be high.

Specifically, the compound represented by General Formula (M-18) is preferably any of compounds represented by Formulae (M-18.1) to (M-18.12); in particular, the compounds represented by Formulae (M-18.5) to (M-18.8) are preferably used.

[Chem. 50]

(M-18-1)
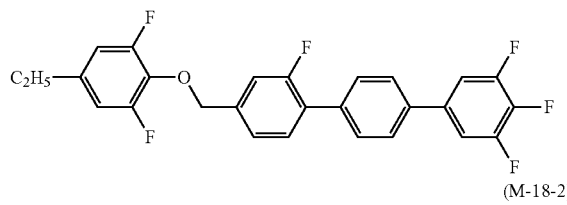

(M-18-2)
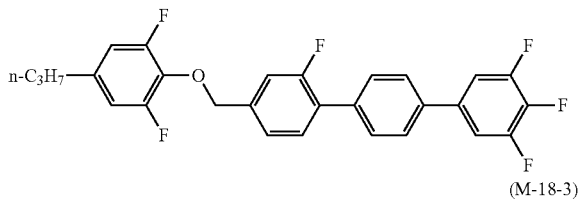

(M-18-3)
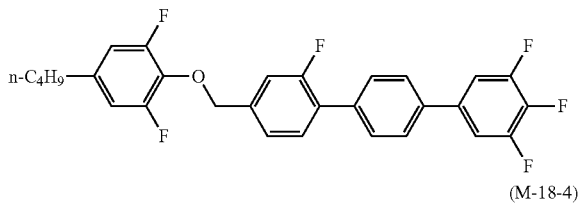

(M-18-4)
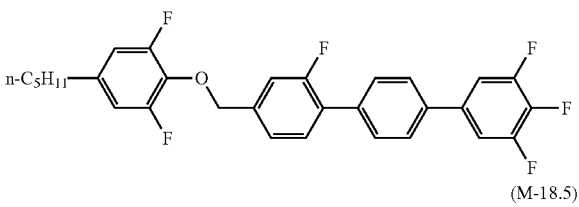

(M-18.5)
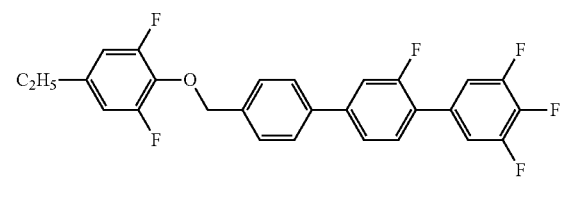

[Chem. 51]

(M-18.6)
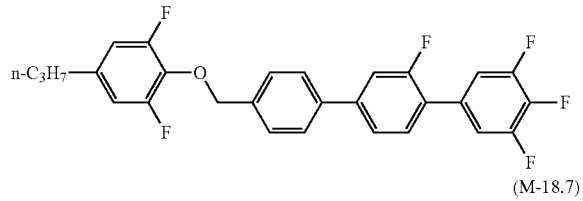

(M-18.7)
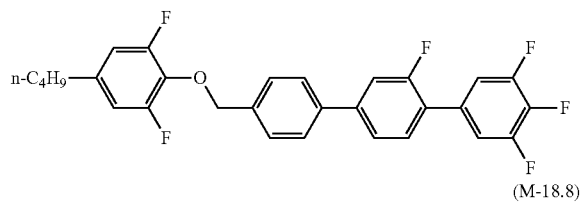

(M-18.8)
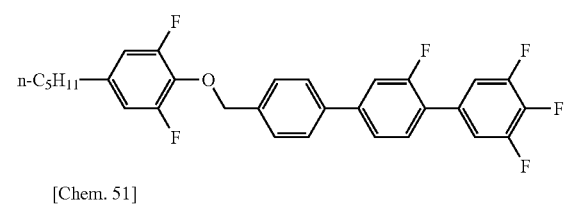

(M-18.9)
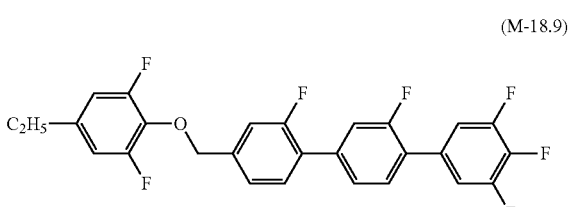

(M-18.10)
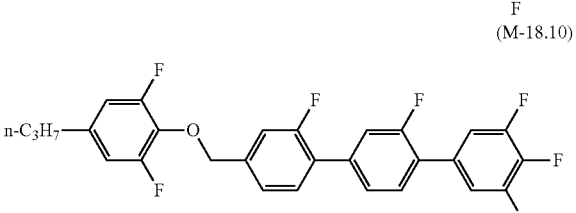

(M-18.11)
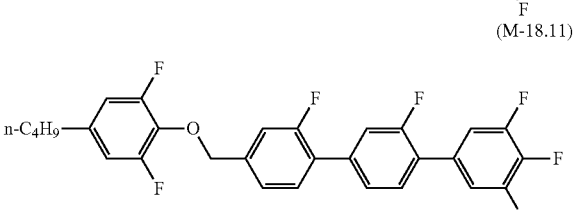

(M-18.12)
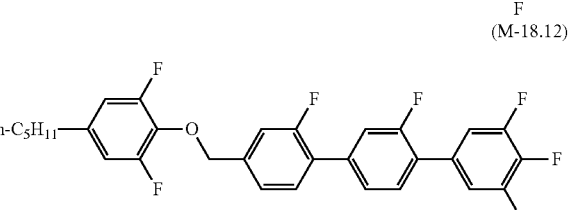

The lower limit of the preferred amount of these compounds is 1%, 2%, 4%, 5%, 8%, 10%, 13%, 15%, 18%, or 20% relative to the amount of the whole liquid crystal composition used in the liquid crystal layer in the present invention. The upper limit of the preferred amount is 30%, 28%, 25%, 23%, 20%, 18%, 15%, 13%, 10%, 8%, or 5% relative thereto.

In the case where the ring structures bonded to $R^{19}$ to $R^{30}$ in General Formulae (IIa) to (IIf) are phenyl groups (aromatics), $R^{19}$ to $R^{30}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{19}$ to $R^{30}$ are saturated rings such as cyclohexane, pyran, and dioxane, $R^{19}$ to $R^{30}$ are each preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{19}$ to $R^{30}$ are each preferably an alkyl group. In order to produce a liquid crystal display device in which the viscosity is small and which quickly responds, $R^{19}$ to $R^{30}$ are each preferably an alkenyl group. In order to give small viscosity and high nematic-isotropic phase transition temperature (Tni) and to make response speed faster, it is preferred that an alkenyl group of which the end group is not an unsaturated bond be employed, and it is especially preferred that a methyl group exist adjacent to an alkenyl group to serve as the end group. In order to give good solubility at low temperature, an approach in which $R^{19}$ to $R^{30}$ are each an alkoxy group is preferred, and another approach in which different $R^{19}$'s to $R^{30}$'s are present in combination is also preferred. For example, compounds in which $R^{19}$'s to $R^{30}$'s are alkyl groups or alkenyl groups having 2, 3, or 4 carbon atoms are preferably used in combination; compounds in which $R^{19}$'s to $R^{30}$'s have 3 or 5 carbon atoms are also preferably used in combination; and compounds in which $R^{19}$'s to $R^{30}$'s have 3, 4, or 5 carbon atoms are also preferably used in combination.

$R^{19}$ and $R^{20}$ are each preferably an alkyl group or an alkoxy group, and it is preferred that at least any one of them be an alkoxy group. It is more preferred that $R^{19}$ be an alkyl group and that $R^{20}$ be an alkoxy group. It is further preferred that $R^{19}$ be an alkyl group having 3 to 5 carbon atoms and that $R^{20}$ be an alkoxy group having 1 or 2 carbon atoms.

$R^{21}$ and $R^{22}$ are each preferably an alkyl group or an alkenyl group, and it is preferred that at least any one of them be an alkenyl group. The case where both of them are alkenyl groups is suitable for an enhancement in response speed; however, it is unsuitable for an improvement in the chemical stability in the liquid crystal display device.

At least any one of $R^{23}$ and $R^{24}$ is preferably an alkyl group having 1 to 5 carbon atoms, an alkoxy group having 1 to 5 carbon atoms, or an alkenyl group having 4 or 5 carbon atoms. In order to give a good balance between a response speed and Tni, it is preferred that at least any one of $R^{23}$ and $R^{24}$ be an alkenyl group; in order to give a good balance between a response speed and solubility at low temperature, it is preferred that at least any one of $R^{23}$ and $R^{24}$ be an alkoxy group.

At least any one of $R^{25}$ and $R^{26}$ is preferably an alkyl group having 1 to 5 carbon atoms, an alkoxy group having 1 to 5 carbon atoms, or an alkenyl group having 2 to 5 carbon atoms. In order to give a good balance between a response speed and Tni, it is preferred that at least any one of $R^{25}$ and $R^{26}$ be an alkenyl group; in order to give a good balance between a response speed and solubility at low temperature, it is preferred that at least any one of $R^{25}$ and $R^{26}$ be an alkoxy group. It is more preferred that $R^{25}$ be an alkenyl group and that $R^{26}$ be an alkyl group. It is also preferred that $R^{25}$ be an alkyl group and that $R^{26}$ be an alkoxy group.

At least any one of $R^{27}$ and $R^{28}$ is preferably an alkyl group having 1 to 5 carbon atoms, an alkoxy group having 1 to 5 carbon atoms, or an alkenyl group having 2 to 5 carbon atoms. In order to give a good balance between a response speed and Tni, it is preferred that at least any one of $R^{27}$ and $R^{28}$ be an alkenyl group; in order to give a good balance between a response speed and solubility at low temperature, it is preferred that at least any one of $R^{27}$ and $R^{28}$ be an alkoxy group. It is more preferred that $R^{27}$ be an alkyl group or an alkenyl group and that $R^{28}$ be an alkyl group. It is also preferred that $R^{27}$ be an alkyl group and that $R^{28}$ be an alkoxy group. It is especially preferred that $R^{27}$ be an alkyl group and that $R^{28}$ be an alkyl group. $X^{21}$ is preferably a fluorine atom.

At least any one of $R^{29}$ and $R^{30}$ is preferably an alkyl group having 1 to 5 carbon atoms or an alkenyl group having 4 or 5 carbon atoms. In order to give a good balance between a response speed and Tni, it is preferred that at least any one of $R^{29}$ and $R^{30}$ be an alkenyl group; in order to give good reliability, it is preferred that at least any one of $R^{29}$ and $R^{30}$ be an alkyl group. It is more preferred that $R^{29}$ be an alkyl group or an alkenyl group and that $R^{30}$ be an alkyl group or an alkenyl group. It is also preferred that $R^{29}$ be an alkyl group and that $R^{30}$ be an alkenyl group. It is also preferred that $R^{29}$ be an alkyl group and that $R^{30}$ be an alkyl group.

One to ten of compounds represented by General Formulae (II-a) to (II-f) are preferably used, and one to eight thereof are especially preferably used. The amount thereof is preferably in the range of 5 to 80 mass %, more preferably 10 to 70 mass %, and especially preferably 20 to 60 mass %.

The liquid crystal composition used in the liquid crystal layer in the present invention can further contain at least one compound selected from the group consisting of compounds represented by General Formulae (III-a) to (III-f).

[Chem. 52]

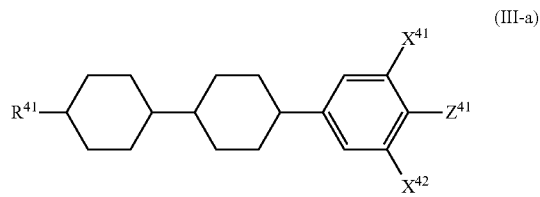

(III-a)

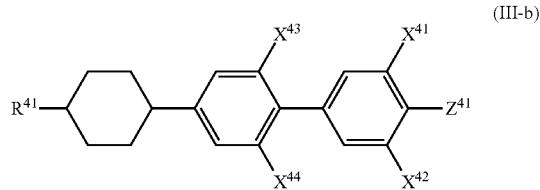

(III-b)

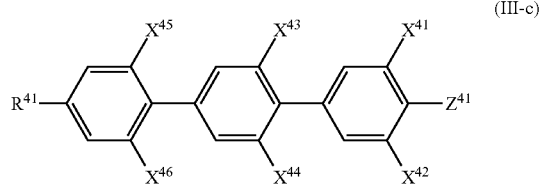

(III-c)

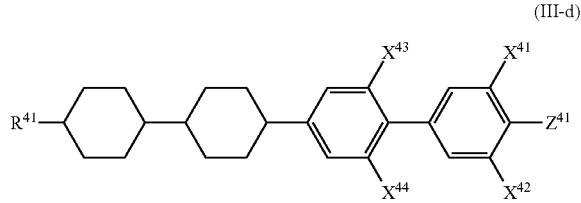

(III-d)

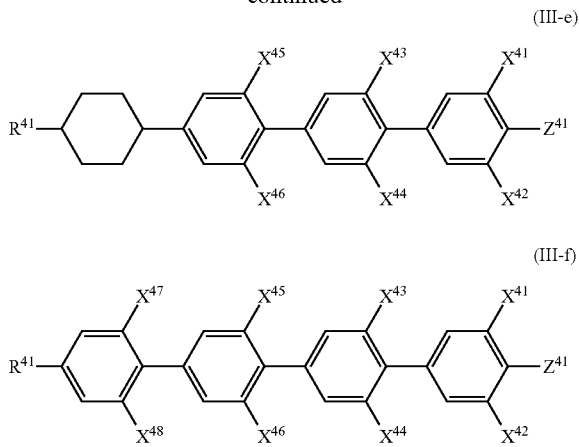

(III-e)

(III-f)

(in the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group)

In each of General Formulae (IIIa) to (IIIf), in the case where the ring structure bonded to $R^{41}$ is a phenyl group (aromatic), $R^{41}$ is preferably a linear alkyl group having 1 to 5 carbon atoms, a linear alkoxy group having 1 to 4 (or more) carbon atoms, or an alkenyl group having 4 or 5 carbon atoms; in the case where the ring structure bonded to $R^{41}$ is a saturated ring such as cyclohexane, pyran, or dioxane, $R^{41}$ is preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{41}$ is preferably an alkyl group. In order to produce a liquid crystal display device in which the viscosity is small and which quickly responds, $R^{41}$ is preferably an alkenyl group. In order to give small viscosity and high nematic-isotropic phase transition temperature (Tni) and to make response speed faster, it is preferred that an alkenyl group of which the end group is not an unsaturated bond be employed, and it is especially preferred that a methyl group exist adjacent to an alkenyl group to serve as the end group. In order to give good solubility at low temperature, an approach in which $R^{41}$ is an alkoxy group is preferred, and another approach in which different $R^{41}$'s are present in combination is also preferred. For example, compounds in which $R^{41}$'s are alkyl groups or alkenyl groups having 2, 3, or 4 carbon atoms are preferably used in combination; compounds in which $R^{41}$'s have 3 or 5 carbon atoms are also preferably used in combination; and compounds in which $R^{41}$'s have 3, 4, or 5 carbon atoms are also preferably used in combination.

It is preferred that at least any one of $X^{41}$ and $X^{42}$ be a fluorine atom, and it is more preferred that both of them be fluorine atoms.

$Z^{41}$ is preferably a fluorine atom or a trifluoromethoxy group.

In an embodiment, $X^{41}$, $X^{42}$, and $Z^{41}$ are as follows: $X^{41}$=F, $X^{42}$=F, and $Z^{41}$=F. In another embodiment, $X^{41}$, $X^{42}$, and $Z^{41}$ are as follows: $X^{41}$=F, $X^{42}$=H, and $Z^{41}$=F. In another embodiment, $X^{41}$, $X^{42}$, and $Z^{41}$ are as follows: $X^{41}$=F, $X^{42}$=H, and $Z^{41}$=OCF3. In another embodiment,
$X^{41}$, $X^{42}$, and $Z^{41}$ are as follows: $X^{41}$=F, $X^{42}$=F, and $Z^{41}$=OCF3. In another embodiment, $X^{41}$, $X^{42}$, and $Z^{41}$ are as follows: $X^{41}$=H, $X^{42}$=H, and $Z^{41}$=OCF3.

At least any one of $X^{43}$ and $X^{44}$ is preferably a fluorine atom. In order to give a large $\Delta\in$, it is preferred that both of them be fluorine atoms; in order to give good solubility at low temperature, it is not preferred that both of them be fluorine atoms.

It is preferred that at least any one of $X^{45}$ and $X^{46}$ be a hydrogen atom, and it is also preferred that both of them be hydrogen atoms. An excess of fluorine atoms is not preferred in terms of Tni, solubility at low temperature, and the chemical stability of the compound in the liquid crystal display device.

It is preferred that at least any one of $X^{47}$ and $X^{48}$ be a hydrogen atom, and it is also preferred that both of them be hydrogen atoms. The case where at least any one of $X^{47}$ and $X^{48}$ is a fluorine atom is not preferred in terms of Tni, solubility at low temperature, and the chemical stability of the compound in the liquid crystal display device.

One to ten compounds are preferably selected from the group consisting of compounds represented by General Formulae (III-a) to (III-f), and one to eight compounds are more preferably selected. The amount thereof is preferably in the range of 5 to 50 mass %, and more preferably 10 to 40 mass %.

The liquid crystal composition used in the liquid crystal layer in the liquid crystal display device of the present invention preferably has $\Delta\in$ of not less than +1.5 at 25° C. For high response speed, the $\Delta\in$ is preferably in the range of +1.5 to +4.0, and more preferably +1.5 to +3.0. For driving at low voltage, the $\Delta\in$ is preferably in the range of +8.0 to +18.0, and more preferably +10.0 to +15.0. The liquid crystal composition preferably has $\Delta n$ ranging from 0.08 to 0.14, and more preferably from 0.09 to 0.13 at 25° C. In particular, the $\Delta n$ is preferably from 0.10 to 0.13 for a thin cell gap and preferably from 0.08 to 0.10 for a thick cell gap. The liquid crystal composition preferably has T ranging from 5 to 45 mPa·s, more preferably 5 to 25 mPa·s, and especially preferably 10 to 20 mPa·s at 20° C. The liquid crystal composition preferably has $T_{ni}$ ranging from 60° C. to 120° C., more preferably 70° C. to 100° C., and especially preferably 70° C. to 85° C.

The liquid crystal composition used in the liquid crystal layer in the present invention may contain, for example, general nematic liquid crystal, smectic liquid crystal, and cholesteric liquid crystal in addition to the above-mentioned compounds.

The liquid crystal composition used in the liquid crystal layer in the liquid crystal display device of the present invention can contain at least one polymerizable compound for production of a liquid crystal display device of a PS mode, a PSA mode involving use of a horizontal electric field, or a PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which multiple six-membered rings are bonded to each other, such as biphenyl derivatives and terphenyl derivatives. Specifically, the polymerizable compound is preferably a difunctional monomer represented by General Formula (V).

[Chem. 53]

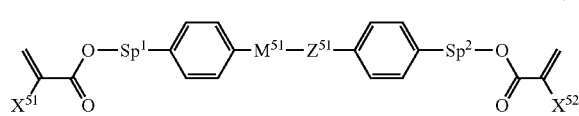
(V)

(in the formula, $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer from 2 to 7, and the oxygen atom is bonded to an aromatic ring); $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—OCO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and $M^{51}$ represents a 1,4-phenylene group, a trans-1,4-cyclohexylene group, or a single bond, and in each 1,4-phenylene group in the formula, any hydrogen atom is optionally substituted with a fluorine atom)

Diacrylate derivatives in which $X^{51}$ and $X^{52}$ each represent a hydrogen atom and dimethacrylate derivatives in which $X^{51}$ and $X^{52}$ are each a methyl group are preferred, and compounds in which one of $X^{51}$ and $X^{52}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^1$ and $Sp^2$ each independently represent a single bond, an alkylene group having 1 to 8 carbon atoms, or —O—$(CH_2)_s$—; in an application to PSA display devices, at least one of $Sp^1$ and $Sp^2$ is preferably a single bond, and compounds in which $Sp^1$ and $Sp^2$ each represent a single bond and compounds in which one of $Sp^1$ and $Sp^2$ is a single bond and in which the other one thereof represents an alkylene group having 1 to 8 carbon atoms or —O—$(CH_2)_s$— are preferred. In this case, an alkyl group having 1 to 4 is preferably employed, and s preferably ranges from 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{51}$ represents a 1,4-phenylene group of which any hydrogen atom is optionally substituted with a fluorine atom, a trans-1,4-cyclohexylene group, or a single bond; and a 1,4-phenylene group and a single bond are preferred. In the case where C does not represent a single bond but represents a ring structure, $Z^{51}$ preferably represents a linking group as well as a single bond; in the case where $M^{51}$ represents a single bond, $Z^{51}$ is preferably a single bond.

From these viewpoints, a preferred ring structure between $Sp^1$ and $Sp^2$ in General Formula (V) is particularly as follows.

In General Formula (V), in the case where $M^{51}$ represents a single bond and where the ring structure consists of two rings, the ring structure is preferably represented by any of Formulae (Va-1) to (Va-5), more preferably Formulae (Va-1) to (Va-3), and especially preferably Formula (Va-1).

[Chem. 54]

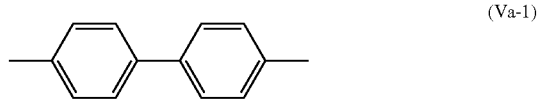
(Va-1)

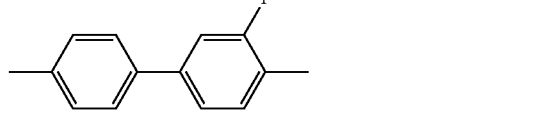
(Va-2)

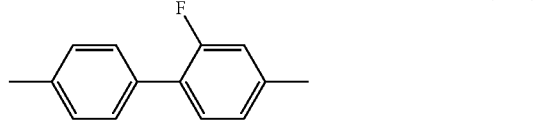
(Va-3)

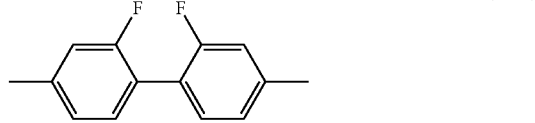
(Va-4)

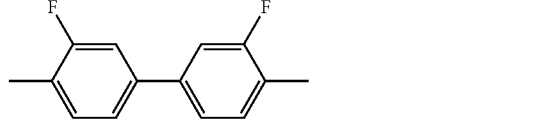
(Va-5)

(in the formulae, the two ends of each structure are bonded to $Sp^1$ and $Sp^2$, respectively)

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable compound is especially preferably any of compounds represented by General Formulae (V-1) to (V-4), and most preferably the compound represented by General Formula (V-2).

[Chem. 55]

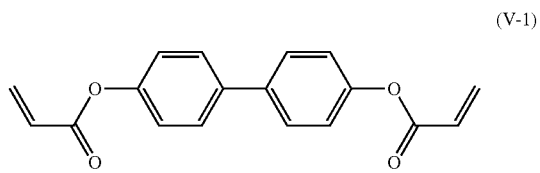
(V-1)

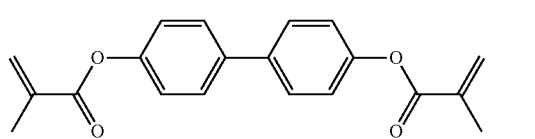
(V-2)

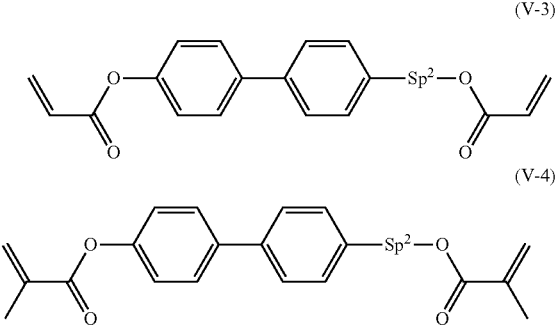

(V-3)

(V-4)

(in the formulae, $Sp^2$ represents an alkylene group having 2 to 5 carbon atoms)

In the case where the polymerizable compound is added to the liquid crystal composition used in the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

In the liquid crystal composition containing the polymerizable compound, the polymerizable compound is polymerized by being irradiated with ultraviolet, so that liquid crystal molecules can be aligned; thus, such a liquid crystal composition is used in liquid crystal display devices in which the birefringence of the liquid crystal composition is utilized for control of the amount of light that is to be transmitted. Such a liquid crystal composition is useful for liquid crystal display devices, such as an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

(Retardation Layer)
(Polymerizable Liquid Crystal Compound)

In the retardation layer in the liquid crystal display device of the present invention, an optically anisotropic body produced through polymerization of a polymerizable liquid crystal composition that contains 25 weight % or more of a liquid crystal compound having two or more polymerizable functional groups.

The liquid crystal compound having polymerizable functional groups (polymerizable liquid crystal compound) has liquid crystal properties when it is used in combination with another liquid crystal compound in a composition. The polymerizable liquid crystal compound alone does not need to have liquid crystal properties.

Examples of the polymerizable liquid crystal compound include rod-like polymerizable liquid crystal compounds each having a polymerizable functional group, such as a vinyl group, an acryl group, or a (meth)acryl group, and a rigid part called mesogen in which multiple structures such as 1,4-phenylene group and a 1,4-cyclohexylene group are boded to each other, which are disclosed in *Handbook of Liquid Crystals* (D. Demus, J. W. Goodby, G. W. Gray, H. W. Spiess, V. Vill, Eds.; Wiley-VCH: 1998); Ekisho no Kagaku. *Kikan kagaku sosetsu* No. 22. (The Chemical Society of Japan: 1994); and Japanese Unexamined Patent Application Publication Nos. 7-294735, 8-3111, 8-29618, 11-80090, 11-116538, and 11-148079, and rod-like polymerizable liquid crystal compounds each having a maleimide group, which are disclosed in Japanese Unexamined Patent Application Publication Nos. 2004-2373 and 2004-99446. In particular, the rod-like liquid crystal compound having a polymerizable group is preferred because it can be easily produced so as to have a liquid crystal temperature within a range including a low temperature close to room temperature.

The optically anisotropic body has a mesogenic group or mesogenic supporting group in its structure. The mesogenic group or mesogenic supporting group is preferably represented by General Formula (AA).

[Chem. 56]

—Z0-(A1-Z1)$_n$-(A2-Z2)$_l$-(A3-Z3)$_k$-A4-Z4-A5-Z5-   (AA)

(in the formula, A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and may have, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms; Z0, Z1, Z2, Z3, Z4, and Z5 each independently represent —COO—, —OCO—, —CH$_2$CH$_2$—, —OCH$_2$—, —CH$_2$O—, —CH═CH—, —C≡C—, —CH═CHCOO—, —OCOCH═CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond; and n, l, and k each independently represent 0 or 1 and satisfy the relationship of 0≤n+l+k≤3)

The polymerizable liquid crystal composition used in the present invention contains at least one polymerizable liquid crystal compound, a polymerization initiator, and optionally a surfactant and another additive.

In particular, the liquid crystal compound having two or more polymerizable functional groups is preferably any of compounds represented by General Formula (1).

[Chem. 57]

P$^1$(Sp$^1$)$_{m1}$-MG-R$^1$   (1)

In the formula, P$^1$ represents a polymerizable functional group; Sp$^1$ represents an alkylene group having 0 to 18 carbon atoms; (the alkylene group is optionally substituted with at least one halogen atom, CN group, or alkyl group having 1 to 8 carbon atoms and a polymerizable functional group; one CH$_2$ group or two or more CH$_2$ groups not adjoining each other in the alkylene group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other); m1 represents 0 or 1; MG represents a mesogenic group or a mesogenic supporting group; R$^1$ represents a hydrogen atom, a halogen atom, a cyano group, or an alkyl group having 1 to 18 carbon atoms; the alkyl group is optionally substituted with at least one halogen atom or CN; one CH$_2$ group or two or more CH$_2$ groups not adjoining each other in the alkyl group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other; alternatively, R$^1$ is represented by General Formula (1-a)

[Chem. 58]

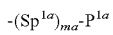

(1-a)

(in the formula, P$^{1a}$ represents a polymerizable functional group, Sp$^{1a}$ has the same meaning as Sp$^1$, and ma represents 0 or 1); and MG is a mesogenic group or mesogenic supporting group represented by General Formula (1-b)

[Chem. 59]

—Z0-(A1-Z1)$_n$-(A2-Z2)$_l$-(A3-Z3)$_k$-A4-Z4-A5-Z5— (1-b)

(in the formula, A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and may have, as a substituent, at least one selected from F, Cl, CF$_3$, OCF$_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms or at least one substituent represented by General Formula (1-c)

[Chem. 60]

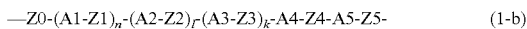

(1-c)

(in the formula, P$^c$ represents a polymerizable functional group; A represents —O—, —COO—, —OCO—, —OCH$_2$—, —CH$_2$O—, —CH$_2$CH$_2$OCO—, —COOCH$_2$CH$_2$—, —OCOCH$_2$CH$_2$—, or a single bond; Sp$^{1c}$ has the same meaning as Sp$^1$; n1 represents 0 or 1; and mc represents 0 or 1); Z0, Z1, Z2, Z3, Z4, and Z5 each independently represent —COO—, —OCO—, —CH$_2$CH$_2$—, —OCH$_2$—. —CH$_2$O—, —CH═CH—, —C≡C—, —CH═CHCOO—, —OCOCH═CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond; and n, l, and k each independently represent 0 or 1 and satisfy the relationship of 0≤n+l+k≤3) In the formula, two or more polymerizable functional groups are present.

P$^1$, P$^{1a}$, and P$^c$ each preferably represent a substituent selected from polymerizable groups represented by Formulae (P-1) to (P-20).

[Chem. 61]

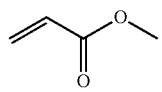

(P-1)

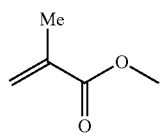

(P-2)

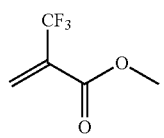

(P-3)

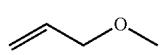

(P-4)

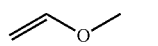

(P-5)

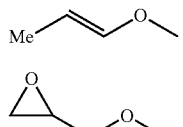

(P-6)

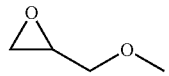

(P-7)

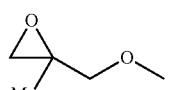

(P-8)

(P-9)

(P-10)

(P-11)

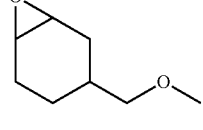

(P-12)

-continued

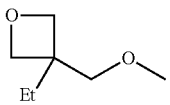
(P-13)

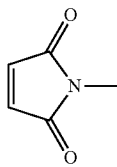
(P-14)

HS— (P-15)

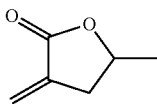
(P-16)

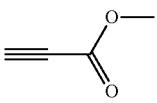
(P-17)

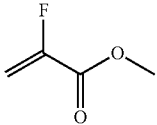
(P-18)

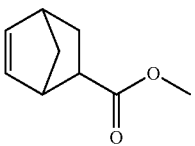
(P-19)

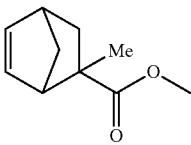
(P-20)

Of these polymerizable functional groups, the groups represented by Formula (P-1) and Formulae (P-2), (P-7), (P-12), and (P-13) are preferred in order to improve polymerizability and storage stability; and the groups represented by Formulae (P-1), (P-7), and (P-12) are more preferred.

At least one liquid crystal compound having two or more polymerizable functional groups can be used; one to six compounds are preferably used, and two to five compounds are more preferably used.

The amount of the liquid crystal compound having two or more polymerizable functional groups is preferably in the range of 25 to 100 mass %, more preferably 30 to 100 mass %, and especially preferably 35 to 100 mass % in the polymerizable liquid crystal composition.

The liquid crystal compound having two or more polymerizable functional groups is preferably a compound having two polymerizable functional groups, and preferably any of compounds represented by General Formula (2).

[Chem. 62]

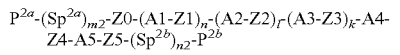
(2)

In the formula, A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4, 5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and may have, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms; Z0, Z1, Z2, Z3, Z4, and Z5 each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond; and n, l, and k each independently represent 0 or 1 and satisfy the relationship of 0≤n+l+k≤3.

$P^{2a}$ and $P^{2b}$ each represent a polymerizable functional group; $Sp^{2a}$ and $Sp^{2b}$ each independently represent an alkylene group having 0 to 18 carbon atoms (the alkylene group is optionally substituted with at least one halogen atom or CN; one CH$_2$ group or two or more CH$_2$ groups not adjoining each other in the alkylene group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other); and m2 and n2 each independently represent 0 or 1.

n, l, and k each independently represent 0 or 1 and satisfy the relationship of 0≤n+l+k≤3.

$P^{2a}$ and $P^{2b}$ each preferably represent a substituent selected from polymerizable groups represented by Formulae (P-1) to (P-20).

[Chem. 63]

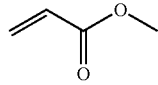
(P-1)

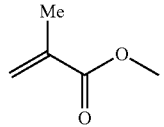
(P-2)

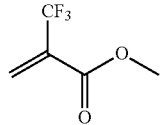
(P-3)

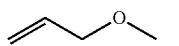 (P-4)

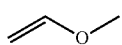 (P-5)

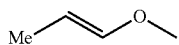 (P-6)

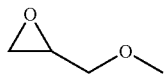 (P-7)

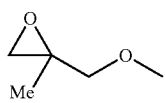 (P-8)

 (P-9)

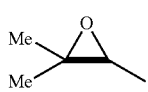 (P-10)

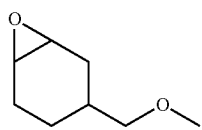 (P-11)

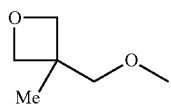 (P-12)

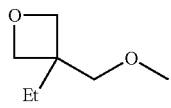 (P-13)

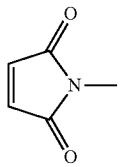 (P-14)

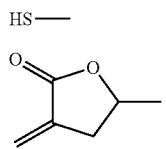 (P-15)

(P-16)

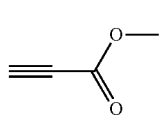 (P-17)

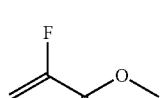 (P-18)

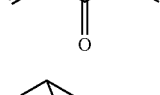 (P-19)

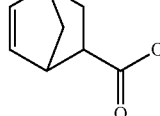 (P-20)

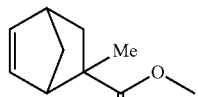

Of these polymerizable functional groups, the groups represented by Formula (P-1) and Formulae (P-2), (P-7), (P-12), and (P-13) are preferred in order to improve polymerizability and storage stability; and the groups represented by Formulae (P-1), (P-7), and (P-12) are more preferred.

Examples of General Formula (2) include, but are not limited to, General Formulae (2-1) to (2-4).

[Chem. 64]

$$P^{2a}\text{-}(Sp^{2a})_{m2}\text{-}Z0\text{-}A4\text{-}Z4\text{-}A5\text{-}Z5\text{-}(Sp^{2b})_{n2}\text{-}P^{2b} \quad (2\text{-}1)$$

$$P^{2a}\text{-}(Sp^{2a})_{m2}\text{-}Z0\text{-}A3\text{-}Z3\text{-}A4\text{-}Z4\text{-}A5\text{-}Z5\text{-}(Sp^{2b})_{n2}\text{-}P^{2b} \quad (2\text{-}2)$$

$$P^{2a}\text{-}(Sp^{2a})_{m2}\text{-}Z0\text{-}A2\text{-}Z2\text{-}A3\text{-}Z3\text{-}A4\text{-}Z4\text{-}A5\text{-}Z5\text{-}(Sp^{2b})_{n2}\text{-}P^{2b} \quad (2\text{-}3)$$

$$P^{2a}\text{-}(Sp^{2a})_{m2}\text{-}Z0\text{-}A1\text{-}Z1\text{-}A2\text{-}Z2\text{-}A3\text{-}Z3\text{-}A4\text{-}Z4\text{-}A5\text{-}Z5\text{-}(Sp^{2b})_{n2}\text{-}P^{2b} \quad (2\text{-}4)$$

In the formulae, $P^{2a}$, $P^{2b}$, $Sp^{2a}$, $Sp^{2b}$, A1, A2, A3, A4, A5, Z0, Z1, Z2, Z3, Z4, Z5, m2, and n2 have the same definitions as those in General Formula (2).

Specific examples of the polymerizable liquid crystal compound having two polymerizable functional groups include, but are not limited to, compounds represented by Formulae (2-5) to (2-29).

[Chem. 65]

(2-5)

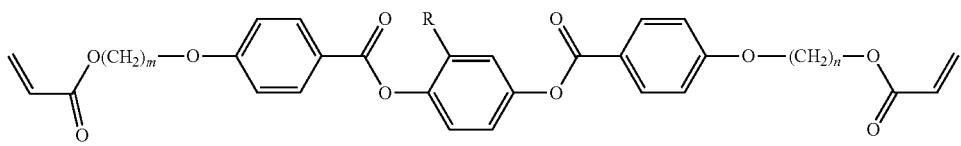

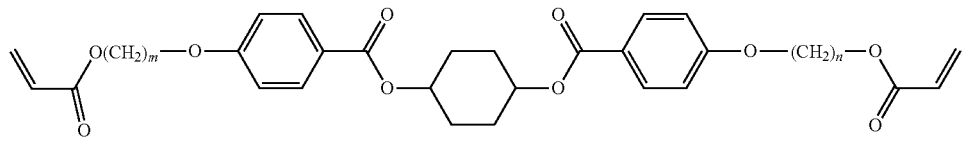
(2-6)
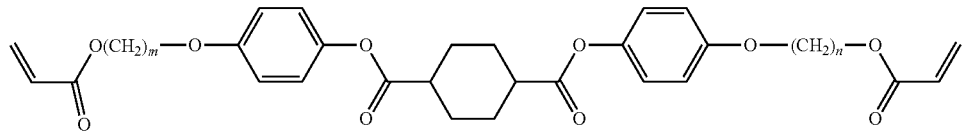
(2-7)
[Chem. 66]
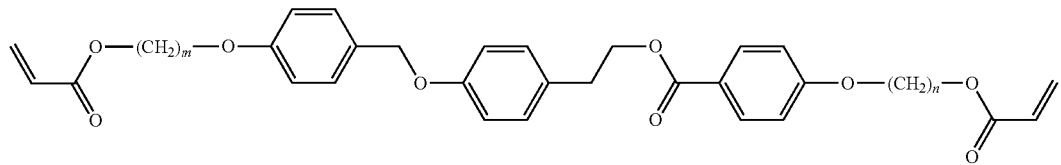
(2-8)
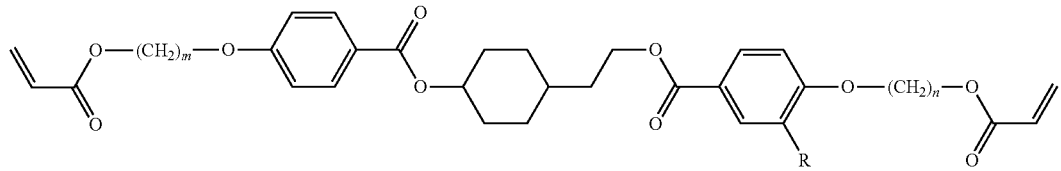
(2-9)
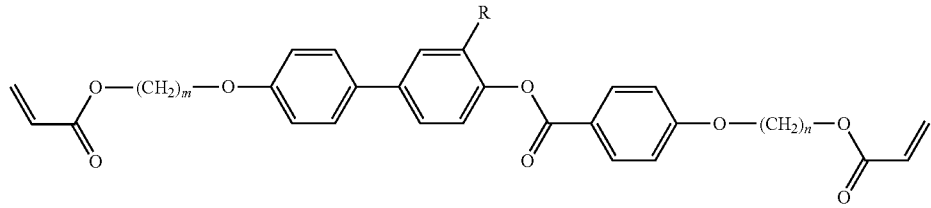
(2-10)
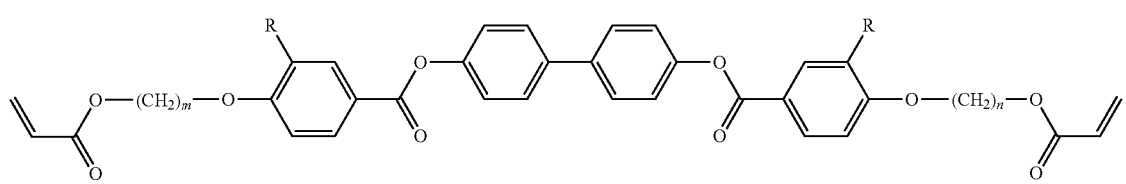
(2-11)
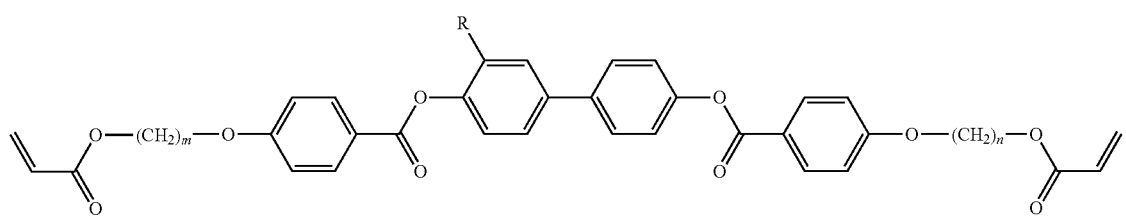
(2-12)
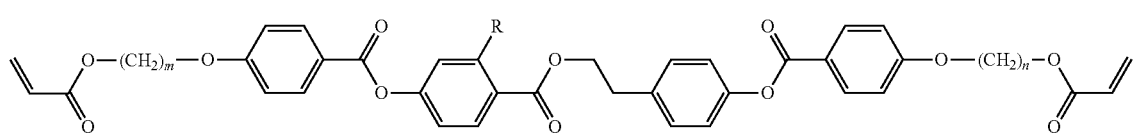
(2-13)

-continued
[Chem. 67]
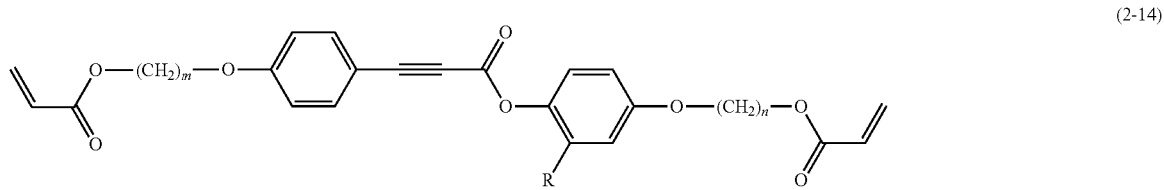
(2-14)
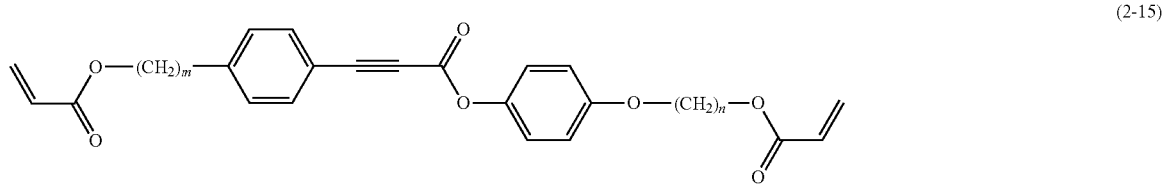
(2-15)
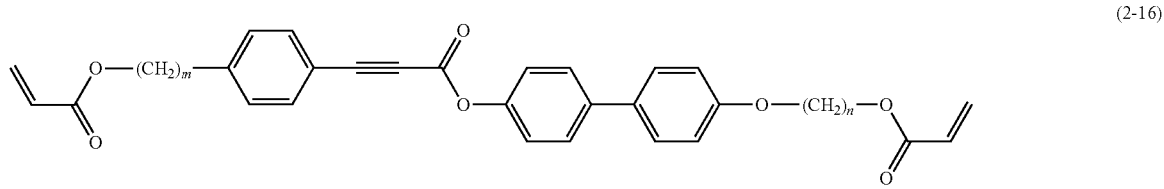
(2-16)
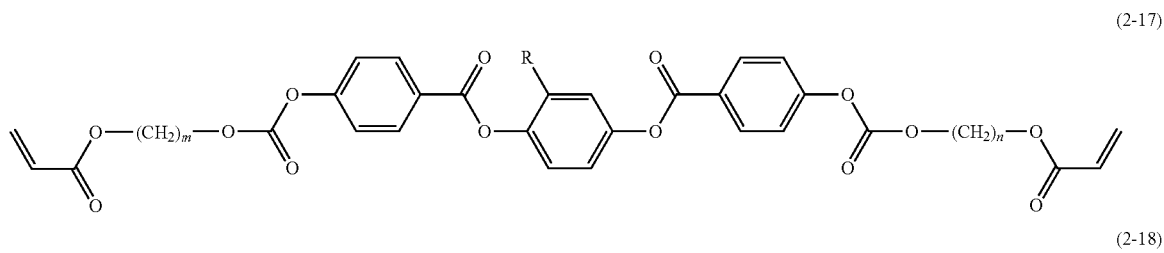
(2-17)
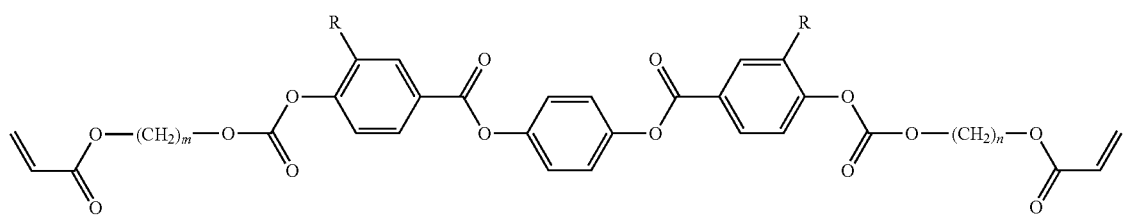
(2-18)
[Chem. 68]
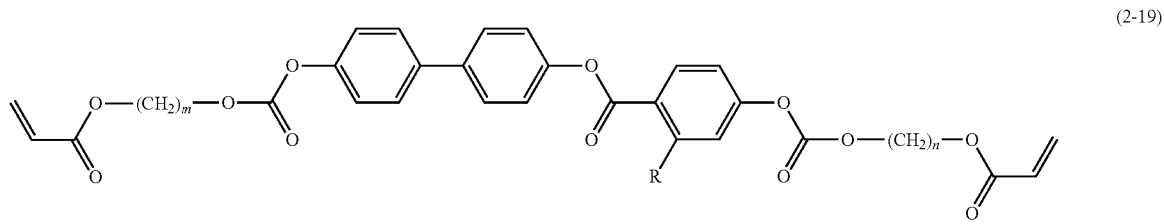
(2-19)
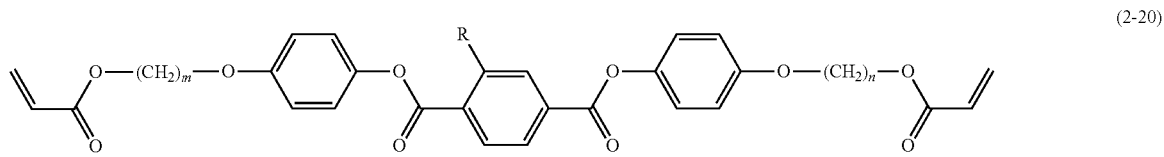
(2-20)
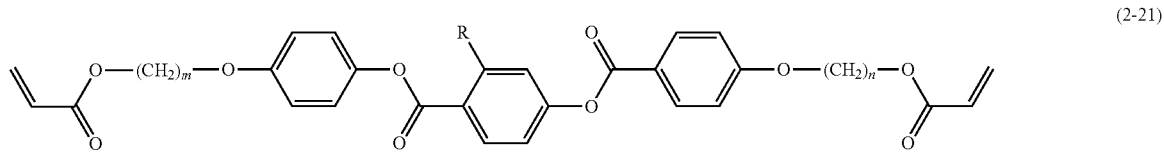
(2-21)

(2-22)
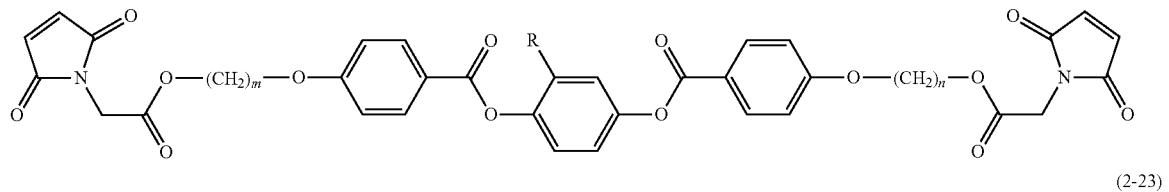
(2-23)
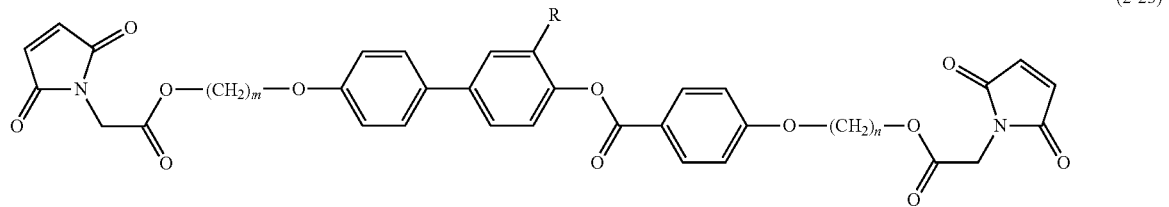
[Chem. 69]
(2-24)
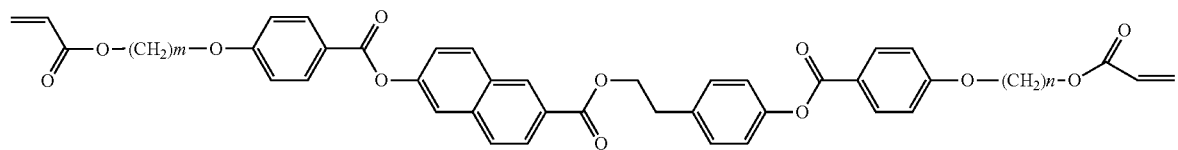
(2-25)
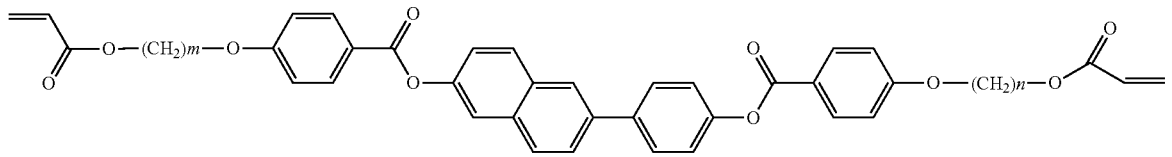
(2-26)
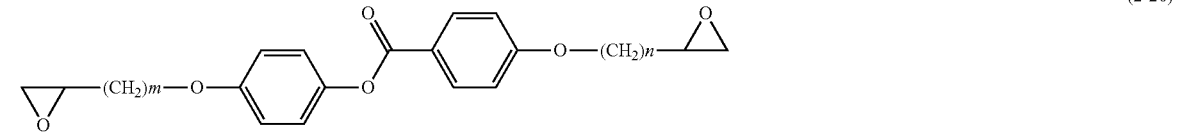
(2-27)
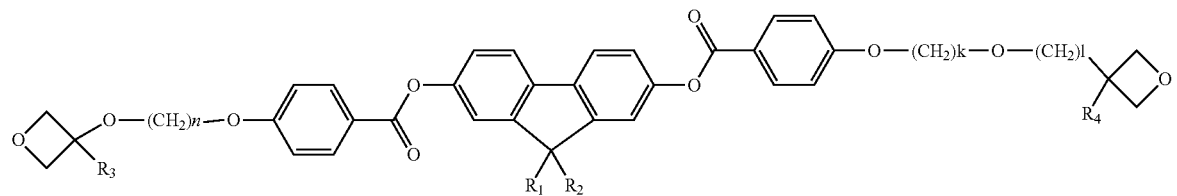
(2-28)
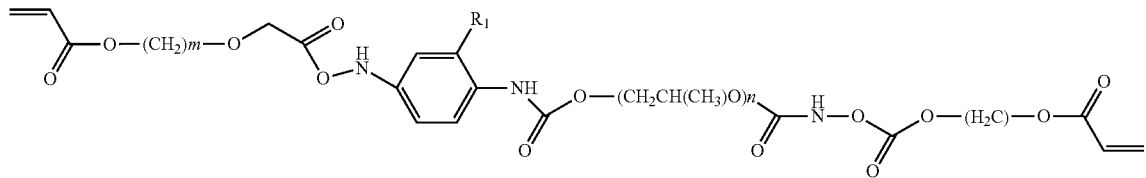
(2-29)
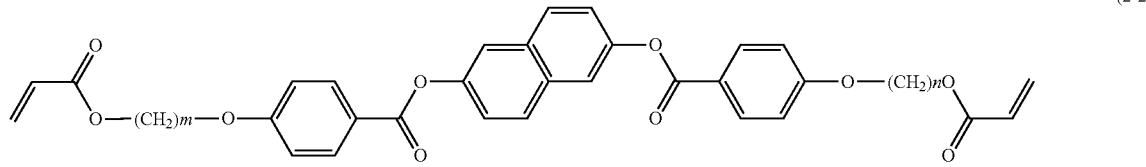

In the formulae, m and n each independently represent an integer from 1 to 18; R's each represent a hydrogen atom, a halogen atom, an alkyl group having 1 to 6 carbon atoms, an alkoxy group having 1 to 6 carbon atoms, or a cyano group; in the case where R's are each an alkyl group having 1 to 6 carbon atoms or an alkoxy group having 1 to 6 carbon atoms, each of them may be unsubstituted or substituted with one or more halogen atoms.

At least one liquid crystal compound having two polymerizable functional groups can be used; one to five compounds are preferably used, and two to five compounds are more preferably used.

The amount of the liquid crystal compound having two polymerizable functional groups is preferably in the range of 25 to 100 mass %, more preferably 30 to 100 mass %, and especially preferably 35 to 100 mass % in the polymerizable composition.

The liquid crystal compound having two or more polymerizable functional groups is also preferably a compound having three polymerizable functional groups. Examples thereof include, but are not limited to, compounds represented by General Formulae (3-1) to (3-18).

[Chem. 70]

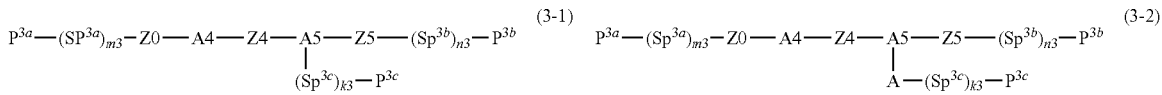
(3-1)

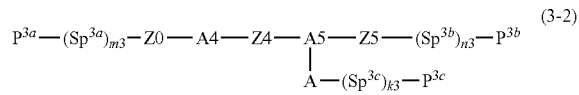
(3-2)

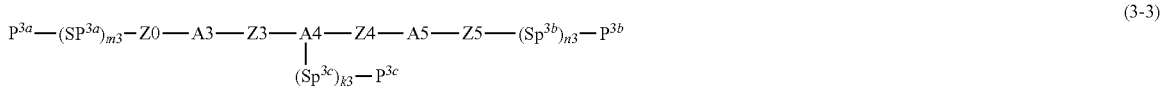
(3-3)

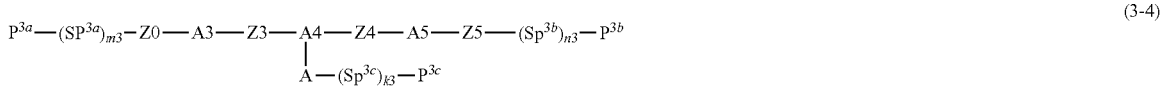
(3-4)

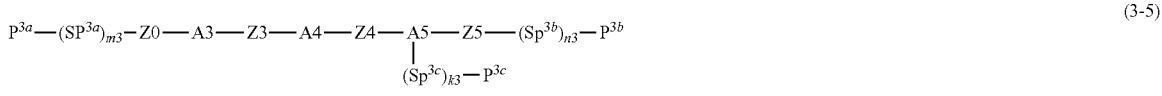
(3-5)

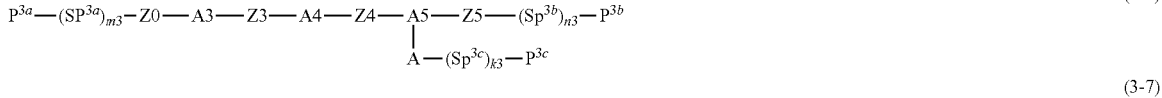
(3-6)

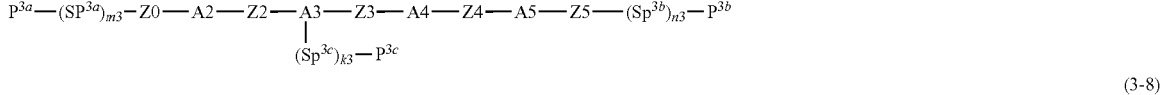
(3-7)

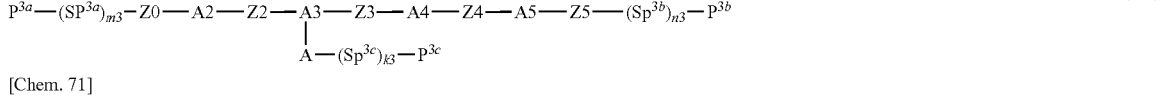
(3-8)

[Chem. 71]

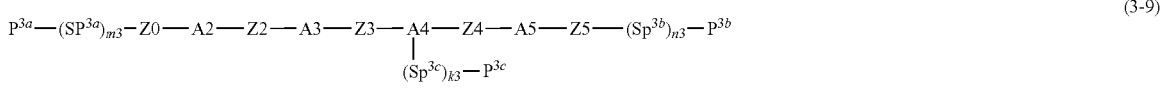
(3-9)

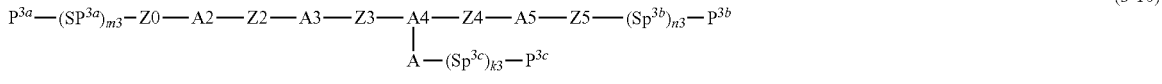
(3-10)

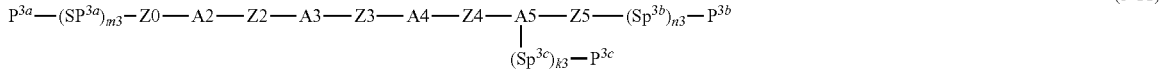
(3-11)

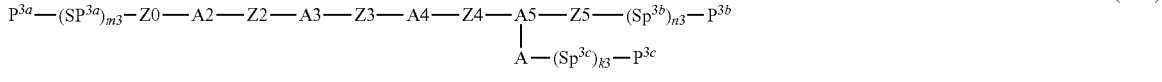
(3-12)

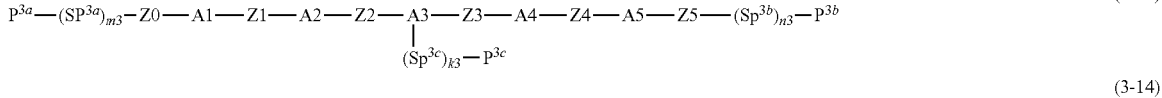
(3-13)

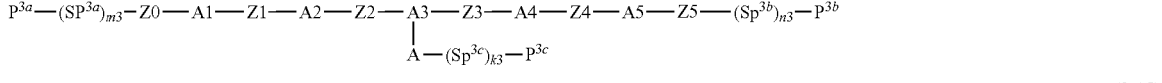
(3-14)

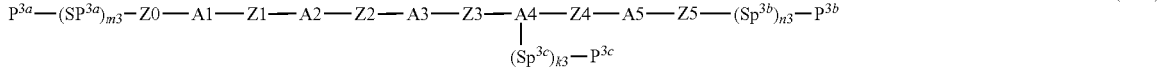
(3-15)

-continued

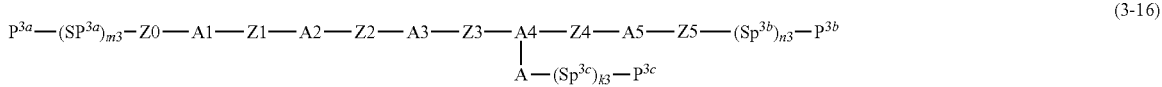
(3-16)

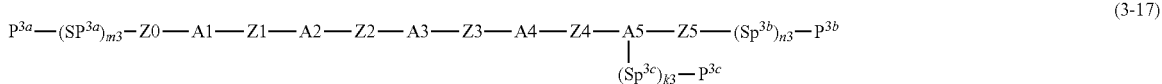
(3-17)

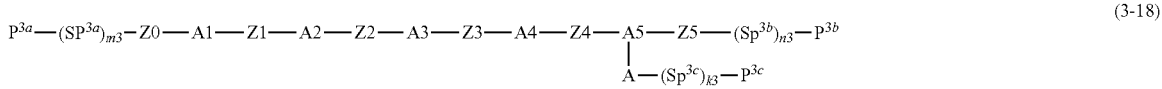
(3-18)

In the formula, A1, A2, A3, A4, and A5 have the same definitions as those in General Formula (2). Z0, Z1, Z2, Z3, Z4, and Z5 have the same definitions as those in General Formula (2).

$P^{3a}$, $P^{3b}$, and $P^{3b}$ each independently represent a polymerizable functional group; $Sp^{3a}$, $Sp^{3b}$, and $Sp^{3c}$ each independently represent an alkylene group having 0 to 18 carbon atoms (the alkylene group is optionally substituted with at least one halogen atom or CN; and one CH$_2$ group or two or more CH$_2$ groups not adjoining each other in the alkylene group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other); and m3, n3, and k3 each independently represent 0 or 1.

Specific examples of the polymerizable liquid crystal compound having two polymerizable functional groups include, but are not limited to, compounds represented by Formulae (3-19) to (3-26).

[Chem. 73]

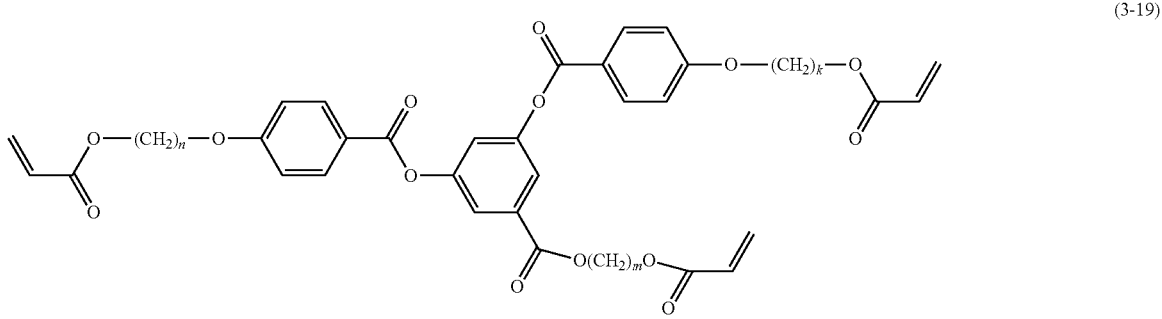
(3-19)

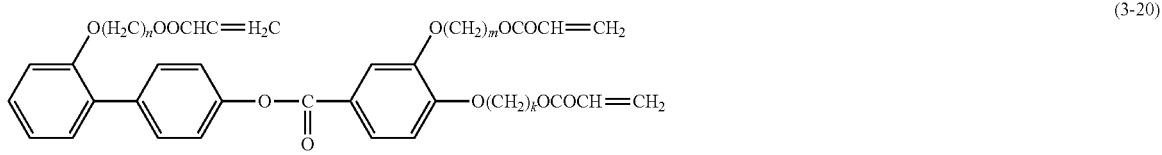
(3-20)

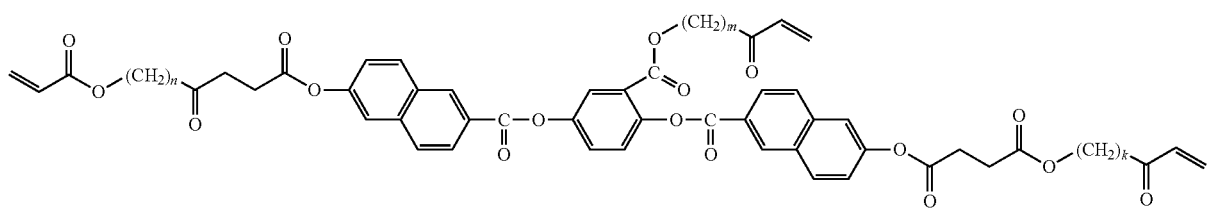
(3-21)

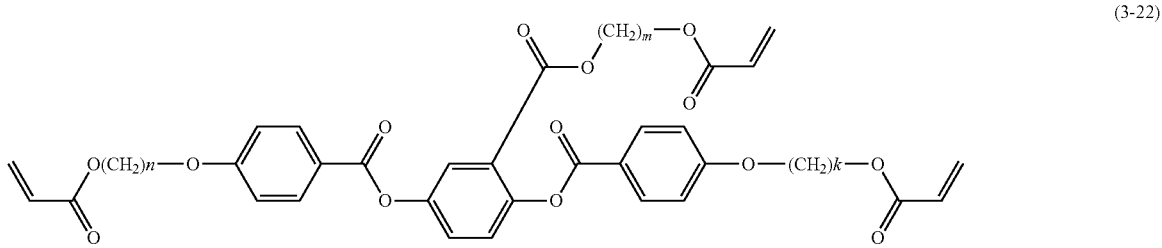
(3-22)

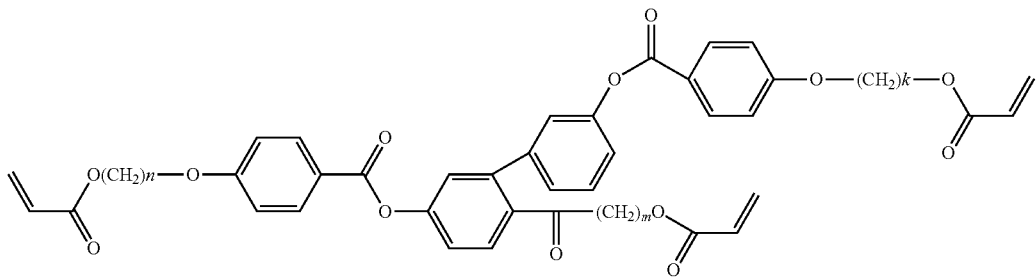

(3-23)

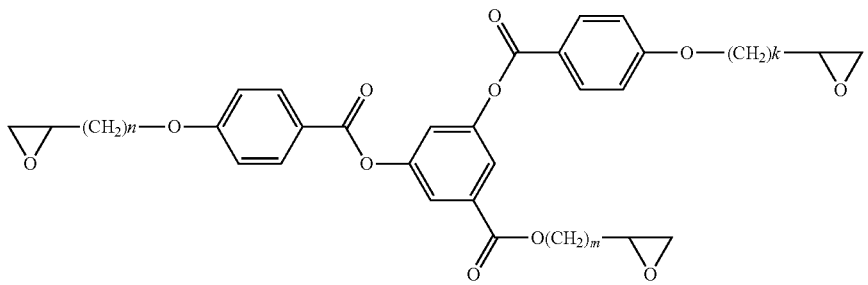

(3-24)

[Chem. 74]

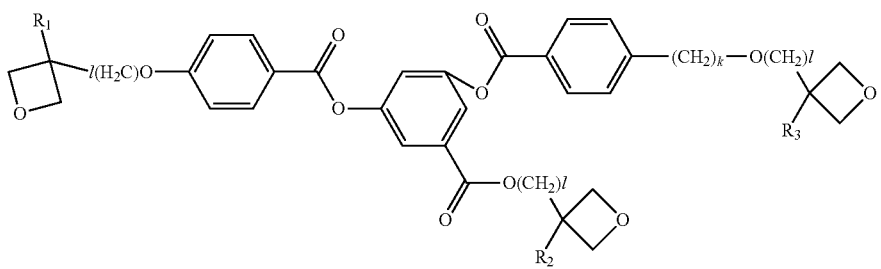

(3-25)

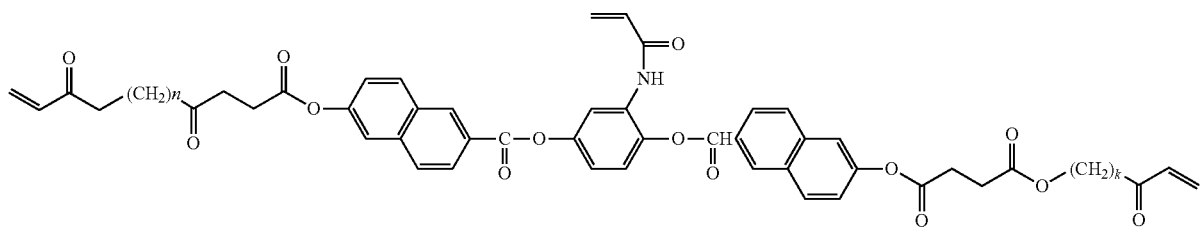

(3-26)

At least one liquid crystal compound having three polymerizable functional group can be used; one to four compounds are preferably used, and one to three compounds are more preferably used.

The amount of the liquid crystal compound having three polymerizable functional groups is preferably in the range of 0 to 80 mass %, more preferably 0 to 70 mass %, and especially preferably 0 to 60 mass % in the polymerizable liquid crystal composition.

The polymerizable liquid crystal composition used in the present invention may further contain a liquid crystal compound having one polymerizable functional group.

In particular, the liquid crystal compound having one polymerizable functional group is preferably any of compounds represented by General Formula (4).

[Chem. 75]

$$P^4\text{-}(Sp^4)_{m4}\text{-}MG\text{-}R^4 \quad (4)$$

In the formula, $P^4$ represents a polymerizable functional group; $Sp^4$ represents an alkylene group having 0 to 18 carbon atoms (the alkylene group is optionally substituted with at least one halogen atom or CN; and one $CH_2$ group or two or more $CH_2$ groups not adjoining each other in the alkylene group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other); m4 represents 0 or 1; MG represents a mesogenic group or a mesogenic supporting group;

$R^4$ represents a hydrogen atom, a halogen atom, a cyano group, or an alkyl group having 1 to 18 carbon atoms; the alkyl group is optionally substituted with at least one halogen atom or CN; one $CH_2$ group or two or more $CH_2$ groups not adjoining each other in the alkyl group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other.

P⁴ preferably represents a substituent selected from polymerizable groups represented by Formulae (P-1) to (P-20).

[Chem. 76]

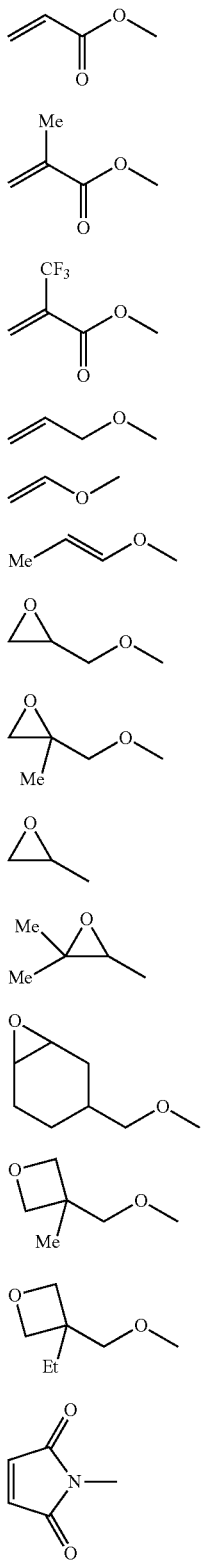

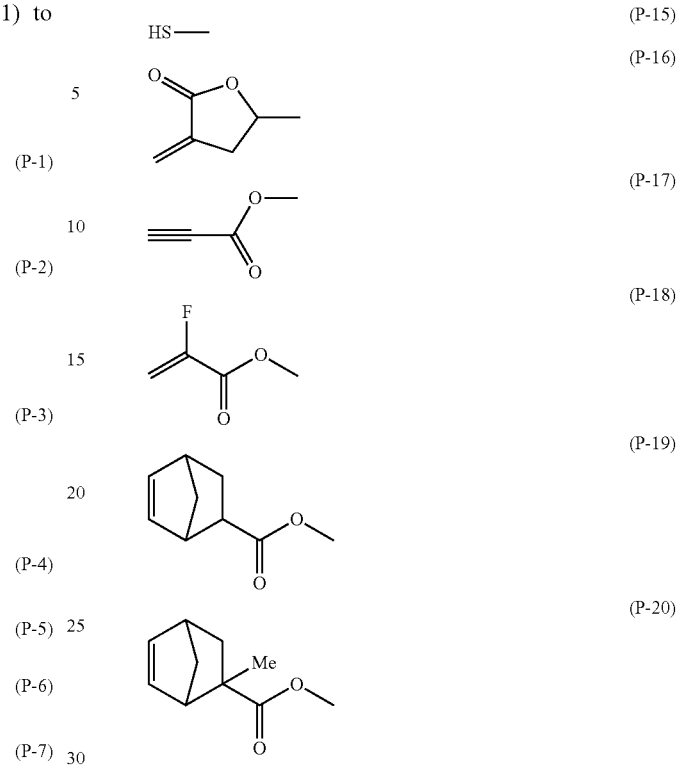

Of these polymerizable functional groups, the groups represented by Formula (P-1) and Formulae (P-2), (P-7), (P-12), and (P-13) are preferred in order to improve polymerizability and storage stability; and the groups represented by Formulae (P-1), (P-7), and (P-12) are more preferred.

An example of the mesogenic group or mesogenic supporting group represented by MG is a group represented by General Formula (4-b).

[Chem. 77]

$$-Z0-(A1-Z1)_{n4}-(A2-Z2)_{k4}-(A3-Z3)_{l4}-A4-Z4-A5-Z5- \qquad (4\text{-}b)$$

In General Formula (4-b), A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and may have, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, and an alkenyl group having 2 to 8 carbon atoms; Z0, Z1, Z2, Z3, Z4, and Z5 each independently represent —COO—, —OCO—, —CH₂CH₂—, —OCH₂—, —CH₂O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond; and n, l, and k each independently represent 0 or 1 and satisfy the relationship of 0≤n+l+k≤3.

Examples of General Formula (4) include, but are not limited to, General Formulae (4-1) to (4-4).

[Chem. 78]

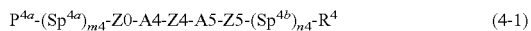  (4-1)

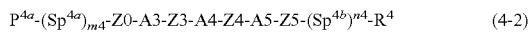  (4-2)

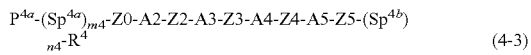  (4-3)

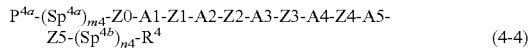  (4-4)

In the formula, A1, A2, A3, A4, and A5 have the same definitions as those in General Formula (4-b). Z0, Z1, Z2, Z3, Z4, and Z5 have the same definitions as those in General Formula (4-b).

P$^{4a}$ and P$^{4b}$ each independently represent a polymerizable functional group; Sp$^{4a}$ and Sp$^{4b}$ each independently represent an alkylene group having 0 to 18 carbon atoms (the alkylene group is optionally substituted with at least one halogen atom or CN; and one CH$_2$ group or two or more CH$_2$ groups not adjoining each other in the alkylene group are each independently optionally replaced with —O—, —S—, —NH—, —N(CH$_3$)—, —CO—, —COO—, —OCO—, —OCOO—, —SCO—, —COS—, or —C≡C— such that oxygen atoms are not directly bonded to each other); and m4 and n4 each independently represent 0 or 1.

Examples of the compound represented by General Formula (4) include, but are not limited to, compounds represented by Formulae (4-5) to (4-41).

[Chem. 79]

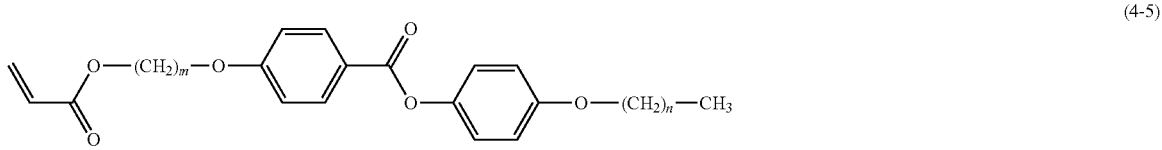

(4-5)

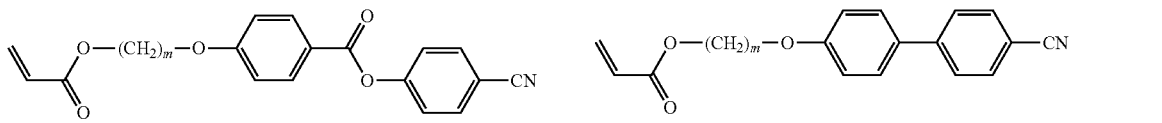

(4-6) (4-7)

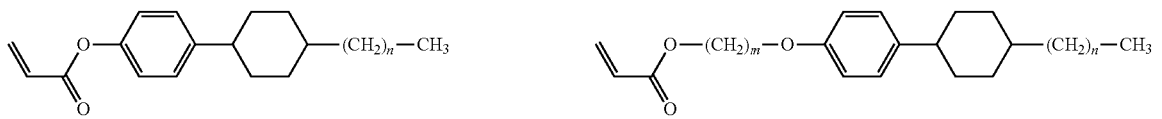 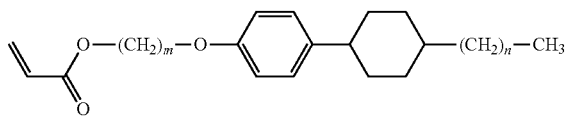

(4-8) (4-9)

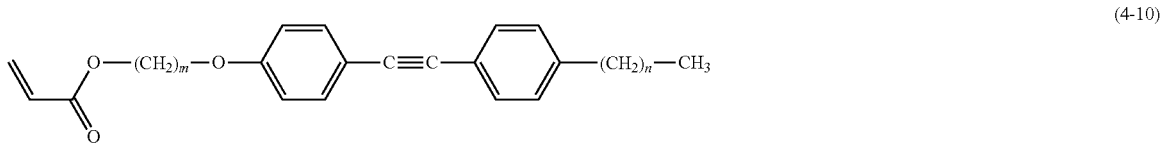

(4-10)

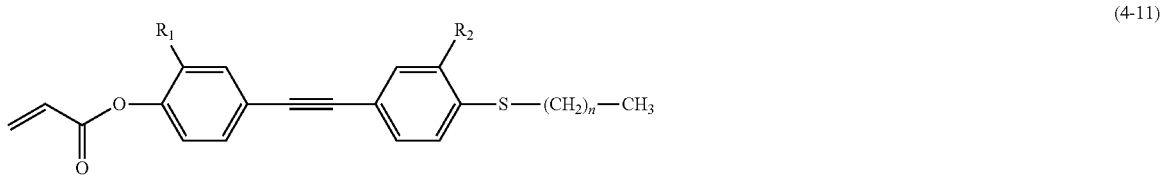

(4-11)

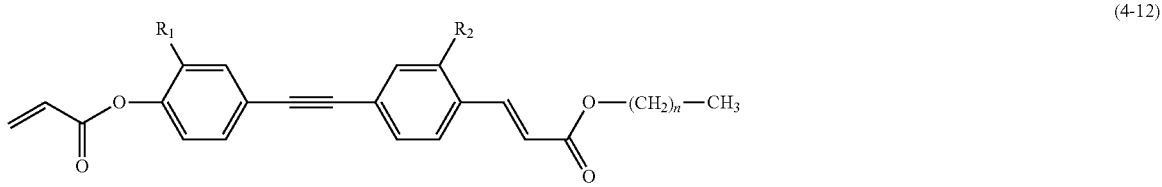

(4-12)

-continued
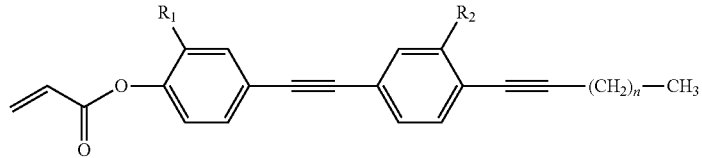
(4-13)
[Chem. 80]
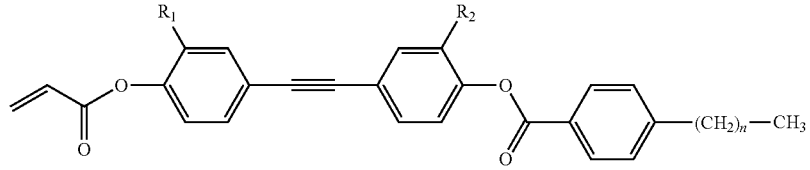
(4-14)
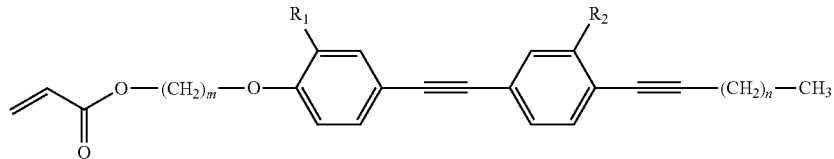
(4-15)
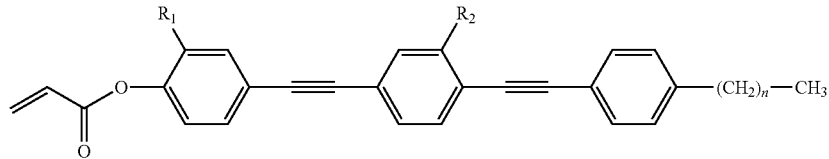
(4-16)
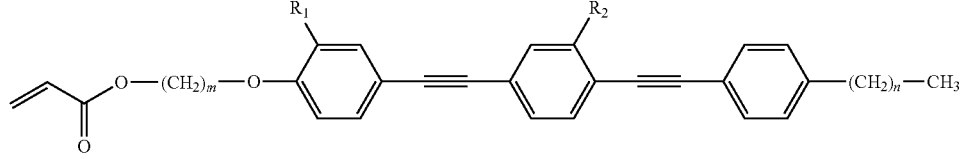
(4-17)
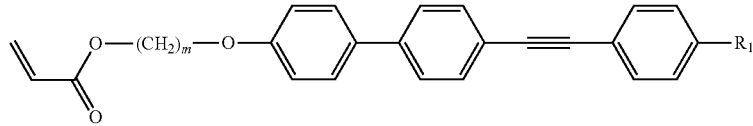
(4-18)
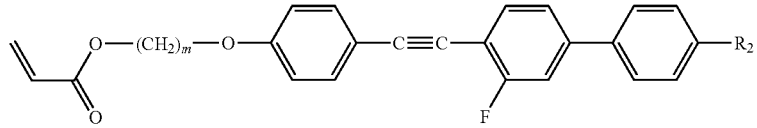
(4-19)
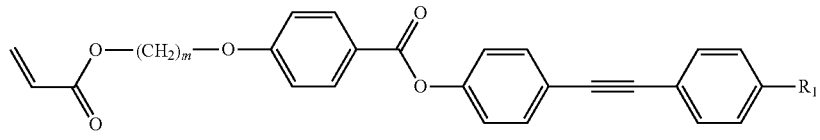
(4-20)
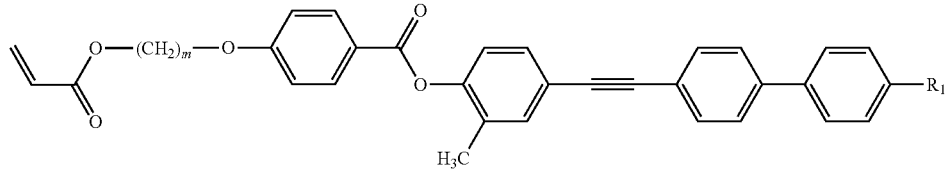
(4-21)

-continued
[Chem. 81]
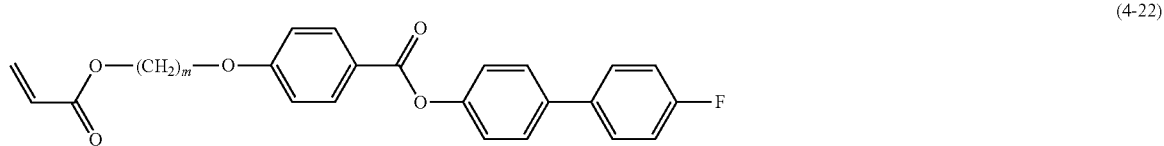
(4-22)
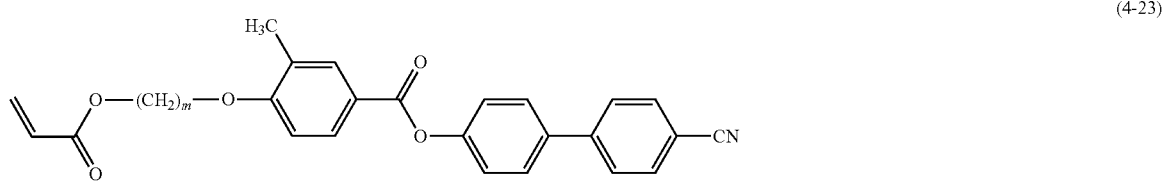
(4-23)
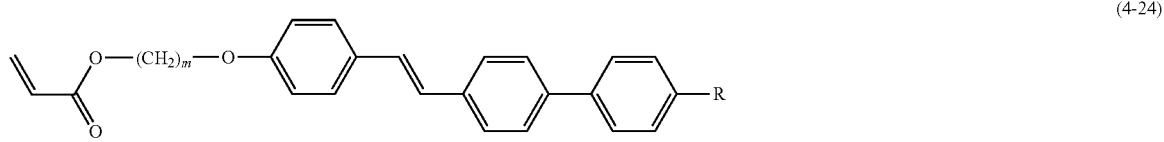
(4-24)
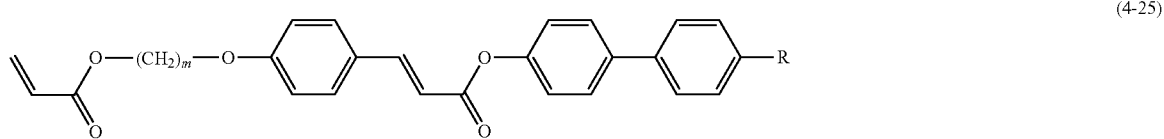
(4-25)
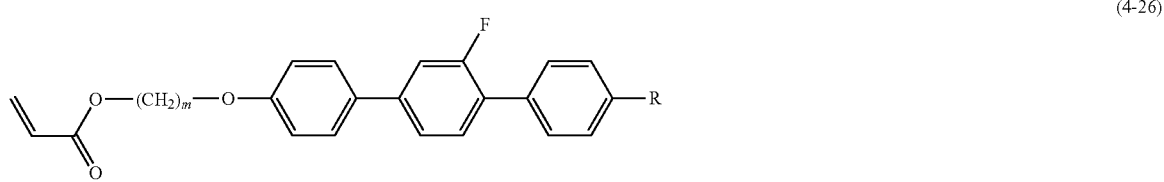
(4-26)
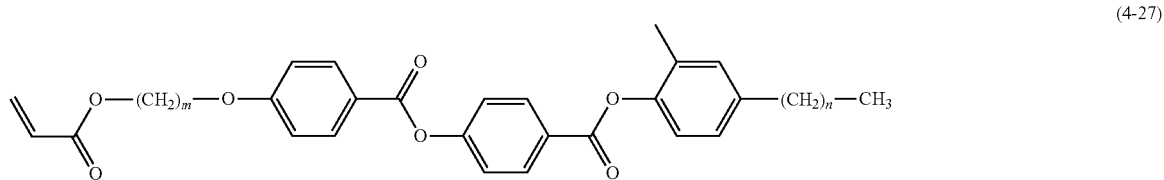
(4-27)
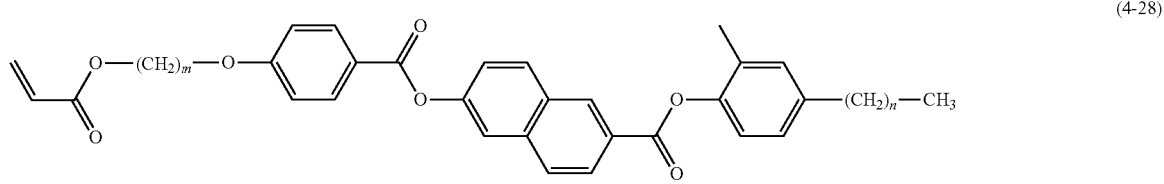
(4-28)
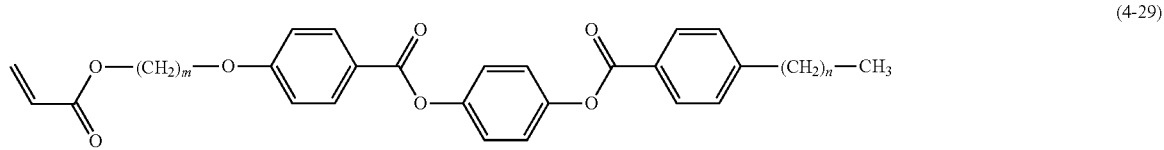
(4-29)
[Chem. 82]
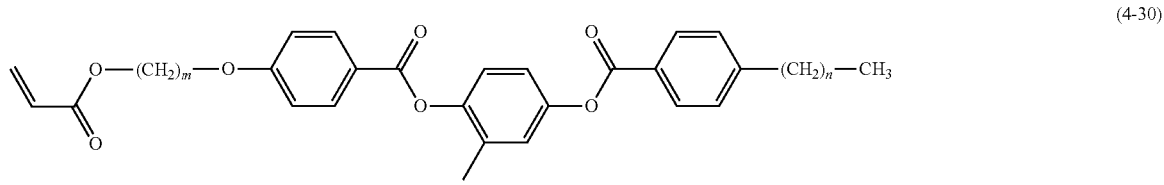
(4-30)

-continued
(4-31)
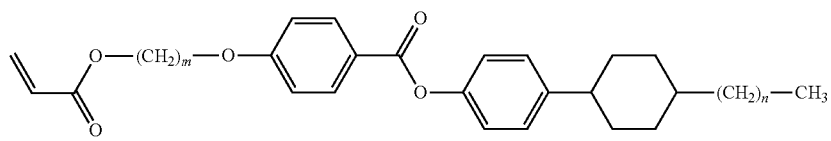
(4-32)
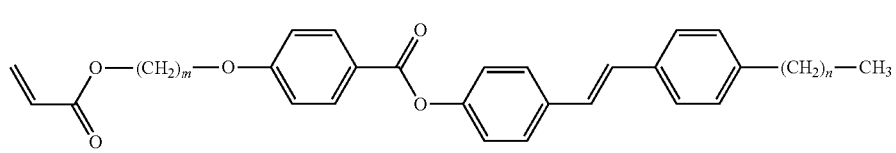
(4-33)
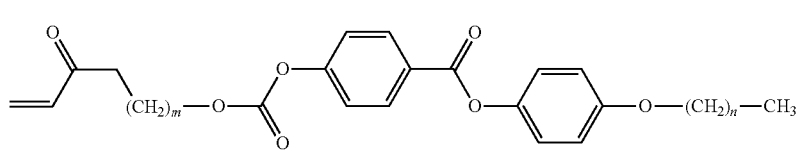
(4-34)
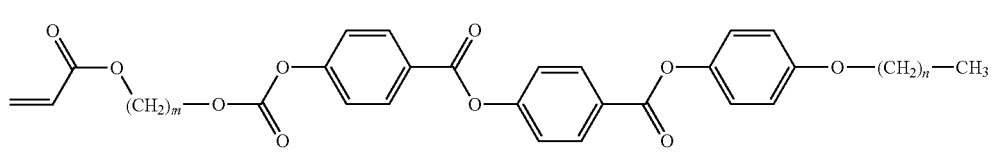
(4-35)
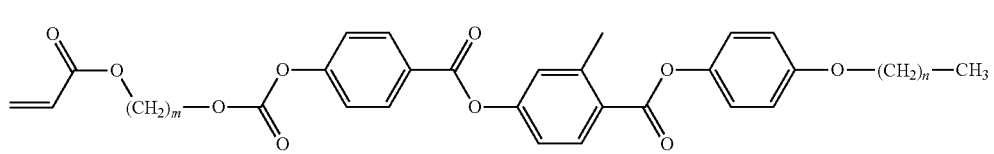
(4-36)
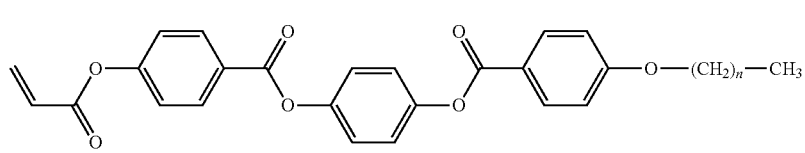
[Chem. 83]
(4-37)
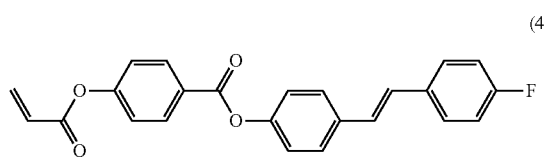
(4-38)
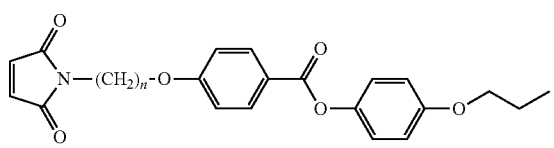
(4-39)
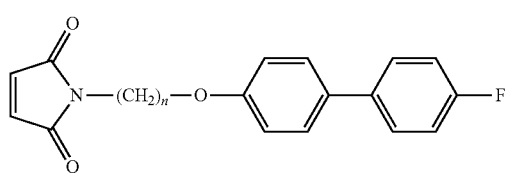
(4-40)
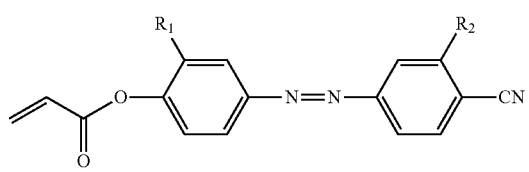

(4-41)

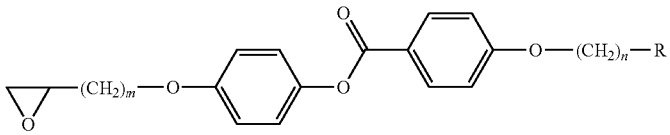

In the formulae, m and n each independently represent an integer from 1 to 18; R, $R_1$, and $R_2$ each independently represent a hydrogen atom, an alkyl group having 1 to 6 carbon atoms, an alkoxy group having 1 to 6 carbon atoms, carboxyl group, or a cyano group; in the case where R, $R_1$, and $R_2$ are each an alkyl group having 1 to 6 carbon atoms or an alkoxy group having 1 to 6 carbon atoms, each of them may be unsubstituted or substituted with one or more halogen atoms.

At least one liquid crystal compound having one polymerizable functional group can be used; one to five compounds are preferably used, and one to four compounds are more preferably used.

The amount of the liquid crystal compound having one polymerizable functional group is preferably not less than 0 mass %, more preferably not less than 10 mass %, and especially preferably not less than 20 mass % in the polymerizable liquid crystal composition; it is also preferably not more than 75 mass %, more preferably not more than 70 mass %, and especially preferably not more than 65 mass %.

(Organic Solvent)

The polymerizable liquid crystal composition used in the present invention may contain an organic solvent and be used in the form of a solution of the polymerizable liquid crystal composition. An organic solvent to be used is not particularly limited but preferably an organic solvent that dissolves polymerizable liquid crystal compounds well and that can be dried at not more than 100° C. Examples of such a solvent include aromatic hydrocarbons such as toluene, xylene, cumene, and mesitylene; ester solvents such as methyl acetate, ethyl acetate, propyl acetate, and butyl acetate; ketone solvents such as methyl ethyl ketone, methyl isobutyl ketone, cyclohexanone, and cyclopentanone; ether solvents such as tetrahydrofuran, 1,2-dimethoxyethane, and anisole; amide solvents such as N,N-dimethylformamide and N-methyl-2-pyrrolidone; and propylene glycol monomethyl ether acetate, diethylene glycol monomethyl ether acetate, γ-butyrolactone, and chlorobenzene. These may be used alone or in combination; at least any one of ketone solvents, ether solvents, ester solvents, and aromatic hydrocarbon solvents is preferably used in terms of solution stability.

Since the polymerizable liquid crystal composition used in the present invention is applied by general techniques, the amount of an organic solvent to be used is not particularly limited provided that the state of the coating is not significantly impaired; the total amount of organic solvents contained in the solution of the polymerizable liquid crystal composition is preferably in the range of 1 to 60 mass %, more preferably 3 to 55 mass %, and especially preferably 5 to 50 mass %.

In order to uniformly dissolve the polymerizable liquid crystal compound in the organic solvent, stirring under heating is preferably carried out. The temperature in the stirring under heating may be appropriately adjusted on the basis of the solubility of a polymerizable liquid crystal compound, which is to be used, in the organic solvent; in terms of productivity, the temperature is preferably from 15° C. to 110° C., more preferably 15° C. to 105° C., further preferably 15° C. to 100° C., and especially preferably 20° C. to 90° C.

In a process for preparing the polymerizable liquid crystal composition, agitation and mixing is preferably performed with a dispersing agitator. Specific examples of a usable dispersing agitator include a disper; a disperser having an agitating blade, such as a propeller or a turbine blade; a paint shaker; a planetary stirring machine; a shaking apparatus; a stirrer; a shaker; and a rotary evaporator. An ultrasonic radiation apparatus can be also used.

It is preferred that the rotational speed for the agitation in the process for preparing the solution of the polymerizable liquid crystal composition be properly adjusted on the basis of the type of an agitator to be used. The rotational speed for the agitation is preferably from 10 rpm to 1000 rpm, more preferably 50 rpm to 800 rpm, and especially preferably 150 rpm to 600 rpm in order to produce a uniform solution of polymerizable liquid crystal composition.

(Polymerization Inhibitor)

The polymerizable liquid crystal composition used in the present invention preferably contains a polymerization inhibitor in order to enhance the solution stability of the polymerizable liquid crystal composition. Examples of the polymerization inhibitor include phenolic compounds, quinone compounds, amine compounds, thioether compounds, and nitroso compounds.

Examples of the phenolic compounds include p-methoxyphenol, cresol, t-butyl catechol, 3.5-di-t-butyl-4-hydroxytoluene, 2.2'-methylenebis(4-methyl-6-t-butylphenol), 2.2'-methylenebis(4-ethyl-6-t-butylphenol), 4.4'-thiobis(3-methyl-6-t-butylphenol), 4-methoxy-1-naphthol, and 4,4'-dialkoxy-2,2'-bi-1-naphthol.

Examples of the quinone compounds include hydroquinone, methylhydroquinone, tert-butyl hydroquinone, p-benzoquinone, methyl-p-benzoquinone, tert-butyl-p-benzoquinone, 2,5-diphenylbenzoquinone, 2-hydroxy-1,4-naphthoquinone, 1,4-naphthoquinone, 2,3-dichloro-1,4-naphthoquinone, anthraquinone, and diphenoquinone.

Examples of the amine compounds include p-phenylenediamine, 4-aminodiphenylamine, N.N'-diphenyl-p-phenylenediamine, N-i-propyl-N'-phenyl-p-phenylenediamine, N-(1.3-dimethylbutyl)-N'-phenyl-p-phenylenediamine, N.N'-di-2-naphthyl-p-phenylenediamine, diphenylamine, N-phenyl-O-naphthylamine, 4.4'-dicumyl-diphenylamine, and 4.4'-dioctyl-diphenylamine.

Examples of the thioether compounds include phenothiazine and distearyl thiodipropionate.

Examples of the nitroso compounds include N-nitrosodiphenylamine, N-nitrosophenylnaphthylamine, N-nitrosodinaphthylamine, p-nitrosophenol, nitrosobenzene, p-nitrosodiphenylamine, α-nitroso-β-naphthol, N,N-dimethyl p-nitrosoaniline, p-nitrosodiphenylamine, p-nitrondimethylamine, p-nitron-N,N-diethylamine, N-nitrosoethanolamine, N-nitrosodi-n-butylamine, N-nitroso-N-n-butyl-4-butanolamine, N-nitroso-diisopropanolamine, N-nitroso-N- ethyl-4-butanolamine, 5-nitroso-8-hydroxyquinoline, N-nitrosomorpholine, N-nitroso-N-phenylhydroxylamine ammonium salts, nitrosobenzene, 2,4.6-tri-tert-butylnitronbenzene, N-nitroso-N-methyl-p-toluene sulfonamide, N-nitroso-N-ethylurethane, N-nitroso-N-n-propylurethane, 1-nitroso-2-naphthol, 2-nitroso-1-naphthol, sodium 1-nitroso-2-naphthol-3,6-sulfonate, sodium 2-nitroso-1-naphthol-4-sulfonate, 2-nitroso-S-methylaminophenol hydrochloride, and 2-nitroso-S-methylaminophenol hydrochloride.

The amount of the polymerization inhibitor is preferably in the range of 0.01 to 1.0 mass %, and more preferably 0.05 to 0.5 mass % relative to the polymerizable liquid crystal composition.

(Antioxidant)

In order to enhance the solution stability of the polymerizable liquid crystal composition used in the present invention, an antioxidant or another material is preferably used. Examples of such a compound include hydroquinone derivatives, nitrosamine polymerization inhibitors, and hindered phenol antioxidants. Specific examples thereof include tert-butylhydroquinone; methylhydroquinone; "Q-1300" and "Q-1301" manufactured by Wako Pure Chemical Industries, Ltd.; and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", and "IRGANOX 565" manufactured by BASF SE.

The amount of the antioxidant is preferably from 0.01 to 2.0 mass %, and more preferably 0.05 to 1.0 mass % relative to the polymerizable liquid crystal composition.

(Photopolymerization Initiator)

The polymerizable liquid crystal composition used in the present invention preferably contains a photopolymerization initiator. At least one photopolymerization initiator is preferably used. Specific Examples thereof include "Irgacure 651", "Irgacure 184", "Darocur 1173", "Irgacure 907", "Irgacure 127", "Irgacure 369", "Irgacure 379", "Irgacure 819", "Irgacure 2959", "Irgacure 1800", "Irgacure 250", "Irgacure 754", "Irgacure 784", "Irgacure OXE01", "Irgacure OXE02", "Lucirin TPO", "Darocur 1173", and "Darocur MBF" manufactured by BASF SE; "Esacure 1001M", "Esacure KIP150", "SpeedCure BEM", "SpeedCure BMS", "SpeedCure MBP", "SpeedCure PBZ", "SpeedCure ITX", "SpeedCure DETX", "SpeedCure EBD", "SpeedCure MBB", and "SpeedCure BP" manufactured by Lambson Limited; "KAYACURE DMBI" manufactured by Nippon Kayaku Co., Ltd.; "TAZ-A" manufactured by Nihon Siber-Hegner K.K. (current DKSH Japan K.K); "ADEKA OPTOMER SP-152", "ADEKA OPTOMER SP-170", "ADEKA OPTOMER N-1414", "ADEKA OPTOMER N-1606", "ADEKA OPTOMER N-1717", and "ADEKA OPTOMER N-1919" manufactured by ADEKA CORPORATION; "CYRACURE UVI-6990", "CYRACURE UVI-6974", and "CYRACURE UVI-6992" manufactured by Union Carbide Corporation; "ADEKA OPTOMER SP-150, SP-152, SP-170, and SP-172" manufactured by Asahi Denka Co., Ltd.; "PHOTOINITIATOR 2074" manufactured by Rhodia S.A.; "Irgacure 250" manufactured by BASF SE; "UV-9380C" manufactured by GE silicones; and "DTS-102" manufactured by Midori Kagaku Co., Ltd.

The amount of the photopolymerization initiator to be used is preferably in the range of 0.1 to 10 mass %, and especially preferably 0.5 to 5 mass % relative to the polymerizable liquid crystal composition. The photopolymerization initiators may be used alone or in combination, and a sensitizer or another material may be additionally used.

(Thermal Polymerization Initiator)

Any known thermal polymerization initiator can be used in thermal polymerization. Examples thereof include organic peroxides such as methyl acetoacetate peroxide, cumene hydroperoxide, benzoyl peroxide, bis(4-t-butylcyclohexyl)peroxy dicarbonate, t-butyl peroxybenzoate, methyl ethyl ketone peroxide, 1,1-bis(t-hexylperoxy)3,3,5-trimethylcyclohexane, p-pentahydroperoxide, t-butyl hydroperoxide, dicumyl peroxide, isobutyl peroxide, di(3-methyl-3-methoxybutyl)peroxy dicarbonate, and 1,1-bis(t-butylperoxy)cyclohexane; azonitrile compounds such as 2,2'-azobisisobutyronitrile and 2,2'-azobis(2,4-dimethyl valeronitrile; azoamidine compounds such as 2,2'-azobis(2-methyl-N-phenylpropione-amidine)dihydrochloride; azoamide compounds such as 2,2'-azobis{2-methyl-N-[1,1-bis(hydroxymethyl)-2-hydroxyethyl]propioneamide}; and alkylazo compounds such as 2,2'-azobis(2,4,4-trimethylpentane). The amount of the thermal polymerization initiator is preferably in the range of 0.1 to 10 mass %, and especially preferably 1 to 6 mass %. These thermal polymerization initiators may be used alone or in combination.

(Surfactant)

The polymerizable liquid crystal composition used in the present invention may contain at least one surfactant in order to reduce unevenness in the thickness of an optically anisotropic body formed thereof. Examples of usable surfactants include alkyl carboxylates, alkyl phosphates, alkyl sulfonates, fluoroalkyl carboxylates, fluoroalkyl phosphates, fluoroalkyl sulfonates, polyoxyethylene derivatives, fluoroalkyl ethylene oxide derivatives, polyethylene glycol derivatives, alkylammonium salts, and fluoroalkylammonium salts. In particular, fluorine-containing surfactants are preferred.

Specific examples thereof include "MEGAFAC F-114", "MEGAFAC F-251", "MEGAFAC F-281", "MEGAFAC F-410", "MEGAFAC F-430", "MEGAFAC F-444", "MEGAFAC F-472SF", "MEGAFAC F-477", "MEGAFAC F-510", "MEGAFAC F-511", "MEGAFAC F-552", "MEGAFAC F-553", "MEGAFAC F-554", "MEGAFAC F-555", "MEGAFAC F-556", "MEGAFAC F-557", "MEGAFAC F-558", "MEGAFAC F-559", "MEGAFAC F-560", "MEGAFAC F-561", "MEGAFAC F-562", "MEGAFAC F-563", "MEGAFAC F-565", "MEGAFAC F-567", "MEGAFAC F-568", "MEGAFAC F-569", "MEGAFAC F-570", "MEGAFAC F-571", "MEGAFAC R-40", "MEGAFAC R-41", "MEGAFAC R-43", "MEGAFAC R-94", "MEGAFAC RS-72-K", "MEGAFAC RS-75", "MEGAFAC RS-76-E", "MEGAFAC RS-76-NS", "MEGAFAC RS-90", "MEGAFAC EXP. TF-1367", "MEGAFAC EXP. TF1437", "MEGAFAC EXP. TF1537", and "MEGAFAC EXP. TF-2066" (each manufactured by DIC Corporation);

"Ftergent 100", "Ftergent 100C", "Ftergent 110", "Ftergent 150", "Ftergent 150CH", "Ftergent 100A-K", "Ftergent 300", "Ftergent 310", "Ftergent 320", "Ftergent 400SW", "Ftergent 251", "Ftergent 215M", "Ftergent 212M", "Ftergent 215M", "Ftergent 250", "Ftergent 222F", "Ftergent 212D", "FTX-218", "Ftergent 209F", "Ftergent 245F", "Ftergent 208G", "Ftergent 240G", "Ftergent 212P", "Ftergent 220P", "Ftergent 228P", "DFX-18", "Ftergent 601AD", "Ftergent 602A", "Ftergent 650A", "Ftergent 750FM", "FTX-730FM", "Ftergent 730FL", "Ftergent 710FS", "Ftergent 710FM", "Ftergent 710FL", "Ftergent 750LL", "FTX-730LS", and "Ftergent 730LM" (each manufactured by NEOS COMPANY LIMITED);

"BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-Silclean3700" (each manufactured by BYK Japan KK);
"TEGO Rad2100", "TEGO Rad2011", "TEGO Rad2200N", "TEGO Rad2250", "TEGO Rad2300", "TEGO Rad2500", "TEGO Rad2600", "TEGO Rad2650", "TEGO Rad2700", "TEGO Flow300", "TEGO Flow370", "TEGO Flow425", "TEGO Flow ATF2", "TEGO Flow ZFS460", "TEGO Glide100", "TEGO Glide110", "TEGO Glide130", "TEGO Glide410", "TEGO Glide411", "TEGO Glide415", "TEGO Glide432", "TEGO Glide440", "TEGO Glide450", "TEGO Glide482", "TEGO Glide A115", "TEGO Glide B1484", "TEGO Glide ZG400", "TEGO Twin4000", "TEGO Twin4100", "TEGO Twin4200", "TEGO Wet240", "TEGO Wet250", "TEGO Wet260", "TEGO Wet265", "TEGO Wet270", "TEGO Wet280", "TEGO Wet500", "TEGO Wet505", "TEGO Wet510", "TEGO Wet520", and "TEGO Wet KL245" (each manufactured by Evonik Industries AG); "FC-4430" and "FC-4432" (each manufactured by 3M Japan Limited); "UNIDYNE NS" (manufactured by DAIKIN INDUSTRIES, LTD); SURFLON S-241", "SURFLON S-242", "SURFLON S-243", "SURFLON S-420", "SURFLON S-611", "SURFLON S-651", and "SURFLON S-386" (each manufactured by AGC SEIMI CHEMICAL CO., LTD.); "DISPARLON OX-880EF", "DISPARLON OX-881", "DISPARLON OX-883", "DISPARLON OX-77EF", "DISPARLON OX-710", "DISPARLON 1922", "DISPARLON 1927", "DISPARLON 1958", "DISPARLON P-410EF", "DISPARLON P-420", "DISPARLON P-425", "DISPARLON PD-7", "DISPARLON 1970", "DISPARLON 230", "DISPARLON LF-1980", "DISPARLON LF-1982", "DISPARLON LF-1983", "DISPARLON LF-1084", "DISPARLON LF-1985", "DISPARLON LHP-90", "DISPARLON LHP-91", "DISPARLON LHP-95", "DISPARLON LHP-96", "DISPARLON OX-715", "DISPARLON 1930N", "DISPARLON 1931", "DISPARLON 1933", "DISPARLON 1934", "DISPARLON 1711EF", "DISPARLON 1751N", "DISPARLON 1761", "DISPARLON LS-009", "DISPARLON LS-001", and "DISPARLON LS-050" (each manufactured by Kusumoto Chemicals, Ltd.); "PF-151N", "PF-636", "PF-6320", "PF-656", "PF-6520", "PF-652-NF", and "PF-3320" (each manufactured by OMNOVA SOLUTIONS); "POLYFLOW No. 7", "POLYFLOW No. 50E", "POLYFLOW No. 50EHF", "POLYFLOW No. 54N", "POLYFLOW No. 75", "POLYFLOW No. 77", "POLYFLOW No. 85", "POLYFLOW No. 85HF", "POLYFLOW No. 90", "POLYFLOW No. 90D-50", "POLYFLOW No. 95", "POLYFLOW No. 99C", "POLYFLOW KL-400K", "POLYFLOW KL-400HF", "POLYFLOW KL-401", "POLYFLOW KL-402", "POLYFLOW KL-403", "POLYFLOW KL-404", "POLYFLOW KL-100", "POLYFLOW LE-604", "POLYFLOW KL-700", "FLOWLEN AC-300", "FLOWLEN AC-303", "FLOWLEN AC-324", "FLOWLEN AC-326F", "FLOWLEN AC-530", "FLOWLEN AC-903", "FLOWLEN AC-903HF", "FLOWLEN AC-1160", "FLOWLEN AC-1190", "FLOWLEN AC-2000", "FLOWLEN AC-2300C", "FLOWLEN AO-82", "FLOWLEN AO-98", and "FLOWLEN AO-108" (each manufactured by Kyoeisha Chemical Co., Ltd.); and "L-7001", "L-7002", "8032 ADDITIVE", "57 ADDTIVE", "L-7064", "FZ-2110", "FZ-2105", "67 ADDTIVE", and "8616 ADDTIVE" (each manufactured by Dow Corning Toray Co., Ltd.).

The amount of the surfactant is preferably from 0.01 to 2 mass %, and more preferably 0.05 to 0.5 mass % relative to the polymerizable liquid crystal composition.

Use of the above-mentioned surfactant may enable an optically anisotropic body formed of the polymerizable liquid crystal composition used in the present invention to have an effectively reduced tilt angle at the air interface in some cases.

The polymerizable liquid crystal composition used in the present invention may contain, in addition to the above-mentioned surfactants, a compound having a weight average molecular weight of not less than 100 and a repeating unit represented by General Formula (5); using such a compound also enables an optically anisotropic body formed of the polymerizable liquid crystal composition to have an effectively reduced tilt angle at the air interface.

[Chem. 84]

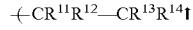

(5)

In the formula, $R^{11}$, $R^{12}$, $R^{13}$, and $R^{14}$ each independently represent a hydrogen atom, a halogen atom, or a hydrocarbon group having 1 to 20 carbon atoms; in the hydrocarbon group, a hydrogen atom is optionally substituted with at least one halogen atom.

Examples of a preferred compound represented by General Formula (5) include polyethylene, polypropylene, polyisobutylene, paraffin, liquid paraffin, chlorinated polypropylene, chlorinated paraffin, and chlorinated liquid paraffin.

The compound represented by General Formula (5) is preferably added in the process for preparing a polymerizable solution, in which the polymerizable compound is mixed with the organic solvent and in which the mixture is stirred under heating; however, the compound may be added in the subsequent process for mixing the photopolymerization initiator with the polymerizable solution or in both of these processes.

The amount of the compound represented by General Formula (5) is preferably in the range of 0.01 to 1 mass %, and more preferably 0.05 to 0.5 mass % relative to the solution of the polymerizable liquid crystal composition.

The solution of the polymerizable liquid crystal composition used in the present invention also preferably contains a chain-transfer agent in order to further enhance the adhesiveness of an optically anisotropic body formed thereof to a substrate. The chain-transfer agent is preferably a thiol compound; more preferably a monothiol compound, a dithiol compound, a trithiol compound, and a tetrathiol compound; and further preferably a trithiol compound. Specifically, compounds represented by General Formulae (6-1) to (6-12) are preferred.

[Chem. 85]

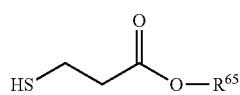

(6-1)

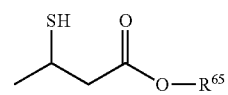

(6-2)

-continued

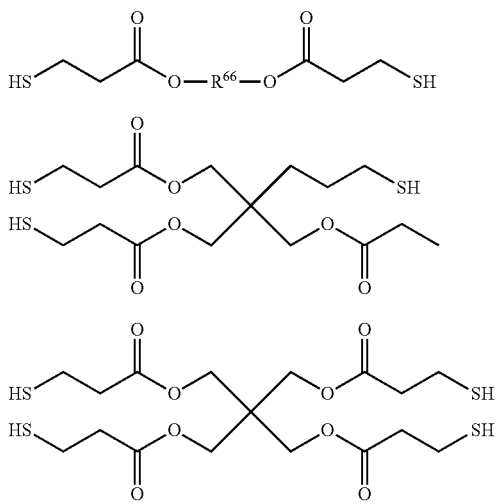
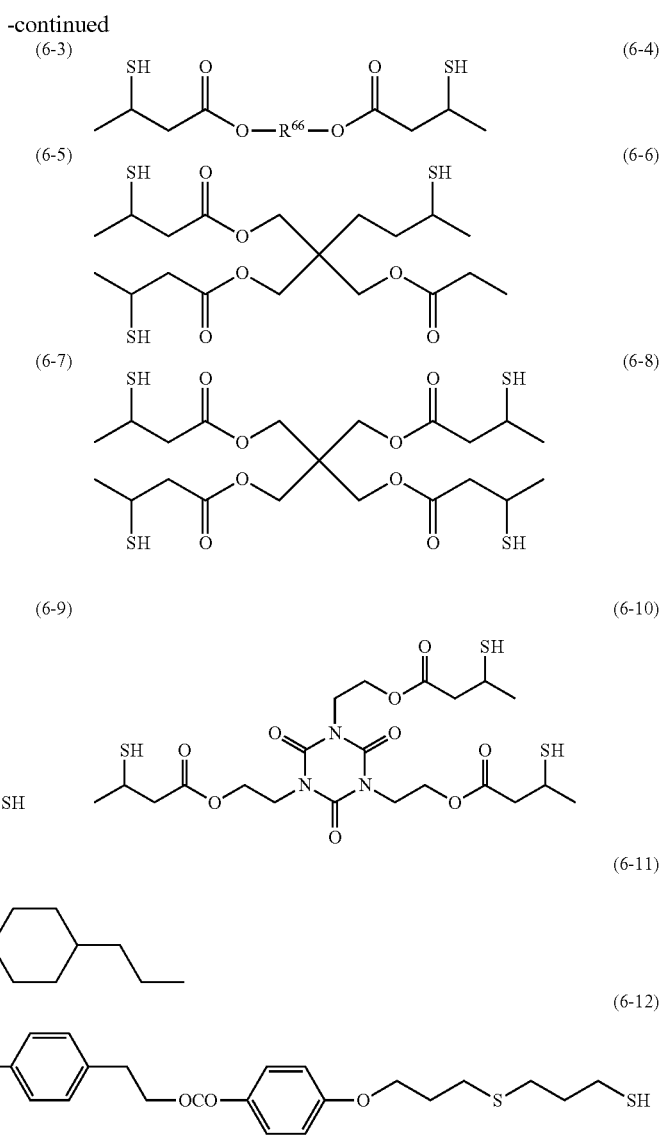

[Chem. 86]

In the formulae, $R^{65}$ represents an alkyl group having 2 to 18 carbon atoms; the alkyl group may be linear or branched; at least one methylene group in the alkyl group is optionally substituted with an oxygen atom, a sulfur atom, —CO—, —OCO—, —COO—, or —CH=CH— provided that oxygen atoms or sulfur atoms are not directly bonded to each other; $R^{66}$ represents an alkylene group having 2 to 18 carbon atoms; and at least one methylene group in the alkylene group is optionally substituted with an oxygen atom, a sulfur atom, —CO—, —OCO—, —COO—, or —CH=CH— provided that oxygen atoms or sulfur atoms are not directly bonded to each other.

The chain-transfer agent is preferably added in the process for preparing a polymerizable solution, in which the polymerizable liquid crystal compound is mixed with the organic solvent and in which the mixture is stirred under heating; however, the compound may be added in the subsequent process for mixing the polymerization initiator with the polymerizable solution or in both of these processes.

The amount of the chain-transfer agent is preferably in the range of 0.5 to 10 mass %, and more preferably 1.0 to 5.0 mass % relative to the polymerizable liquid crystal composition.

In order to adjust physical properties, a polymerizable compound having no liquid crystallinity or another material can be optionally used as well.

The term "polymerizable compound having no liquid crystallinity" refers to, for example, a reactive monomer that can be polymerized through photopolymerization or thermal polymerization. In particular, for example, it refers to a monomer that does not have a rod-like molecular structure that gives liquid crystallinity (a molecular structure in which an alkyl group, a cyano group, or fluorine has been bonded to the terminal of, for instance, a biphenyl group or biphenyl cyclohexyl group). Specific examples thereof include, but are not limited to, monomers each having a polymerizable group, such as an acryloyl group, a methacryloyl group, a vinyl group, an epoxy group, a fumarate group, or a cinnamoyl group, in its molecular structure. The polymerizable compound having no liquid crystallinity is preferably a monomer having a structure of which an acrylate group that serves as a polymerizable group is present at the terminal.

Specific examples of a usable monomer having a structure in which an acrylate group that serves as a polymerizable group is present include, but are not limited to, 3,5,5-trimethylhexyl acrylate, 2-hexyl acrylate, butoxyethyl acrylate, isostearyl acrylate, hydroxyethyl acrylate, phenoxyethyl acrylate, 2-2-ethoxyethoxyethyl acrylate, diethylene glycol 2-ethylhexyl ether acrylate, polyethylene glycol methyl ether acrylate, 1,6-hexane diol diacrylate, neopentyl glycol diacrylate, ethoxylated bisphenol diacrylate, dipropylene glycol diacrylate, tricyclodecane dimethanol diacrylate, epichlorohydrin-modified glycerol triacrylate, ethylene oxide-modified glycerol triacrylate, propylene oxide-modified glycerol triacrylate, pentaerythritol triacrylate, ethylene oxide-modified phosphoric triacrylate, trimethylolpropane triacrylate, caprolactone-modified trimethylolpropane triacrylate, ethylene oxide-modified trimethylolpropane triacrylate, propylene oxide-modified trimethylolpropane triacrylate, ethoxylated isocyanurate triacrylate, ε-caprolactone-modified tris-(2-acryloxyethyl)isocyanurate, dipentaerythritol hexaacrylate, caprolactone-modified dipentaerythritol hexaacrylate, dipentaerythritol hydroxypenta acrylate, alkyl-modified dipentaerythritol pentaacrylate, dipentaerythritol hexaacrylate, alkyl-modified dipentaerythritol triacrylate, ditrimethylolpropane tetraacrylate, pentaerythritol ethoxytetraacrylate, and pentaerythritol tetraacrylate. The polymerizable compound having no liquid crystallinity is preferably added in the process for preparing a polymerizable solution, in which the polymerizable compound is mixed with the organic solvent and in which the mixture is stirred under heating; however, a non-polymerizable liquid crystal compound may be added in the subsequent process for mixing the polymerization initiator with the polymerizable solution or in both of these processes. The amount of such a compound is preferably not more than 20 mass %, more preferably not more than 10 mass %, and further preferably not more than 5 mass % relative to the polymerizable liquid crystal composition.

A non-polymerizable liquid crystal compound can be optionally used as well as the polymerizable compound having no liquid crystallinity.

The polymerizable mixture or polymerizable composition used in the present invention may contain other additives such as a thixotropic agent, an ultraviolet absorber, an infrared absorber, an antioxidant, and a surface treatment agent on the basis of the intended use to such an extent that the alignment of liquid crystal molecules is not greatly impaired.

(Optically Anisotropic Body)

The polymerizable liquid crystal composition used in the present invention is applied to a substrate having an alignment function, the liquid crystal molecules of the polymerizable liquid crystal composition used in the present invention are uniformly aligned in a state in which a smectic phase and a nematic phase are maintained, and then polymerization is carried out to produce an optically anisotropic body used in the present invention.

Any retardation layer is used in the present invention provided that it enables an improvement in view angle dependency attributed to the birefringence properties of the liquid crystal molecules, and a variety of alignment modes can be employed. Alignment modes such as a positive A plate, a negative A plate, a positive C plate, a negative C plate, a biaxial plate, a positive O plate, and a negative O plate can be, for example, employed. In particular, use of a positive A plate, a positive C plate, and/or a biaxial plate is preferred. Use of a positive A plate and/or a positive C plate or use of a biaxial plate is more preferred, and a laminate of a positive A plate and positive C plate is especially preferred.

The term "positive A plate" refers to an optically anisotropic body produced through polymerization of a polymerizable liquid crystal composition of which the ordinary refractive index of the index ellipsoid is smaller than the extraordinary refractive index thereof and in which the main axis (c axis) exhibiting the extraordinary refractive index is homogeneously aligned with respect to the substrate; the c axis of the mesogenic group or mesogenic supporting group is in homogeneous alignment. In another embodiment, the positive A plate is a stretched film having in-plane uniaxial properties brought about by being stretched. A stretched film formed by stretching a transparent resin having a positive intrinsic birefringence, such as a cyclic olefin resin or a modified polycarbonate resin, in specific conditions may be used. The term "positive C plate" refers to an optically anisotropic body produced through polymerization of a polymerizable liquid crystal composition of which the index ellipsoid is in the above-mentioned state of refractive indexes and which is in homeotropic alignment, and the c axis of the mesogenic group or mesogenic supporting group is in homeotropic alignment. The term "negative A plate" refers to an optically anisotropic body produced through polymerization of a polymerizable liquid crystal composition of which the ordinary refractive index of the index ellipsoid is larger than the extraordinary refractive index thereof and in which the c axis is homogeneously aligned with respect to the substrate; the c axis of the mesogenic group or mesogenic supporting group is in homogeneous alignment. The term "negative C plate" refers to an optically anisotropic body produced through polymerization of a polymerizable liquid crystal composition of which the index ellipsoid is in the above-mentioned state of refractive indexes and which is in homeotropic alignment, and the c axis of the mesogenic group or mesogenic supporting group is in homeotropic alignment.

The term "biaxial plate" refers to an optically anisotropic body produced through polymerization of a polymerizable liquid crystal composition subjected to molecular alignment, in which the three principle refractive indexes of the index ellipsoid of the optically anisotropic body are all different from each other. It has a variety of specific embodiments but refers to a retardation layer in which the alignment state of the mesogenic group or mesogenic supporting group in the polymerizable liquid crystal composition is biaxial.

The term "positive O plate" refers to an optically anisotropic body produced through polymerization of a polymerizable liquid crystal composition of which the ordinary refractive index of the index ellipsoid is smaller than the extraordinary refractive index thereof and which is in a state in which the tilt angle of the c axis thereof to a substrate changes in the direction from the substrate interface to the air interface. In particular, it refers to a retardation layer in which the tilt angle of the c axis of the mesogenic group or mesogenic supporting group successively changes from the substrate interface to the air interface. The term "negative O plate" refers to an optically anisotropic body produced through polymerization of a polymerizable liquid crystal composition of which the ordinary refractive index of the index ellipsoid is larger than the extraordinary refractive index thereof and which is in a state in which the tilt angle of the c axis thereof to a substrate changes in the direction from the substrate interface to the air interface. In particular, it refers to a retardation layer in which the tilt angle of the c axis of the mesogenic group or mesogenic supporting group changes from the substrate interface to the air interface.

In a liquid crystal cell that is an embodiment of the present invention, a positive A plate is preferably used as the first retardation layer. In the positive A plate, assuming that the refractive index of the retardation layer in the direction of the in-plane slow axis is nx, that the refractive index of the retardation layer in the direction of the in-plane fast axis is ny, and that the refractive index of the retardation layer in the direction of the thickness thereof is nz, the relationship "nx>ny=nz" is given. The positive A plate preferably has an in-plane retardation value ranging from 10 to 300 nm at a wavelength of 550 nm. The retardation value thereof in the thickness direction is not particularly limited. The Nz coefficient is preferably in the range of 0.9 to 1.1.

A positive C plate having a positive refractive index anisotropy is preferably used as the second retardation layer. The positive C layer may be disposed on a positive A plate.

In the retardation layer of the positive C plate, assuming that the refractive index of the retardation layer in the in-plane direction is nx and ny and that the refractive index of the retardation layer in the direction of the thickness thereof is nz, the relationship "nx=ny<nz" is given. The positive C plate preferably has a retardation value ranging from 10 to 300 nm in the thickness direction. The positive C plate may be used as the first retardation layer, and the positive A plate may be used as the second retardation layer. It is also preferred that the retardation layer be a biaxial plate having refractive index anisotropy in which three principle refractive indexes are all different from each other.

In the retardation layer of the biaxial plate, assuming that the refractive index of the retardation layer in the direction of the in-plane slow axis is nx, that the refractive index of the retardation layer in the direction of the in-plane fast axis is ny, and that the refractive index of the retardation layer in the direction of the thickness thereof is nz, the relationship "nx>nz>ny" or "nz>nx>ny" is given. The biaxial plate preferably has an in-plane retardation value ranging from 10 to 300 nm at a wavelength of 550 nm. The retardation value thereof in the thickness direction is not particularly limited but preferably in the range of 0 to 300 nm. The Nz coefficient is preferably in the range of 0.1 to 1.0.

The refractive index anisotropy in the thickness direction is given by a thickness-direction retardation value Rth defined by Equation (2). In order to calculate the thickness-direction retardation value Rth, nx, ny, and nz are determined through numerical calculation from Equations (1) and (4) to (7) with an in-plane retardation value $R_0$, a retardation value $R_{50}$ defined on the basis of the slow axis being an inclined axis that has been inclined at 50°, a film thickness d, average refractive index $n_0$ of the film; and the determined nx, ny, and nz are substituted for Equation (2). Nz coefficient= can be obtained from Equation (3). The same herein holds true for the below description.

$$R_0 = (nx - ny) \times d \quad (1)$$

$$Rth = [(nx + ny)/2 - nz] \times d \quad (2)$$

$$Nz\ \text{coefficient} = (nx - nz)/(nx - ny) \quad (3)$$

$$R_{50} = (nx - ny') \times d/\cos(\varphi) \quad (4)$$

$$(nx + ny + nz)/3 = n0 \quad (5)$$

where $$\varphi = \sin^{-1}[\sin(50°/n_0] \quad (6)$$

$$ny' = ny \times nz/[ny^2 \times \sin^2(\varphi) + nz^2 \times \cos^2(\varphi)]^{1/2} \quad (7)$$

Many of commercially available equipment for measuring retardation automatically performs the above-mentioned calculation and automatically displays the in-plane retardation value $R_0$, thickness-direction retardation value Rth, and another value. An example of such equipment is RETS-100 (manufactured by Otsuka Chemical Co., Ltd.).

The liquid crystal display device of the present invention includes a retardation layer disposed between a pair of substrates, and another retardation layer may be provided on the outside of the substrates. Any retardation layer is used as the retardation layer disposed outside the substrates provided that it enables an improvement in view angle dependency attributed to the birefringence properties of the liquid crystal molecules, and a variety of alignment modes can be employed. Alignment modes such as a positive A plate, a negative A plate, a positive C plate, a negative C plate, a biaxial plate, a positive C plate, and a negative C plate can be, for example, employed. In particular, use of a positive A plate, a positive C plate, and/or a biaxial plate is preferred. Use of a positive A plate and/or a positive C plate is more preferred. The positive A plate to be used can be a polymerizable liquid crystal composition that is in homogeneous alignment or a stretched film. The positive C plate to be used can be a polymerizable liquid crystal composition that is in homeotropic alignment or a stretched film.

(Substrate)

Any substrate can be used in the optically anisotropic body in the present invention provided that the substrate can be used in general liquid crystal devices, displays, optical components, and optical films and that the substrate has a heat resistance that allows it to endure heating for drying after application of a solution of the polymerizable liquid crystal composition used in the present invention. Examples of such a substrate include glass substrates, metal substrates, ceramic substrates, and substrates formed of organic materials, such as plastic substrates. Especially in the case where the substrate is formed of an organic material, examples of the organic material include cellulose derivatives, polyolefin, polyester, polyolefin, polycarbonate, polyacrylate, polyarylate, polyether sulphone, polyimide, polyphenylene sulfide, polyphenylene ether, nylon, and polystyrene. In particular, plastic substrates formed of polyester, polystyrene, polyolefin, cellulose derivatives, polyarylate, and polycarbonate are preferred. The substrate may have a planar shape or a curved surface. Such a substrate may optionally have an electrode layer, an antireflection function, or a reflection function.

The substrate may be subjected to a surface treatment in order to enable the polymerizable liquid crystal composition used in the present invention to be applied and adhere thereto well. Examples of the surface treatment include an ozone treatment, a plasma treatment, a corona treatment, and a silane coupling treatment.

(Application)

An application technique for producing the optically anisotropic body in the present invention can be any of known techniques such as a method involving use of an applicator, a bar coating method, a spin coating method, a roll coating method, a direct gravure coating method, a reverse gravure coating method, a flexographic coating method, an ink jet method, a die coating method, a cap coating method, a dip coating method, and a slit coating method. The polymerizable liquid crystal composition is dried after being applied.

(Polymerization Process)

The polymerization of the polymerizable liquid crystal composition in the present invention typically involves irradiation with light, such as ultraviolet, or heating in a state in which the liquid crystal compound contained in the polymerizable liquid crystal composition is in horizontal alignment, vertical alignment, hybrid alignment, or cholesteric alignment (planar alignment) with respect to the substrate. Specifically, in the polymerization involving irradiation with light, irradiation with ultraviolet rays having a wavelength of 390 nm or less is preferred, and irradiation with light having a wavelength ranging from 250 to 370 nm is most preferred. If the ultraviolet rays having a wavelength of 390 nm or less causes, for example, decomposition of the polymerizable composition, polymerization involving irradiation with ultraviolet rays having a wavelength of 390 nm or more is suitable in some cases. This light is preferably non-polarized diffused light.

(Polymerization Technique)

The polymerizable liquid crystal composition used in the present invention can be polymerized by irradiation with active energy rays or heating. The irradiation with active energy rays is preferred because it enables the reaction to progress at room temperature; in particular, irradiation with light such as ultraviolet is preferred because it can be easily performed. The temperature in the irradiation procedure is controlled so that the polymerizable liquid crystal composition used in the present invention can maintain a liquid crystal phase; in order to prevent the occurrence of thermal polymerization of the polymerizable liquid crystal composition, it is preferred that the temperature be adjusted to be 50° C. or less as much as possible. Liquid crystal compositions are generally in a liquid crystal phase in the temperature range of C (solid phase) to N (nematic) transition temperature (hereinafter referred to as C—N transition temperature) to N—I transition temperature in a heating process. In a cooling process, liquid crystal compositions are in a thermodynamically non-equilibrium state; thus, they are not coagulated and maintain a state of liquid crystal in some cases even at a temperature of C—N transition temperature or lower. This state is called supercooled state. In the present invention, a liquid crystal composition in a supercooled state is also regarded as maintaining a liquid crystal phase. Specifically, irradiation with ultraviolet rays having a wavelength of 390 nm or less is preferred, and irradiation with light having a wavelength ranging from 250 to 370 nm is most preferred. If the ultraviolet rays having a wavelength of 390 nm or less causes, for example, decomposition of the polymerizable composition, polymerization involving irradiation with ultraviolet rays having a wavelength of 390 nm or more is suitable in some cases. The light is preferably non-polarized diffused light. The intensity of ultraviolet radiation is preferably in the range of 0.05 kW/m$^2$ to 10 kW/m$^2$, and especially preferably 0.2 kW/m$^2$ to 2 kW/m$^2$. At an intensity of less than 0.05 kW/m$^2$, the polymerization procedure takes a lot of time to be completed. At an intensity of greater than 2 kW/m$^2$, the liquid crystal molecules in the polymerizable liquid crystal composition are likely to undergo photolysis, and heat of polymerization is greatly generated to increase the temperature in the polymerization procedure, which causes a change in the order parameter of polymerizable liquid crystal with the result that the retardation of a coating may be out of order after the polymerization.

In order to promote the polymerization reaction in the coating, the coating cured through polymerization by radiation of active energy rays may be thermally cured. The coating is preferably thermally cured at a temperature of not less than 200° C.

An optically anisotropic body having regions with different directions of alignment can be produced as follows: only the intended part is irradiated with ultraviolet rays with a mask to be polymerized, the alignment state of the non-polymerized part is subsequently changed by application of an electric field or magnetic field or by a change in temperature, and then this non-polymerized part is polymerized.

An optically anisotropic body having regions with different directions of alignment can be produced also as follows: the polymerizable liquid crystal composition that has not been polymerized yet is subjected to application of an electric field or magnetic field or a change in temperature in advance to regulate an alignment state before only the intended part is irradiated with ultraviolet rays with a mask to be polymerized, and then polymerization is performed in this state by irradiation with light with a mask.

The optically anisotropic body produced through polymerization of the polymerizable liquid crystal composition in the present invention can be removed from the substrate and used in this state or can be used without being removed from the substrate. In particular, the optically anisotropic body is less likely to contaminate other members and therefore useful as a substrate on which a layer is to be formed or useful for being attached to another substrate.

(Alignment Treatment)

The substrate may be provided with an alignment film in order to align the polymerizable composition used in the present invention after the solution of the polymerizable composition is applied and dried. Alignment treatment can be, for example, a stretching treatment, a rubbing treatment, a treatment with radiation of polarized ultraviolet and visible light, an ion beam treatment, or oblique deposition of SiO$_2$ on the substrate. In the case where an alignment film is used, any of known alignment films can be employed. Examples of such alignment films include those formed of compounds, such as polyimide, polysiloxane, polyamide, polyvinyl alcohol, polycarbonate, polystyrene, polyphenylene ether, polyarylate, polyethylene terephthalate, polyether sulfone, epoxy resins, epoxyacrylate resins, acrylic resins, coumarin compounds, chalcone compounds, cinnamate compounds, fulgide compounds, anthraquinone compounds, azo compounds, and arylethene compounds. A compound that is to be rubbed for the alignment treatment is preferably a compound of which the crystallization of the material is promoted by the alignment treatment itself or heating after the alignment treatment. Among compounds that are to be subjected to the alignment treatment other than the rubbing, photo-aligned materials are preferably used.

(Color Filter)

The liquid crystal display device of the present invention may include a color filter. The color filter includes a black matrix and pixels of at least three colors of RGB. The color filter layer may be formed by any technique. In an example of formation of the color filter, a colored composition containing a pigment support and a color pigment dispersed in the pigment support is applied into a predetermined pattern, the pattern is cured to form a colored pixel, and this process is repeated necessary times to form a color filter layer. The pigment contained in the colored composition can be an organic pigment and/or an inorganic pigment. The colored composition may contain one organic or inorganic pigment and may contain several different organic pigments and/or inorganic pigments. The pigment is preferably highly chromogenic and thermally resistant, particularly resistant to thermal decomposition. In general, an organic pigment is used. Specific examples of organic pigments usable in the colored composition will now be describe on the basis of color index numbers.

Examples of organic pigments usable in a red colored composition include red pigments such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, and 279. The organic pigment used in the red colored composition may be a mixture of a red pigment and a yellow pigment.

Examples of usable yellow pigments include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213, and 214.

Examples of organic pigments usable in a green colored composition include green pigments such as C.I. Pigment Green 7, 10, 36, and 37. The organic pigment used in the green colored composition may be a mixture of a green pigment and a yellow pigment. Examples of usable yellow pigments are the same as the above-mentioned examples given in the description of the red colored composition.

Examples of organic pigments usable in a blue colored composition include blue pigments such as C.I. Pigment Blue 15, 15:1, 15:2, 15:3, 15:4, 15:6, 16, 22, 60, and 64. The organic pigment used in the blue colored composition may be a mixture of a blue pigment and a purple pigment. Examples of usable purple pigments include C.I. Pigment Violet 1, 19, 23, 27, 29, 30, 32, 37, 40, 42, and 50.

Examples of usable inorganic pigments include powder of metal oxide, such as chrome yellow, zinc yellow, red iron oxide (iron (III) oxide), cadmium red, ultramarine, Prussian blue, chromic oxide green, and cobalt green; powder of metal sulfide; and metal powder. Inorganic pigments may be used in combination with organic pigments in order to, for instance, balance color saturation with brightness and give good coating properties, sensitivity, and developability.

The colored composition may further contain a coloring material in addition to the pigments. The colored composition may, for example, contain a dye provided that it can have a sufficient thermal resistance. In this case, the dye serves for mixing colors.

The pigment support contained in the colored composition is a resin, a precursor thereof, and a mixture of them. Examples of the resin include thermoplastic resins, thermosetting resins, and photosensitive resins; and examples of the precursor thereof include polyfunctional monomers and oligomers that are cured into resins by being exposed to radiation. These can be used alone or in combination. In the case where the colored composition is cured by being irradiated with light such as ultraviolet rays, the colored composition may, for instance, contain a photopolymerization initiator and optionally a sensitizer. The colored composition may further contain a chain-transfer agent such as a polyfunctional thiol. The colored composition can be produced by, for instance, finely dispersing at least one pigment and optionally the above-mentioned photopolymerization initiator in a pigment support and an organic solvent with a disperser such as a three-roll mill, a two-roll mill, a sand mill, a kneader, or an attritor. A colored composition containing two or more pigments may be produced by preparing dispersions individually containing different pigments and mixing the prepared solutions.

In order to disperse the pigment in a pigment support and an organic solvent, a dispersion aid such as a resin-type pigment dispersant, a surfactant, or a pigment derivative can be used. The dispersion aid enables better dispersion of the pigment and restrains the dispersed pigment from being agglomerated again. Hence, use of a colored composition in which the pigment has been dispersed in a pigment support and an organic solvent with the aid of the dispersion aid enables production of a color filter with an excellent transparency.

The amount of the dispersion aid in the colored composition is, for example, preferably in the range of 0.1 to 40 parts by weight, and more preferably 0.1 to 30 parts by weight relative to 100 parts by weight of the pigment.

The resin-type pigment dispersant has a pigment-affinitive part that is likely to be adsorbed to the pigment and has another part that is compatible with the pigment support. The resin-type pigment dispersant is adsorbed to the pigment to enable the stable dispersion of the pigment in the pigment support. Examples of the resin-type pigment dispersant include oil-based dispersants, e.g., polyurethane, polycarboxylate such as polyacrylate, unsaturated polyamide, polycarboxylic acid, amine salts of polycarboxylic acid, partial amine salts of polycarboxylic acid, ammonium polycarboxylate, alkylamine polycarboxylate, polysiloxane, long-chain polyaminoamide phosphate and hydroxyl group-containing polycarboxylate, modified products thereof, amide produced through a reaction of poly(lower alkylene imine) with polyester having a free carboxyl group, and salts thereof; water-soluble resins or water-soluble macromolecular compounds, e.g., acrylic acid-styrene copolymers, methacrylic acid-styrene copolymers, acrylic acid-acrylate copolymers, acrylic acid-methacrylate copolymers, methacrylic acid-acrylate copolymers, methacrylic acid-methacrylate copolymers, styrene-maleic acid copolymers, polyvinyl alcohol, and polyvinyl pyrrolidone; polyesters; modified polyacrylates; ethylene oxide/propylene oxide adducts; phosphates; and mixtures containing two or more of them. Furthermore, an overcoat may be formed on the surface of the color filter layer to serve as a planarization layer. The color filter layer may be provided at any position; for example, it may be disposed at a predetermined position such as between the electrode and the retardation layer, between the transparent substrate and the retardation layer, and between the transparent substrate and the alignment film.

(Alignment Film)

The liquid crystal display device of the present invention may include alignment films disposed on the liquid-crystal-composition side surfaces of the first and second substrates to align the molecules of the liquid crystal composition.

The material used for forming the alignment films can be a transparent organic material such as polyimide, polyamide, BCB (benzocyclobutene polymer), or polyvinyl alcohol; in particular, polyimide alignment films formed though imidizing of a polyamic acid synthesized from diamine such as an aliphatic or alicyclic diamine, e.g., p-phenylenediamine and 4,4'-diaminodiphenyl methane; an aliphatic or alicyclic tetracarboxylic acid anhydride such as butanetetracarboxylic acid anhydride or 2,3,5-tricarboxycyclopentyl acetic acid anhydride; or an aromatic tetracarboxylic acid anhydride such as pyromellitic acid dianhydride are preferred. In this case, rubbing is generally carried out to give an alignment function; however, in the case where the alignment film is used as, for instance, a vertical alignment film, the alignment film can be used without the alignment function being given.

Materials usable for forming the alignment film may be materials of which the compounds contain, for instance, a chalcone, cinnamate, cinnamoyl, or azo group. Such materials may be used in combination with another material such as polyimide or polyamide; in this case, the alignment film may be rubbed or treated by a photo-alignment technique.

In general formation of alignment films, the above-mentioned material of the alignment film is applied onto a substrate by, for example, spin coating to form a resin films; besides, uniaxial stretching, a Langmuir-Blodgett technique, or another technique can be employed.

Figure 3:
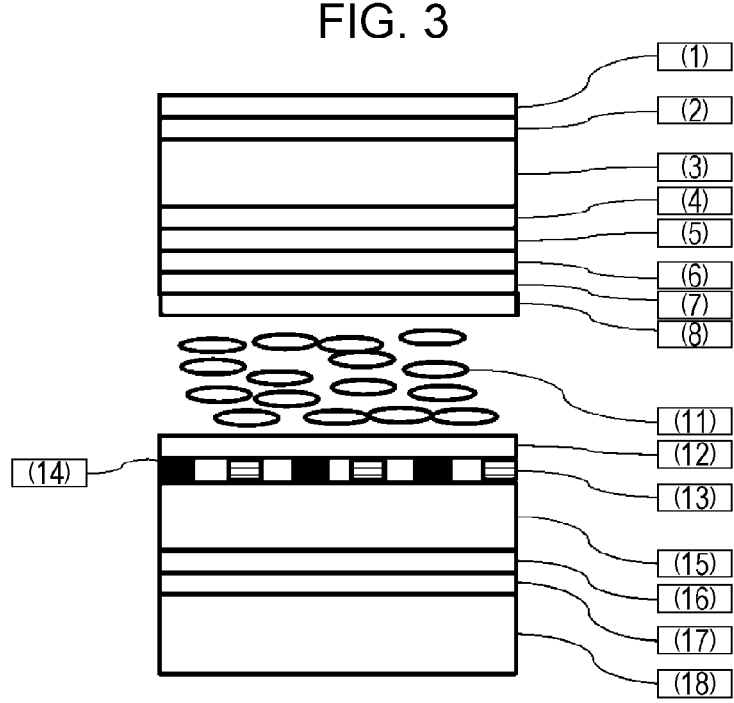
FIG. 3 illustrates another example of the liquid crystal display device of the present invention.
Figure 4:
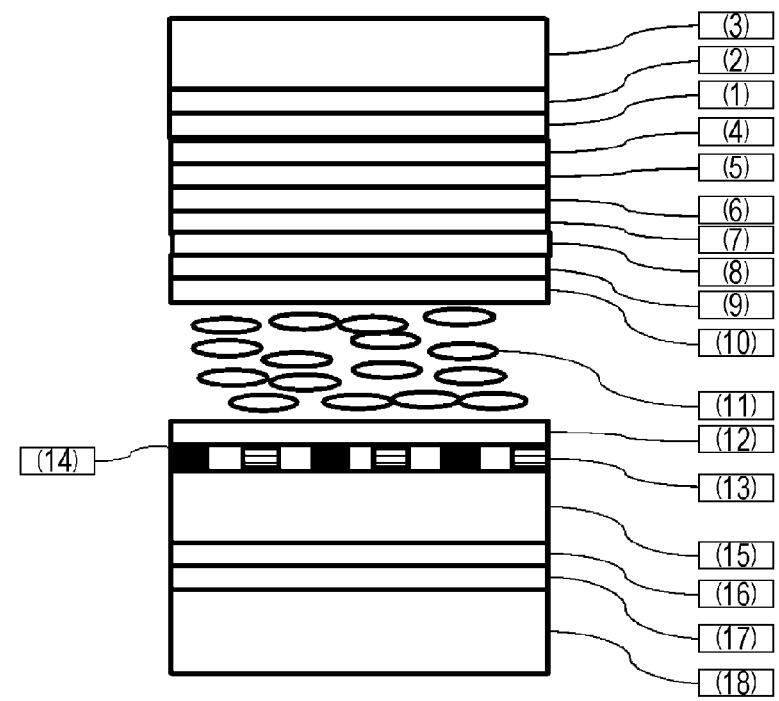
FIG. 4 illustrates another example of the liquid crystal display device of the present invention.
Figure 5:
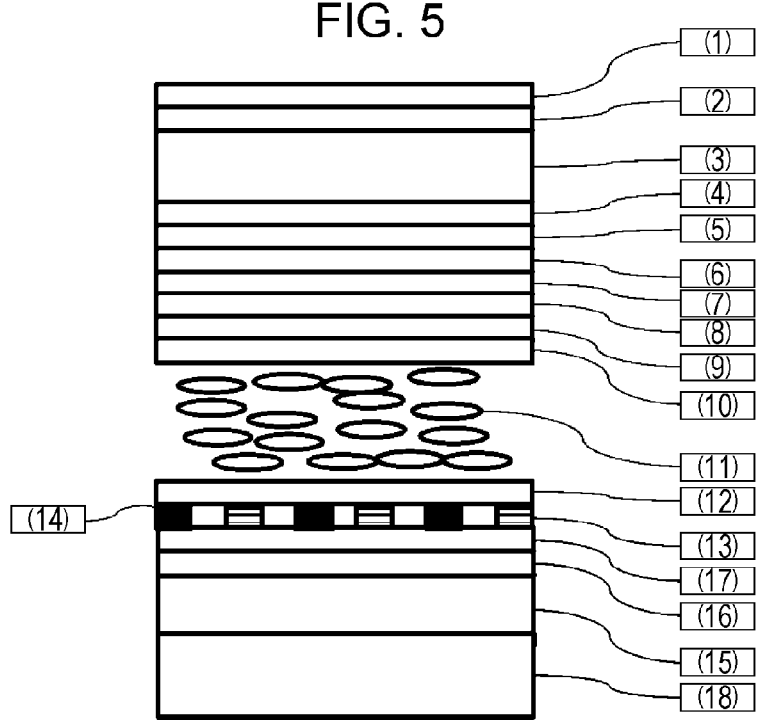
FIG. 5 illustrates another example of the liquid crystal display device of the present invention.
Figure 6:
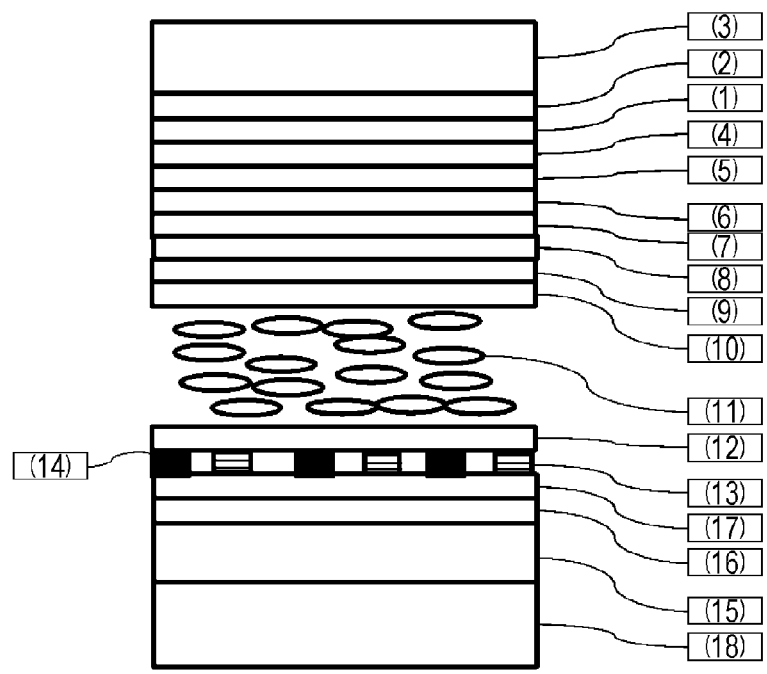
FIG. 6 illustrates another example of the liquid crystal display device of the present invention.
Figure 7:
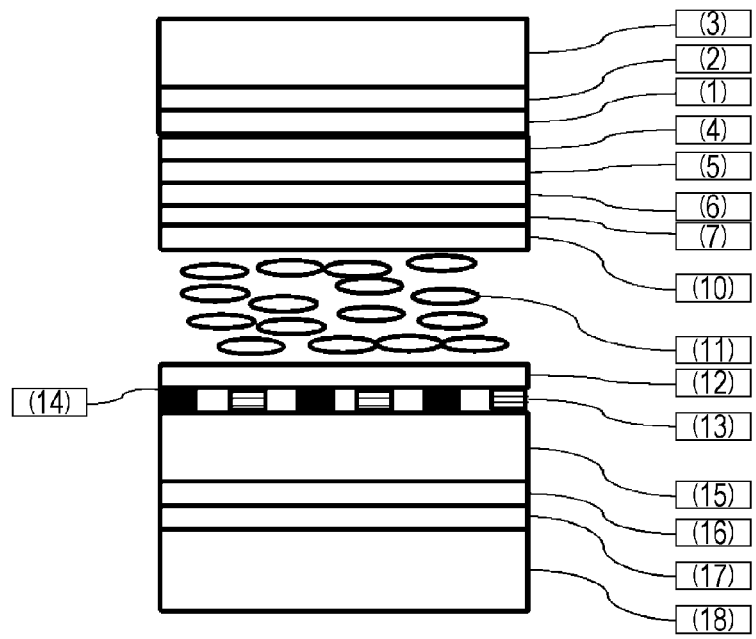
FIG. 7 illustrates another example of the liquid crystal display device of the present invention.
Figure 8:
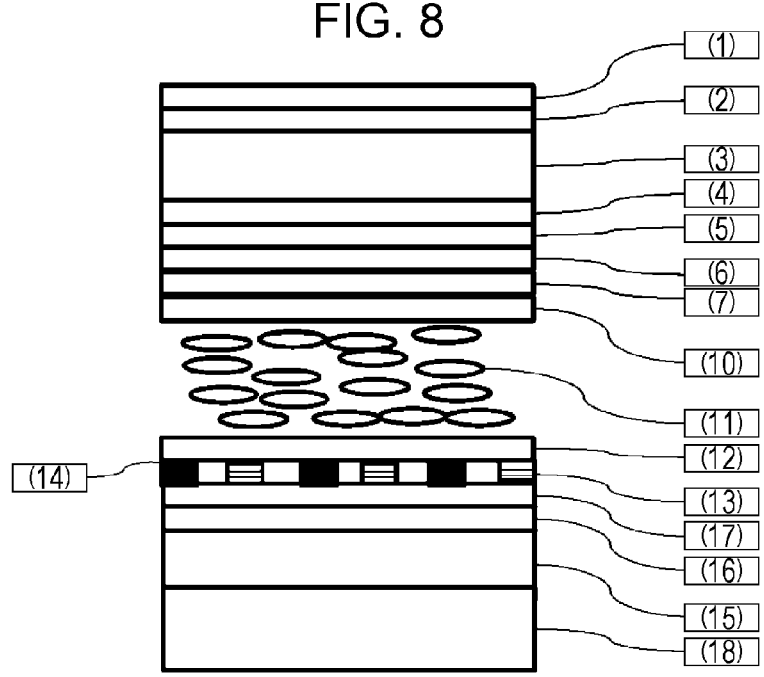
FIG. 8 illustrates another example of the liquid crystal display device of the present invention.
Figure 9:
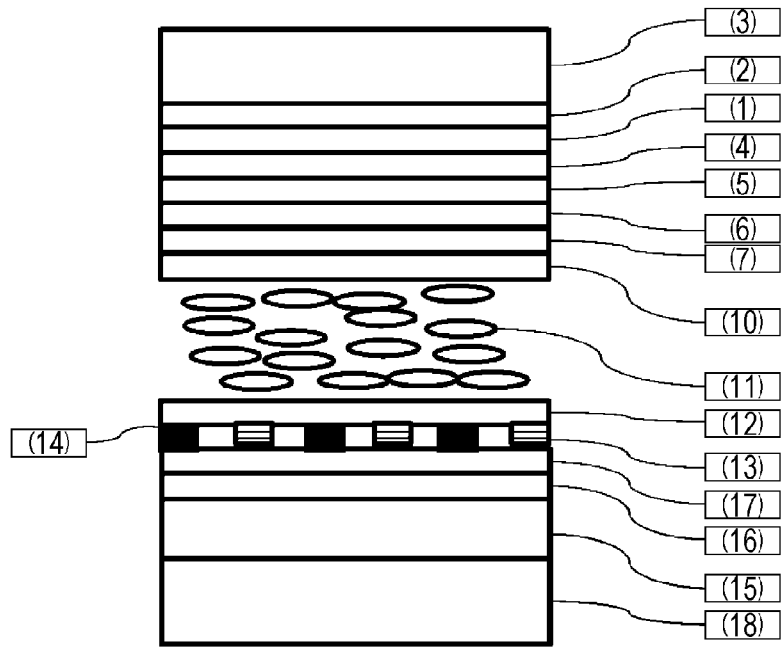
FIG. 9 illustrates another example of the liquid crystal display device of the present invention.

The material used for forming the alignment film may be an optically anisotropic body (positive A plate) produced through polymerization of the polymerizable liquid crystal composition that is in homogeneous alignment. FIG. 3 illustrates an example of such a liquid crystal display device, but the liquid crystal display device is not limited thereto.

(Transparent Electrode)

In the liquid crystal display device of the present invention, the material used for forming a transparent electrode can be a conductive metal oxide. Usable metal oxides are indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and metal nanowires; among these, zinc oxide (ZnO), indium tin oxide ($In_2O_3$—$SnO_2$), and indium zinc oxide ($In_2O_3$—ZnO) are preferred. A transparent conductive film formed of any of such materials can be patterned by photo-etching or a technique involving use of a mask.

The liquid crystal display device is combined with a backlight for various applications such as liquid crystal television sets, computer monitors, mobile phones, smartphone displays, laptops, portable information terminals, and digital signage. Examples of the backlight include cold-cathode tube backlights and virtually white backlights with two peak wavelengths or backlights with three peak wavelengths; in the backlight with two or three peak wavelengths, light-emitting diodes using inorganic materials or organic EL devices are used.

(Backlight)

The backlight may have any structure. The backlight may have a light guide plate or may be a direct backlight. The backlight having a light guide plate includes a light source and a light guide plate, and the direct backlight includes a light source and a diffusion plate. Any light source can be used in the backlight, and examples of usable light sources include lamp bulbs, light emitting diodes (LEDs), electroluminescent panels (ELPs), and at least one cold cathode fluorescent lamps (CCFLs) and hot cathode fluorescent lamps (HCFLs).

Furthermore, components to enhance utilization efficiency of light can be used in the backlight, such as reflectors and brightness enhancement films. In addition to these components, for example, one or more layers of a diffusion plate, a protective plate, a prism array, a lens array sheet, and a light diffusion plate can be disposed to form a liquid crystal display device.

(Polarization Layer)

The liquid crystal display device of the present invention may include a polarization layer. The polarization layer is a member having a function of converting natural light into linearly polarized light. Any polarization film having a polarizing function can be used as the polarization layer. Examples thereof include films produced by adsorbing iodine and a dichromic colorant to a polyvinyl alcohol film and stretching the resulting film, films produced by stretching a polyvinyl alcohol film and adsorbing iodine and a dichromic dye or dichromic colorant to the stretched film, films each having a polarization layer formed by applying an aqueous solution containing a dichromic dye onto a substrate, and wire grid polarizers.

The polyvinyl alcohol resin to be used can be a material produced by saponification of a polyvinyl acetate resin, and examples of the polyvinyl acetate resin include a polyvinyl acetate that is a homopolymer of vinyl acetate and copolymers of vinyl acetate and other monomers that are copolymerizable with vinyl acetate. Examples of such other monomers that are copolymerizable with vinyl acetate include unsaturated carboxylic acids, olefins, vinyl ethers, unsaturated sulfonic acids, and acrylamides each having an ammonium group. The film of the polyvinyl alcohol resin can be formed by any of known techniques. The unprocessed polyvinyl alcohol film has any thickness; for example, the thickness is approximately in the range of 10 to 150 μm.

In the case where iodine is used as the dichromic colorant, the film of the polyvinyl alcohol resin is colored generally by being immersed into an aqueous solution containing iodine and potassium iodide. In the case where a dichromic dye is used as the dichromic colorant, the film of the polyvinyl alcohol resin is colored generally by being immersed into an aqueous solution containing a water-soluble dichromic dye.

In the case of using a film having a polarization layer formed by applying an aqueous solution containing a dichromic dye onto a substrate, examples of the dichromic colorant to be applied include, depending on types of the substrate to be used, direct dyes, water-soluble dyes such as acid dyes, salts thereof, dispersion dyes, and water-insoluble colorants such as oil-soluble pigments. These colorants are generally dissolved in water and an organic solvent, to which a surfactant is optionally added, and then applied to a substrate subjected to rubbing or a corona treatment. Examples of the organic solvent generally include, depending on the solvent resistance of the substrate, alcohols such as methanol, ethanol, and isopropyl alcohol; cellosolves such as methyl cellosolve and ethyl cellosolve; ketones such as acetone and methyl ethyl ketone; amides such as dimethylforma<de and N-methylpyrrolidone; and aromatic organic solvents such as benzene and toluene. The amount of the colorant to be applied is, depending on the polarizing properties of the colorant, generally in the range of 0.05 to 1.0 g/po, and preferably 0.1 to 0.8 g/rrf. Examples of a technique for applying a color PfJ solution to a substrate include a variety of coating techniques such as a coating technique involving use of a bar coater, spray coating, roll π coating, a coating technique involving use of a gravure coater.

In the case of using a wire grid polarizer, a wire grid polarizer formed of a conductive material such as Al, Cu, Ag, Cu, Ni, Cr, or Si is preferably used.

The polarization layer may optionally further include a film that serves as a protective film. Examples of the protective film include polyolefin films formed of, e.g., polyethylene, polypropylene, and norbornene polymers; polyethylene terephthalate films; polymethacrylate films; polyacrylate films; cellulose ester films; polyethylene naphthalate films; polycarbonate films; polysulfone films; polyethersulfone films; polyether ketone films; polyphenylene sulfide films; and polyphenylene oxide films.

In an embodiment of the present invention, an in-cell polarization layer in which a polarization layer is disposed inside a liquid crystal cell may be used. FIGS. 4 to 9 illustrate examples of such a liquid crystal display device, but the liquid crystal display device is not limited thereto.

(Adhesive Layer)

An adhesive layer may be provided in an optical member including the above-mentioned polarization layer for the attachment to the liquid crystal cell. The adhesive layer can be provided also to be attached to members other than the liquid crystal cell. An adhesive used for forming the adhesive layer is not particularly limited; for example, appropriate one is selected from acryl polymers, silicone polymers, polyesters, polyurethanes, polyamides, polyethers, and materials containing fluorine polymers or rubber polymers as base polymers. In particular, a material which has excellent optical transparency; which exhibits appropriate adhesion characteristics such as wetting properties, agglomerating properties, and adhesiveness; and which is excellent in terms of weather resistance and thermal resistance, such as an acryl adhesive, is preferably used. In addition, an adhesive layer having a low moisture absorptivity and excellent thermal resistance is preferred in terms of prevention of foaming or peeling caused by the absorption of moisture, prevention of the degradation of the optical characteristics or the warp of the liquid crystal cell due to, for instance, the difference in thermal expansion, and the formability of a liquid crystal display device having a high quality and excellent durability. Furthermore, from the viewpoint of work efficiency (re-workability) in the fixation and attachment of the polarization plate, the adhesive force of the adhesive layer is preferably not less than 1 N/25 mm, and more preferably not less than 5 N/25 mm. Meanwhile, there is no particular limitation regarding the upper limit thereof. The adhesive layer may contain, for example, resins of a natural substance or a synthetic substance, that is, an adhesiveness-imparting resin; a filler or pigment made of a glass fiber, a glass bead, metal powder, or other inorganic powder; and additives to be added to the adhesive layer, such as a colorant and an antioxidant. In addition, the adhesive layer may be, for example, an adhesive layer containing fine particles and thus exhibiting light-diffusion properties. The adhesive layer can be also provided on either or both of the surfaces of the polarization plate or the optical member in the form of multiple layer having different compositions or types. In the case where the adhesive layers are provided on both the surfaces, adhesive layers having different compositions, types, and thicknesses can be individually provided on the front and back sides of the polarization plate or the optical member. The thickness of the adhesive layer can be appropriately determined on the basis of the usage or adhesive force and is generally in the range of 1 to 500 μm, preferably 5 to 200 μm, and especially preferably 10 to 100 μm.

(Liquid Crystal Display Device)

The liquid crystal display device is a display device in which a liquid crystal material is confined between light-transmitting substrates such as glass. In the liquid crystal display device, the molecular alignment of the liquid crystal material is changed owing to electrical control by display controller (not illustrated) to change the polarization state of light emitted from the backlight and polarized by the polarization plate disposed on the back side of the liquid crystal cell, and the amount of light that passes through the polarization plate disposed on the viewing side of the liquid crystal cell is controlled, thereby displaying images. In the liquid crystal display device of this embodiment, rod-like liquid crystal molecules having a negative dielectric anisotropy are aligned. The liquid crystal cell used in the present invention is characterized in that it includes "in-cell retardation layer" in which a retardation layer is disposed between a pair of light-transmitting substrates.

Figure 10:
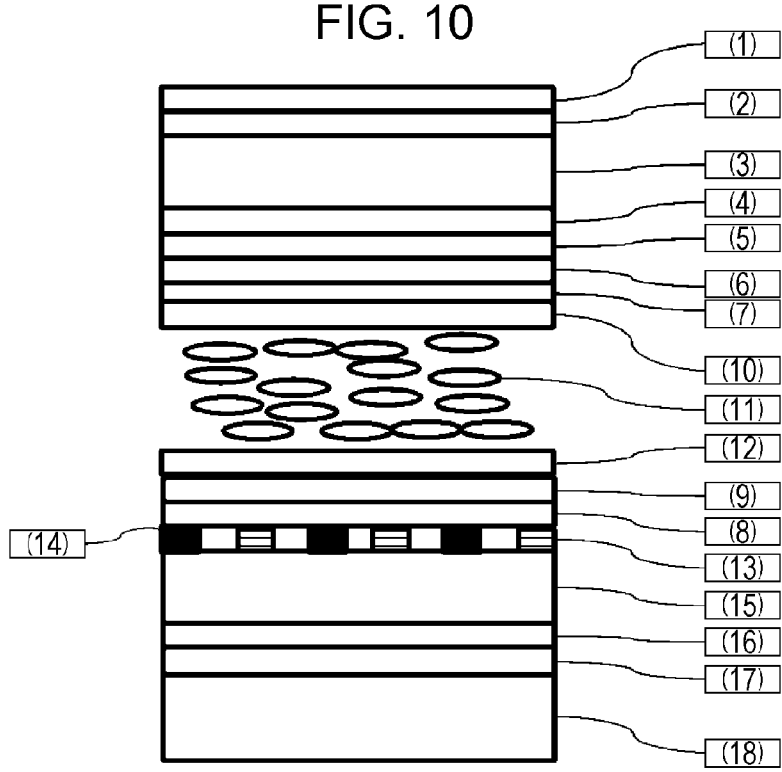
FIG. 10 illustrates another example of the liquid crystal display device of the present invention.

In the retardation layer disposed inside the liquid crystal cell, an optically anisotropic body produced through polymerization of the polymerizable liquid crystal composition that is in an aligned state is used. The structure of the liquid crystal display device illustrated in FIG. 1 is merely an example, and the position of the retardation layer is not limited to the position thereof in this structure. The retardation layer may be, for example, provided at a predetermined position such as between the electrode and the alignment film on the back side (See FIG. 10).

In the present invention, the ring structures, linking groups, and substituents in general formulae are independent in each of the general formulae.

EXAMPLES

Although some preferred embodiments of the present invention will now be described in detail with reference to Examples, the present invention is not limited to Examples. In compositions which will be described in Examples and Comparative Examples, the term "%" refers to "mass %".

In Examples, the following properties were measured.

$T_{ni}$: Nematic phase-isotropic liquid phase transition temperature (° C.)

Δn: Refractive index anisotropy at 25° C.

Δ∈: Dielectric anisotropy at 25° C.

η: Viscosity at 20° C. (mPa·s)

$γ_1$: Rotational viscosity at 25° C. (mPa·s)

$d_{gap}$: Gap between first and second substrates in cell (μm)

VHR: Voltage holding ratio at 70° C. (%)

(ratio, represented by %, of a measured voltage to the initially applied voltage, which was obtained as follows: a liquid crystal composition was put into a cell having a thickness of 3.5 μm, and the measurement was carried out under the conditions of an applied voltage of 5 V, a frame time of 200 ms, and a pulse width of 64 μs)

ID: Ion density at 70° C. ($pC/cm^2$)

(ion density obtained as follows: a liquid crystal composition was put into a cell having a thickness of 3.5 μm, and measurement was carried out with an MTR-1 (manufactured by TOYO Corporation) under the conditions of an applied voltage of 20 V and a frequency of 0.05 Hz)

Image-Sticking:

In evaluation of image-sticking in a liquid crystal display device, a certain fixed pattern was displayed in a display area for 1000 hours, and then an image was shown evenly on the whole of the screen. Then, the degree of an afterimage of the fixed pattern was visually observed, and result of the observation was evaluated on the basis of the following four criteria.

Excellent: No afterimage observed

Good: Slight afterimage observed, but acceptable

Bad: Afterimage observed, unacceptable

Poor: Afterimage observed, quite inadequate In Examples, compounds are abbreviated as follows.

(Ring Structure)

[Chem. 87]

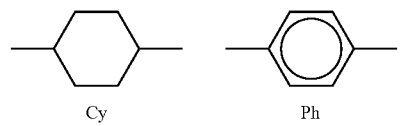

Cy     Ph

-continued

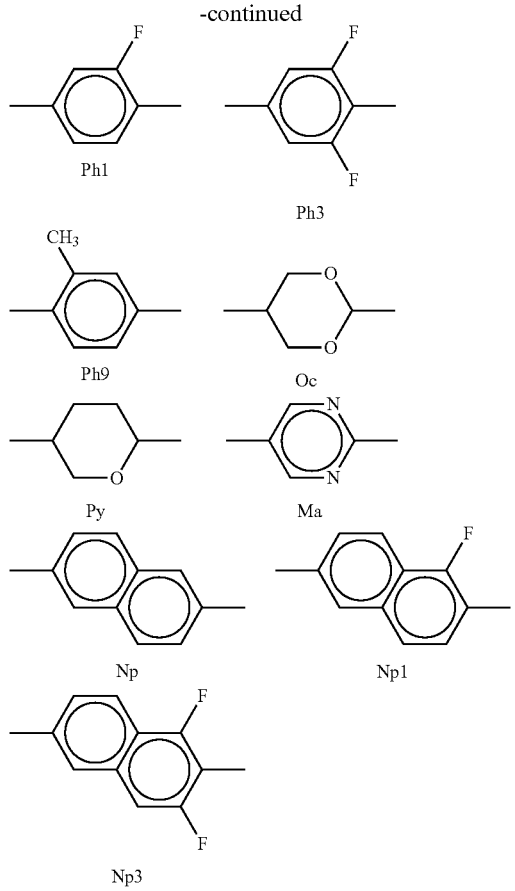

(Side Chain and Linking Group)

TABLE 1

| n (number) at terminal | $C_nH_{2n+1}—$ |
|---|---|
| -2- | $—CH_2CH_2—$ |
| -1O- | $—CH_2O—$ |
| -O1- | $—OCH_2—$ |

TABLE 1-continued

| n (number) at terminal | $C_nH_{2n+1}—$ |
|---|---|
| -V- | —CO— |
| -VO- | —COO— |
| -CFFO- | $—CF_2O—$ |
| -F | —F |
| -Cl | —Cl |
| -CN | —C≡N |
| -OCFFF | $—OCF_3$ |
| -CFFF | $—CF_3$ |
| -On | $—OC_nH_{2n+1}—$ |
| -T- | —C≡C— |
| -N- | —CH=N—N=CH— |
| ndm- | $C_nH_{2n+1}—HC=CH—(CH_2)_{m-1}—$ |
| -ndm | $—(CH_2)_{n-1}—HC=CH—C_mH_{2m+1}$ |
| ndmO- | $C_nH_{2n+1}—HC=CH—(CH_2)_{m-1}O—$ |
| -Ondm | $—O—(CH_2)_{n-1}—HC=CH—C_mH_{2m+1}$ |
| -ndm- | $—(CH_2)_{n-1}—HC=CH—(CH_2)_{m-1}—$ |

[Preparation of Polymerizable Liquid Crystal Compositions]

The polymerizable liquid crystal composition used in the present invention for forming a retardation layer was prepared as follows.

(Preparation of Polymerizable Liquid Crystal Composition 1)

With a stirring apparatus having a stirring propeller, 34 parts of a compound (A1), 10 parts of a compound (A2), 28 parts of a compound (B1), 28 parts of a compound (B2), 0.1 part of a compound (E1), 0.2 parts of a compound (H1), 300 parts of propylene glycol monomethyl ether acetate (PGMEA) as an organic solvent (D1), and 3 parts of a compound (F1) were stirred for an hour at a stirring speed of 500 rpm and a solution temperature of 60° C. The resulting product was filtered through a 0.2-μm membrane filter (PTFE, thickness: 60 μm) at a filtration pressure adjusted to be 0.20 MPa, thereby obtaining a polymerizable liquid crystal composition 1 used in the present invention.

(Preparation of Polymerizable Liquid Crystal Compositions 2 to 8 and Comparative Polymerizable Liquid Crystal Compositions 1 to 6)

As in the preparation of the polymerizable liquid crystal composition 1, compounds shown in Tables 1 to 4 were prepared to obtain polymerizable liquid crystal compositions 2 to 8 used in the present invention and comparative polymerizable liquid crystal compositions 1 to 6.

[Chem. 88]

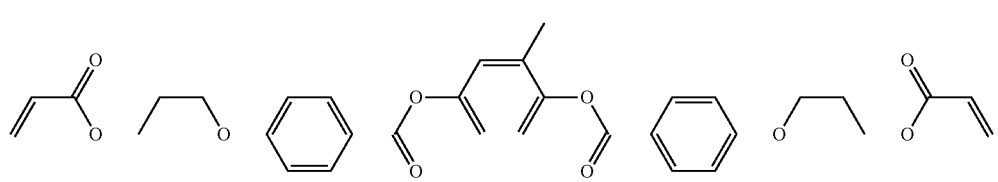

(A1)

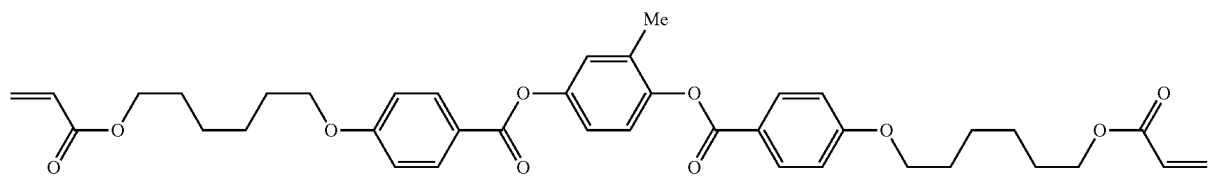

(A2)

-continued
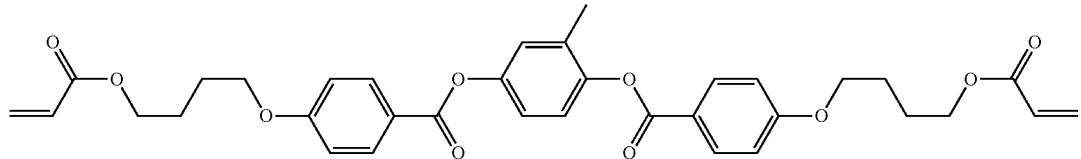
(A3)
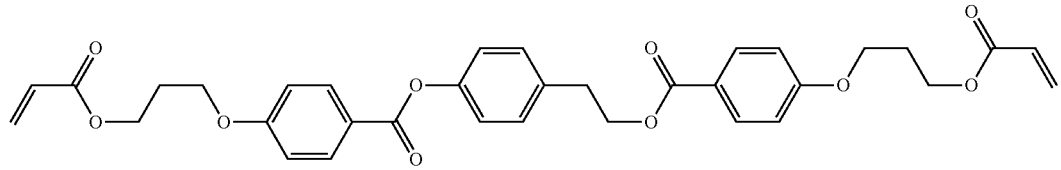
(A4)
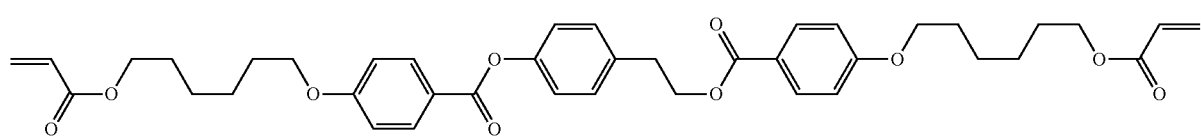
(A5)
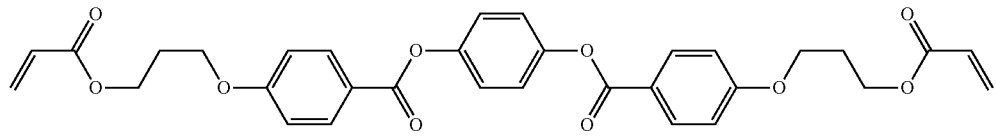
(A6)
[Chem. 89]
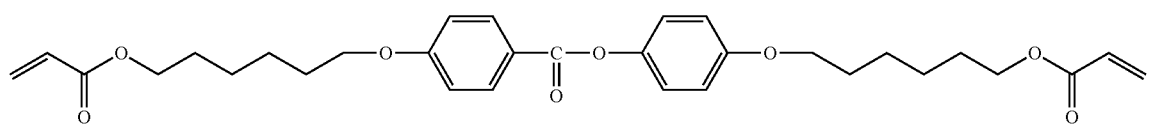
(A7)
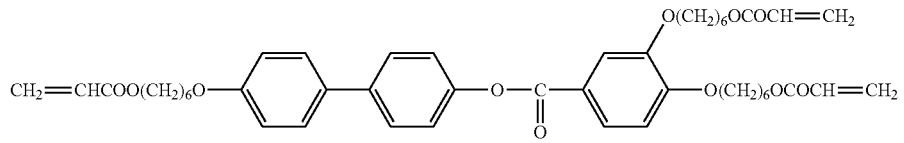
(A8)
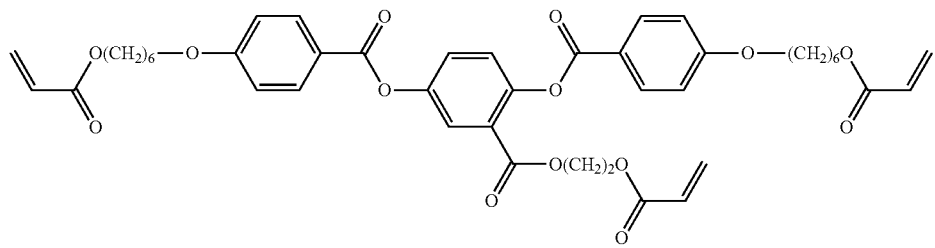
(A9)
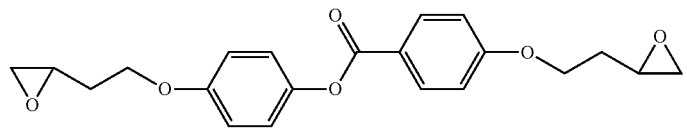
(A10)
[Chem. 90]
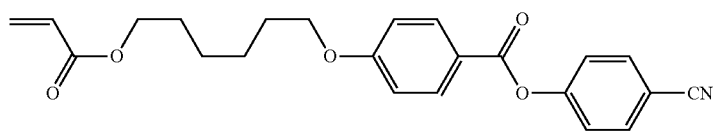
(B1)

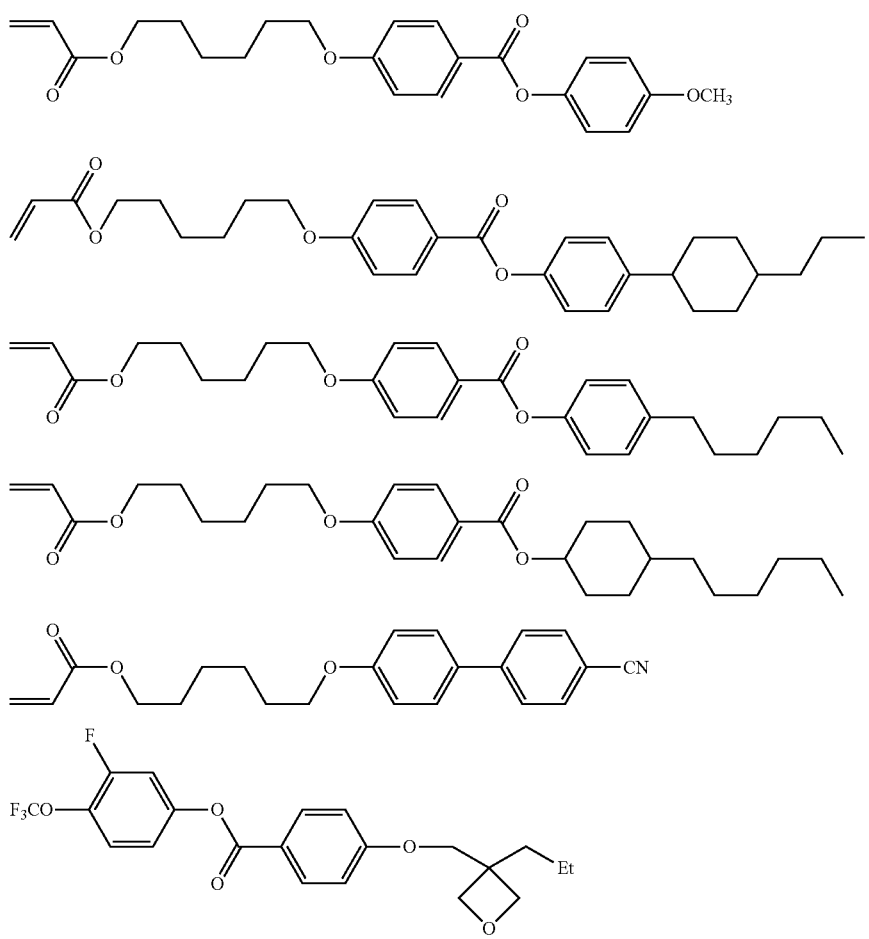

Trimethylolpropane triacrylate (C1)
Phenoxyethyl acrylate (C2)
Propylene glycol monomethyl ether acetate (D1)
p-methoxyphenol (E1)
Irgacure 907 (F1)
DTZ-102 (G1)
Polypropylene (Weight average molecular weight (MW): 1275) (H1)
F-556 (H2)

TABLE 2

| Polymerizable liquid crystal compositions Compounds | (1) | (2) | (3) | (4) | (5) | (6) | (7) | (8) |
|---|---|---|---|---|---|---|---|---|
| (A1) | 34 | | 10 | | 21 | | | |
| (A2) | 10 | | | | 23 | | | |
| (A3) | | 50 | 40 | | | | | |
| (A4) | | 10 | 25 | | | | 43 | 15 |
| (A5) | | 10 | 25 | | | | 43 | 45 |
| (A6) | | 10 | | | | | | |
| (A7) | | | | | | | 40 | |
| (A8) | | 20 | | | | | | |
| (A9) | | | | 30 | | | | |
| (A10) | | | | | | | | 80 |
| (B1) | 28 | | | | 21 | | | |
| (B2) | 28 | | | | | | | |
| (B3) | | | | | | 35 | | |
| (B4) | | | | 35 | | | | |
| (B5) | | | 35 | | | | | |
| (B6) | | | | | | 14 | | |
| (B7) | | | | | | | | 20 |
| (C1) | | 5 | | | | | | |
| (C2) | | | | | | | 3 | |
| (D1) | 300 | 300 | 300 | 300 | 300 | 300 | 300 | 300 |
| (E1) | 0.1 | 0.1 | 0.1 | 0.1 | 0.1 | 0.1 | 0.1 | |
| (F1) | 3 | 3 | 3 | 3 | 3 | 3 | 3 | |
| (G1) | | | | | | | | 3 |
| (H1) | 0.2 | 0.2 | 0.2 | 0.2 | | | | |
| (H2) | | | | | 0.1 | 0.1 | 0.1 | 0.1 |

TABLE 3

| Comparative polymerizable liquid crystal compositions Compounds | (1) | (2) | (3) | (4) | (5) | (6) |
|---|---|---|---|---|---|---|
| (A1) | 10 | | 5 | 10 | | |
| (A2) | 10 | | 3 | 10 | | |
| (A3) | | 10 | | | | |
| (A4) | | 5 | | | 10 | |
| (A5) | | | | | 5 | |
| (A6) | | | | | | |
| (A7) | | | | | | |

TABLE 3-continued

| Comparative polymerizable liquid crystal compositions Compounds | (1) | (2) | (3) | (4) | (5) | (6) |
|---|---|---|---|---|---|---|
| (A8) | | | | | | |
| (A9) | | | 5 | | | |
| (A10) | | | | | | 17 |
| (B1) | 40 | 30 | 7 | 40 | 20 | |
| (B2) | 40 | 30 | | | 5 | |
| (B3) | | 25 | | 40 | 30 | |
| (B4) | | | 40 | | 30 | |
| (B5) | | | 40 | | | |
| (B6) | | | | | | |
| (B7) | | | | | | 83 |
| (C1) | | | | | | |
| (C2) | | | | | | |
| (D1) | 300 | 300 | 300 | 300 | 300 | 300 |
| (E1) | 0.1 | 0.1 | 0.1 | 0.1 | 0.1 | |
| (F1) | 3 | 3 | 3 | 3 | 3 | |
| (G1) | | | | | | 3 |
| (H1) | 0.2 | 0.2 | 0.2 | | | |
| (H2) | | | | 0.1 | 0.1 | 0.1 |

(Preparation of Photo-Alignment Agent Composition 1 Used for Forming Retardation Layer)

A compound (monomer) represented by Formula (J) was synthesized as in the description of Examples 1 and 2 in Japanese Unexamined Patent Application Publication No. 2013-33248.

[Chem. 91]

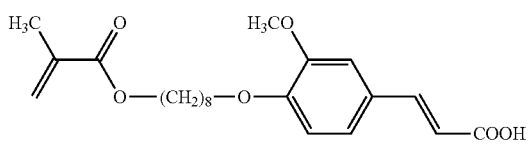

(J)

In a flask, 2.0 g of the monomer (J), 16.8 mg of azobisisobutyronitrile, and 20.2 mL of tetrahydrofuran were mixed with each other, the mixture was stirred in a nitrogen atmosphere at 60° C. for 8 hours, five times the amount of hexane to the monomer used (5 mL per 1 g of monomer) was subsequently added thereto to precipitate the reaction mixture, and the supernatant liquid was removed through decantation. The reaction mixture was dissolved again in three times the amount of tetrahydrofuran to the monomer used (3 mL per 1 g of monomer), and five times the amount of hexane to the monomer used (5 mL per 1 g of monomer) was added thereto to precipitate the reaction mixture, and then the supernatant liquid was removed through decantation. This sequential procedure of the redissolution in tetrahydrofuran, the precipitation with hexane, and the decantation was further repeated three times; and then the resulting reaction mixture was dried at 20° C. under reduced pressure in a state in which light was shielded to yield 1.71 g of a polymer represented by Formula (K).

[Chem. 92]

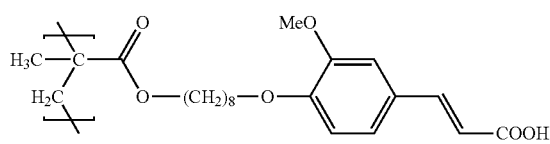

(K)

The weight average molecular weight Mw of the polymer represented by Formula (K) was 50,352. The mixture of 2 parts by mass of the photo-alignment agent (K) and 98 parts by mass of PGME was stirred at room temperature for 10 minutes. The polymer solution in which the polymer had been uniformly dissolved in the solvent was filtered through a 1-μm membrane filter to obtain a photo-alignment agent composition 1 used for forming a retardation layer.

(Retardation Layer of Stretched Film)

A COP film of ZEONEX (manufactured by Zeon Corporation) was used.

Examples 1 to 4

Figure 11:
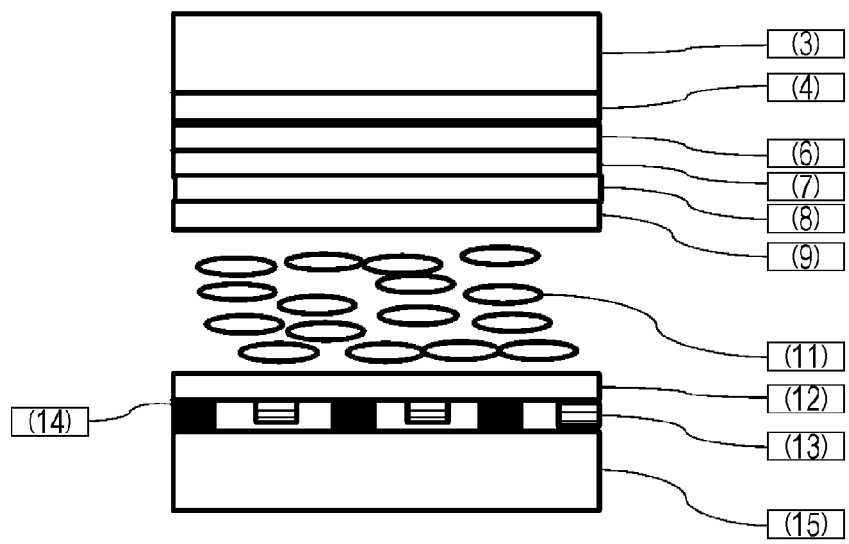
FIG. 11 illustrates another example of the liquid crystal display device of the present invention.

A color filter layer (4) was attached to the first light-transmitting substrate (3), and then an alignment film (6) for a retardation film was formed thereon. The polymerizable liquid crystal composition 5 was applied to the alignment film (6) for a retardation film with a spin coater, dried at 80° C. for 2 minutes, subsequently cooled at room temperature, and irradiated with 500 mJ/cm² of ultraviolet light emitted from a high pressure mercury lamp to form a first retardation layer (7) of a positive C plate. An alignment film (8) for a retardation film was formed on the first retardation layer (7). The alignment film (8) for a retardation film was slightly rubbed, then the polymerizable liquid crystal composition 1 was applied thereto with a spin coater, dried at 80° C. for 2 minutes, subsequently cooled at room temperature, and irradiated with 500 mJ/cm² of ultraviolet light emitted from a high pressure mercury lamp to form a second retardation layer (9) of a positive A plate. A transparent electrode layer (13) and a pixel electrode layer (14) were attached to a second light-transmitting substrate (15), and then an alignment film (12) was formed and subsequently slightly rubbed. The following liquid crystal composition was put into a liquid crystal layer (11) positioned between the second retardation layer (9) and the alignment film (12) to yield an IPS liquid crystal display device of Example 1. FIG. 11 illustrates the liquid crystal display device of Example 1.

Liquid crystal display devices of Examples 2 to 4 were produced as in Example 1 except that the following polymerizable liquid crystal compositions were used.

The VHRs and ID of the produced liquid crystal display devices were measured. The liquid crystal display devices were subjected to the evaluation of image-sticking. The following table shows results of the measurement and evaluation.

TABLE 4

| Liquid crystal composition 1 | |
|---|---|
| Compounds | Content (%) |
| 3-Cy-Cy-1d0 | 48 |
| 3-Cy-Cy-1d1 | 4 |
| 1-Ph-Ph-3d1 | 8 |
| 3-Cy-Ph-Ph-2 | 5 |
| 2-Ph-Ph1-Ph-3 | 5 |
| 3-Ph-Ph3-CFFO-Ph3-F | 2 |
| 3-Cy-Cy-CFFO-Ph3-F | 3 |
| 3-Ph-Ph1-Ph3-CFFO-Ph3-F | 7 |
| 4-Cy-Cy-Ph3-CFFO-Ph3-F | 5 |
| 2-Pr-Ph-Ph3-CFFO-Ph3-F | 6 |
| 3-Pr-Ph-Ph3-CFFO-Ph3-F | 7 |
| Tni/° C. | 75.5 |
| Δn | 0.112 |
| Δε | 3.5 |
| η/mPa · s | 13.8 |

TABLE 5

|  | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Polymerizable liquid crystal composition for second retardation layer | Polymerizable liquid crystal composition 1 | Polymerizable liquid crystal composition 1 | Polymerizable liquid crystal composition 1 | Polymerizable liquid crystal composition 1 |
| VHR | 99.3 | 99.4 | 99.6 | 99.3 |
| ID | 39 | 31 | 25 | 37 |
| Image-sticking | Excellent | Excellent | Excellent | Excellent |

In the liquid crystal composition 1, the temperature range of the liquid crystal layer was 75.5° C., which was practical for a liquid crystal composition used in TV; in addition, the liquid crystal composition 1 had a dielectric anisotropy with a large absolute value, low viscosity, and proper Δn.

Each of the liquid crystal display devices of Examples 1 to 4 had a high VHR and small ID. Furthermore, in the evaluation of image-sticking, no afterimage was observed.

Examples 5 to 12

IPS liquid crystal display devices of Examples 5 to 12 were produced as in Example 1 except that the following liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 6

| Liquid crystal composition 2 | | Liquid crystal composition 3 | |
|---|---|---|---|
| Compounds | Content (%) | Compounds | Content (%) |
| 4-Cy-Cy-1d0 | 15 | 5-Cy-Cy-1d0 | 5 |
| 0d1-Cy-Cy-Ph-1 | 4 | 3-Cy-Cy-1d1 | 10 |
| 0d3-Cy-Cy-Ph-1 | 14 | 0d1-Cy-Cy-Ph-1 | 8 |
| 3-Cy-Ph-Ph-Cy-3 | 3 | 5-Cy-Cy-Ph-O1 | 6 |
| 3-Cy-Ph-Ph1-Cy-3 | 4 | 2-Ph-Ph1-Ph-3 | 8 |
| 1-Cy-Cy-Ph3-F | 9 | 2-Cy-Cy-Ph3-F | 11 |
| 2-Cy-Ph-Ph3-F | 10 | 3-Cy-Cy-Ph3-F | 15 |
| 3-Cy-Ph-Ph3-F | 10 | 5-Cy-Cy-Ph3-F | 5 |
| 5-Cy-Ph-Ph3-F | 5 | 3-Cy-Ph-Ph3-F | 6 |
| 0d1-Cy-Cy-Ph1-F | 8 | 3-Cy-Ph-Ph1-F | 9 |
| 3-Cy-Cy-Ph1-Ph3-F | 8 | 4-Cy-Cy-Ph-OCFFF | 4 |
| 2-Ph-Ph3-CFFO-Ph3-F | 4 | 3-Cy-Cy-CFFO-Ph3-F | 7 |
| 3-Ph-Ph3-CFFO-Ph3-F | 6 | 5-Cy-Cy-CFFO-Ph3-F | 4 |
| Tni/° C. | 100.7 | 3-Cy-Cy-Ph1-Ph3-F | 2 |
| Δn | 0.094 | Tni/° C. | 103.2 |
| Δε | 8.0 | Δn | 0.102 |
| γ1/mPa · s | 108 | Δε | 7.1 |
| η/mPa · s | 22.2 | γ1/mPa · s | 96 |
|  |  | η/mPa · s | 20.8 |

TABLE 7

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Polymerizable liquid crystal composition for second retardation layer | Polymerizable liquid crystal composition 2 | Polymerizable liquid crystal composition 2 | Polymerizable liquid crystal composition 2 | Polymerizable liquid crystal composition 2 |
| VHR | 99.2 | 99.4 | 99.5 | 99.3 |
| ID | 44 | 33 | 28 | 39 |
| Image-sticking | Excellent | Good | Excellent | Excellent |

TABLE 8

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |

TABLE 8-continued

|  | Example 9 | Example 10 | Example 11 | Example 12 |
|---|---|---|---|---|
| Polymerizable liquid crystal composition for second retardation layer | Polymerizable liquid crystal composition 3 | Polymerizable liquid crystal composition 3 | Polymerizable liquid crystal composition 3 | Polymerizable liquid crystal composition 3 |
| VHR | 99.2 | 99.4 | 99.4 | 99.2 |
| ID | 41 | 32 | 29 | 36 |
| Image-sticking | Excellent | Excellent | Excellent | Excellent |

Each of the liquid crystal display devices of Examples 5 to 12 had a high VHR and small ID. Furthermore, in the evaluation of image-sticking, no afterimage was observed, or an acceptable degree of slight afterimage was observed, if any.

Examples 13 to 24

IPS liquid crystal display devices of Examples 13 to 24 were produced as in Example 1 except that the following liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 9

| Liquid crystal composition 4 | | Liquid crystal composition 5 | | Liquid crystal composition 6 | |
|---|---|---|---|---|---|
| Compounds | Content (%) | Compounds | Content (%) | Compounds | Content (%) |
| 5-Cy-Cy-1d0 | 15 | 5-Cy-Cy-1d0 | 10 | 5-Cy-Cy-1d0 | 12 |
| 3-Cy-Cy-1d1 | 2 | 3-Cy-Cy-1d1 | 5 | 3-Cy-Cy-1d1 | 25 |
| 0d1-Cy-Cy-Ph-1 | 12 | 0d1-Cy-Cy-Ph-1 | 8 | 3-Cy-Cy-1d1 | 12 |
| 2-Ph-Ph1-Ph-3 | 3 | 0d3-Cy-Cy-Ph-1 | 12 | 0d1-Cy-Cy-Ph-1 | 4 |
| 2-Ph-Ph1-Ph-4 | 3 | 2-Ph-Ph1-Ph-5 | 2 | 0d3-Cy-Cy-Ph-1 | 9 |
| 2-Cy-Cy-Ph3-F | 8 | 3-Cy-Ph-Ph-Cy-3 | 3 | 2-Ph-Ph1-Ph3-F | 5 |
| 2-Cy-Ph-Ph3-F | 3 | 3-Cy-Ph-Ph1-Cy-3 | 3 | 3-Ph-Ph1-Ph3-F | 9 |
| 3-Cy-Ph-Ph3-F | 9 | 1-Cy-Cy-Ph3-F | 9 | 2-Ph-Ph3-CFFO-Ph3-F | 4 |
| 4-Cy-Cy-Ph-OCFFF | 14 | 2-Cy-Cy-Ph3-F | 10 | 3-Ph-Ph3-CFFO-Ph3-F | 6 |
| 3-Ph-Ph3-CFFO-Ph3-F | 11 | 3-Cy-Cy-Ph3-F | 6 | 3-Cy-Cy-CFFO-Ph3-F | 2 |
| 2-Cy-Cy-CFFO-Ph3-F | 9 | 5-Cy-Cy-Ph3-F | 5 | 5-Cy-Cy-CFFO-Ph3-F | 3 |
| 3-Cy-Cy-CFFO-Ph3-F | 8 | 0d1-Cy-Cy-Ph1-F | 8 | 3-Cy-Cy-Ph1-Ph3-F | 9 |
| 3-Cy-Cy-Ph1-Ph3-F | 3 | 2-Ph-Ph3-CFFO-Ph3-F | 4 | Tni/° C. | 77.4 |
| Tni/° C. | 90.2 | 3-Ph-Ph3-CFFO-Ph3-F | 6 | Δn | 0.101 |
| Δn | 0.098 | 3-Cy-Cy-Ph1-Ph3-F | 9 | Δε | 7.0 |
| Δε | 9.1 | Tni/° C. | 110.0 | γ1/mPa · s | 86 |
| γ1/mPa · s | 90 | Δn | 0.099 | η/mPa · s | 14.2 |
| η/mPa · s | 18.1 | Δε | 8.3 | | |
| | | γ1/mPa · s | 112 | | |
| | | η/mPa · s | 23.4 | | |

TABLE 10

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Polymerizable liquid crystal composition for second retardation layer | Polymerizable liquid crystal composition 4 | Polymerizable liquid crystal composition 4 | Polymerizable liquid crystal composition 4 | Polymerizable liquid crystal composition 4 |
| VHR | 99.2 | 99.4 | 99.5 | 99.4 |
| ID | 47 | 34 | 30 | 35 |
| Image-sticking | Good | Excellent | Excellent | Excellent |

TABLE 11

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Polymerizable liquid crystal composition for second retardation layer | Polymerizable liquid crystal composition 1 | Polymerizable liquid crystal composition 1 | Polymerizable liquid crystal composition 1 | Polymerizable liquid crystal composition 1 |
| VHR | 99.4 | 99.5 | 99.6 | 99.4 |
| ID | 40 | 29 | 23 | 37 |
| Image-sticking | Excellent | Excellent | Excellent | Excellent |

TABLE 12

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Polymerizable liquid crystal composition for second retardation layer | Polymerizable liquid crystal composition 2 | Polymerizable liquid crystal composition 2 | Polymerizable liquid crystal composition 2 | Polymerizable liquid crystal composition 2 |
| VHR | 99.3 | 99.6 | 99.7 | 99.5 |
| ID | 46 | 21 | 18 | 32 |
| Image-sticking | Good | Excellent | Excellent | Excellent |

Each of the liquid crystal display devices of Examples 13 to 24 had a high VHR and small ID. Furthermore, in the evaluation of image-sticking, no afterimage was observed, or an acceptable degree of slight afterimage was observed, if any.

Examples 25 to 28

Figure 12:
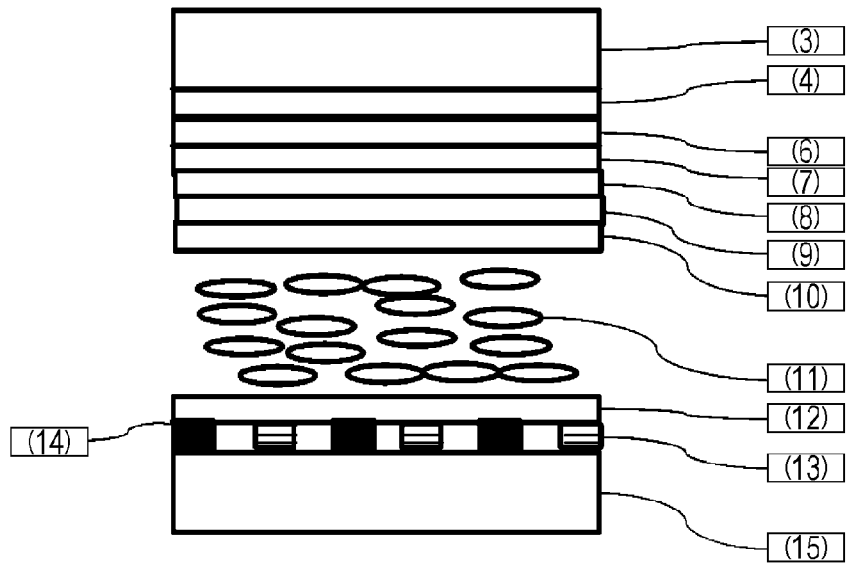
FIG. 12 illustrates another example of the liquid crystal display device of the present invention.

The color filter layer (4) was attached to the first light-transmitting substrate (3), and then the alignment film (6) for a retardation film was formed thereon. The polymerizable liquid crystal composition 5 was applied to the alignment film for a retardation film with a spin coater, dried at 80° C. for 2 minutes, subsequently cooled at room temperature, and irradiated with 500 mJ/cm² of ultraviolet light emitted from a high pressure mercury lamp to form the first retardation layer (7) of a positive C plate. The alignment film (8) for a retardation film was formed on this retardation layer and slightly rubbed. The polymerizable liquid crystal composition 1 was applied onto such an alignment film for a retardation film with a spin coater, dried at 80° C. for 2 minutes, subsequently cooled at room temperature, and irradiated with 500 mJ/cm² of ultraviolet light emitted from a high pressure mercury lamp to form the second retardation layer (9) of a positive A plate. The alignment film (10) was formed on the second retardation layer (9) and then slightly rubbed. The transparent electrode layer (13) and the pixel electrode layer (14) were attached to the second light-transmitting substrate (15), and then the alignment film (12) was formed thereon and subsequently slightly rubbed. The liquid crystal composition 1 used in Example 1 was put into the liquid crystal layer (11) positioned between the alignment film (10) and the alignment film (12) to yield an IPS liquid crystal display device of Example 25. FIG. 12 illustrates the liquid crystal display device of Example 25.

Liquid crystal display devices of Examples 26 to 28 were produced as in Example 25 except that the following polymerizable liquid crystal compositions were used.

The VHRs and ID of the produced liquid crystal display devices were measured. The liquid crystal display devices were subjected to the evaluation of image-sticking. The following table shows results of the measurement and evaluation.

TABLE 13

|  | Example 25 | Example 26 | Example 27 | Example 28 |
|---|---|---|---|---|
| Liquid crystal composition | Liquid crystal composition 1 | Liquid crystal composition 1 | Liquid crystal composition 1 | Liquid crystal composition 1 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 99.4 | 99.3 | 99.5 | 99.5 |
| ID | 38 | 32 | 27 | 26 |
| Image-sticking | Excellent | Excellent | Excellent | Excellent |

Each of the liquid crystal display devices of Examples 25 to 28 had a high VHR and small ID. Furthermore, in the evaluation of image-sticking, no afterimage was observed.

Examples 29 to 40

Figure 13:
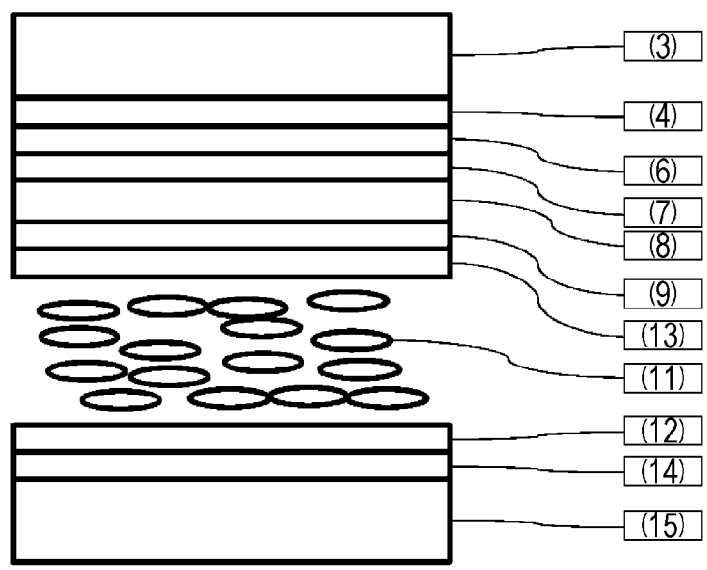
FIG. 13 illustrates another example of the liquid crystal display device of the present invention.

The color filter layer (4) was attached to the first light-transmitting substrate (3), and then the alignment film (6) for a retardation film was formed thereon. The polymerizable liquid crystal composition 5 was applied to the alignment film (6) for a retardation film with a spin coater, dried at 80° C. for 2 minutes, subsequently cooled at room temperature, and irradiated with 500 mJ/cm$^2$ of ultraviolet light emitted from a high pressure mercury lamp to form the first retardation layer (7) of a positive C plate. The alignment film (8) for a retardation film was formed on this retardation layer and slightly rubbed. The polymerizable liquid crystal composition 4 was applied onto such an alignment film for a retardation film with a spin coater, dried at 80° C. for 2 minutes, subsequently cooled at room temperature, and irradiated with 500 mJ/cm$^2$ of ultraviolet light emitted from a high pressure mercury lamp to form the second retardation layer (9) of a positive A plate. The transparent electrode layer (13) was attached to the second retardation layer (9), and the alignment film (10) was formed and then slightly rubbed. The pixel electrode layer (14) was attached to the second light-transmitting substrate (15), and then the alignment film (12) was formed thereon and subsequently slightly rubbed. The following liquid crystal composition 7 was put into the liquid crystal layer (11) positioned between the alignment film (10) and the alignment film (12) to yield a TN liquid crystal display device of Example 29. FIG. 13 illustrates the liquid crystal display device of Example 29.

Liquid crystal display devices of Examples 30 to 40 were produced as in Example 29 except that the following liquid crystal compositions and polymerizable liquid crystal compositions were used.

The VHRs and ID of the produced liquid crystal display devices were measured. The liquid crystal display devices were subjected to the evaluation of image-sticking. The following tables show results of the measurement and evaluation.

TABLE 14

| Compounds | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py—Ph—Ph3—CFFO—Ph3—F | 9 |
| Tni/° C. | 76.0 |
| Δn | 0.097 |
| Δε | 6.8 |
| γ1/mPa · s | 83 |
| η/mPa · s | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph-Ph1—Ph3—CFFO—Ph3—F | 2 |
| 4-Ph-Ph1—Ph3—CFFO—Ph3—F | 7 |
| 5-Ph-Ph1—Ph3—CFFO—Ph3—F | 7 |
| Tni/° C. | 81.8 |
| Δn | 0.099 |
| Δε | 80 |
| γ1/mPa · s | 83 |
| η/mPa · s | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| Tni/° C. | 75.0 |
| Δn | 0.112 |
| Δε | 8.7 |
| γ1/mPa · s | 87 |
| η/mPa · s | 15.2 |

TABLE 15

| | Example 29 | Example 30 | Example 31 | Example 32 |
|---|---|---|---|---|
| Liquid crystal composition | Liquid crystal composition 7 | Liquid crystal composition 7 | Liquid crystal composition 7 | Liquid crystal composition 7 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 99.4 | 99.4 | 99.5 | 99.6 |
| ID | 44 | 38 | 31 | 32 |
| Image-sticking | Good | Excellent | Excellent | Excellent |

TABLE 16

|  | Example 33 | Example 34 | Example 35 | Example 36 |
|---|---|---|---|---|
| Liquid crystal composition | Liquid crystal composition 8 | Liquid crystal composition 8 | Liquid crystal composition 8 | Liquid crystal composition 8 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 99.1 | 99.2 | 99.3 | 99.4 |
| ID | 51 | 48 | 42 | 25 |
| Image-sticking | Good | Good | Excellent | Excellent |

TABLE 17

|  | Example 37 | Example 38 | Example 39 | Example 40 |
|---|---|---|---|---|
| Liquid crystal composition | Liquid crystal composition 9 | Liquid crystal composition 9 | Liquid crystal composition 9 | Liquid crystal composition 9 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 99.2 | 99.3 | 99.3 | 99.5 |
| ID | 45 | 39 | 33 | 24 |
| Image-sticking | Excellent | Excellent | Excellent | Excellent |

Each of the liquid crystal display devices of Examples 29 to 40 had a high VHR and small ID. Furthermore, in the evaluation of image-sticking, no afterimage was observed, or an acceptable degree of slight afterimage was observed, if any.

Examples 41 to 44

The color filter layer (4) was attached to the first light-transmitting substrate (3), and then the alignment film (6) for a retardation film was formed thereon and slightly rubbed. The polymerizable liquid crystal composition 1 was applied to the alignment film (6) for a retardation film with a spin coater, dried at 80° C. for 2 minutes, subsequently cooled at room temperature, and irradiated with 500 mJ/cm² of ultraviolet light emitted from a high pressure mercury lamp to form the first retardation layer (7) of a positive A plate. An alignment film (8) for a retardation film was formed on this retardation layer. The polymerizable liquid crystal composition 5 was applied onto such an alignment film for a retardation film with a spin coater, dried at 80° C. for 2 minutes, subsequently cooled at room temperature, and irradiated with 500 mJ/cm² of ultraviolet light emitted from a high pressure mercury lamp to form the second retardation layer (9) of a positive C plate. The alignment film (10) was formed on the second retardation layer (9). The transparent electrode layer (13) and the pixel electrode layer (14) were attached to the second light-transmitting substrate (15), and then the alignment film (12) was formed thereon and subsequently slightly rubbed. The liquid crystal composition 7 used in Example 29 was put into the liquid crystal layer (11) positioned between the alignment film (10) and the alignment film (12) to yield an IPS liquid crystal display device of Example 41.

Liquid crystal display devices of Examples 42 to 44 were produced as in Example 41 except that the following polymerizable liquid crystal compositions were used.

The VHRs and ID of the produced liquid crystal display devices were measured. The liquid crystal display devices were subjected to the evaluation of image-sticking. The following table shows results of the measurement and evaluation.

TABLE 18

|  | Example 41 | Example 42 | Example 43 | Example 44 |
|---|---|---|---|---|
| Liquid crystal composition | Liquid crystal composition 7 | Liquid crystal composition 7 | Liquid crystal composition 7 | Liquid crystal composition 7 |

TABLE 18-continued

|  | Example 41 | Example 42 | Example 43 | Example 44 |
|---|---|---|---|---|
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.3 | 99.4 | 99.5 | 99.6 |
| ID | 46 | 40 | 31 | 23 |
| Image-sticking | Good | Excellent | Excellent | Excellent |

Each of the liquid crystal display devices of Examples 41 to 44 had a high VHR and small ID. Furthermore, in the evaluation of image-sticking, no afterimage was observed, or an acceptable degree of slight afterimage was observed, if any.

Examples 45 to 52

Figure 14:
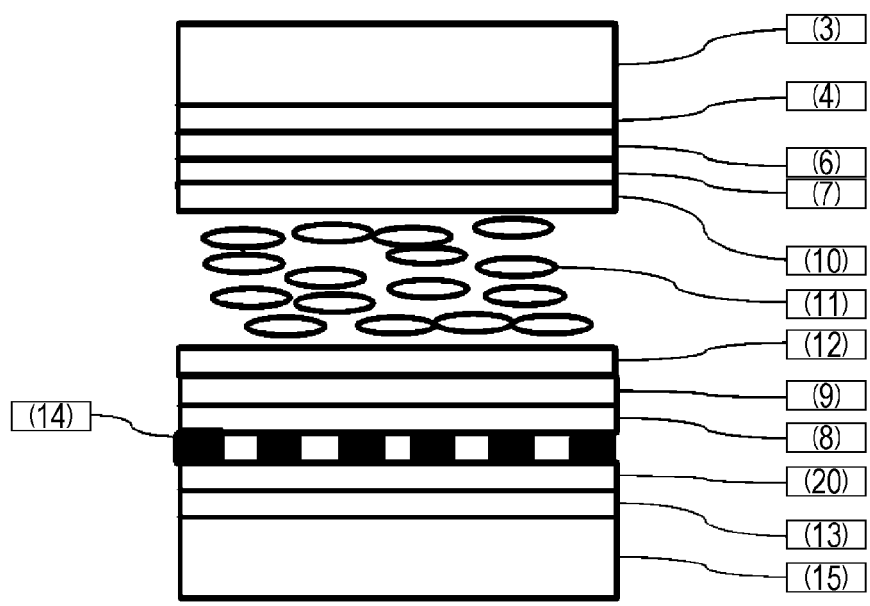
FIG. 14 illustrates another example of the liquid crystal display device of the present invention.

The color filter layer (4) was attached to the first light-transmitting substrate (3), and then the alignment film (6) for a retardation film was formed thereon and slightly rubbed. The polymerizable liquid crystal composition 1 was applied to the alignment film (6) for a retardation film with a spin coater, dried at 80° C. for 2 minutes, subsequently cooled at room temperature, and irradiated with 500 mJ/cm$^2$ of ultraviolet light emitted from a high pressure mercury lamp to form the first retardation layer (7) of a positive A plate. The alignment film (10) was formed on the first retardation layer (7). The transparent electrode layer (13) was attached to the second light-transmitting substrate (15), and then an insulating layer (20) was formed thereon. The pixel electrode layer (14) was attached to the insulating layer (20), and then the alignment film (8) for a retardation film was formed thereon. The polymerizable liquid crystal composition 5 was applied onto the alignment film (8) for a retardation film with a spin coater, dried at 80° C. for 2 minutes, subsequently cooled at room temperature, and irradiated with 500 mJ/cm$^2$ of ultraviolet light emitted from a high pressure mercury lamp to form the second retardation layer (9) of a positive C plate. The alignment film (12) was formed on the second retardation layer (9) and then slightly rubbed. The following liquid crystal composition was put into the liquid crystal layer (11) positioned between the alignment film (10) and the alignment film (12) to yield an FFS liquid crystal display device of Example 45. FIG. 14 illustrates the liquid crystal display device of Example 45.

Liquid crystal display devices of Examples 46 to 52 were produced as in Example 45 except that the following polymerizable liquid crystal compositions were used.

The VHRs and ID of the produced liquid crystal display devices were measured. The liquid crystal display devices were subjected to the evaluation of image-sticking. The following tables show results of the measurement and evaluation.

TABLE 19

| Compounds | Content (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| Tni/° C. | 76.0 |
| Δn | 0.114 |
| Δε | 6.0 |
| γ1/mPa · s | 77 |
| η/mPa · s | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| Tni/° C. | 77.9 |
| Δn | 0.131 |
| Δε | 4.6 |
| γ1/mPa · s | 74 |
| η/mPa · s | 12.4 |

TABLE 20

|  | Example 45 | Example 46 | Example 47 | Example 48 |
|---|---|---|---|---|
| Liquid crystal composition | Liquid crystal composition 10 | Liquid crystal composition 10 | Liquid crystal composition 10 | Liquid crystal composition 10 |

TABLE 20-continued

|  | Example 45 | Example 46 | Example 47 | Example 48 |
|---|---|---|---|---|
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.3 | 99.5 | 99.6 | 99.7 |
| ID | 39 | 30 | 24 | 16 |
| Image-sticking | Excellent | Excellent | Excellent | Excellent |

TABLE 21

|  | Example 49 | Example 50 | Example 51 | Example 52 |
|---|---|---|---|---|
| Liquid crystal composition | Liquid crystal composition 11 | Liquid crystal composition 11 | Liquid crystal composition 11 | Liquid crystal composition 11 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.3 | 99.4 | 99.4 | 99.5 |
| ID | 43 | 34 | 37 | 27 |
| Image-sticking | Excellent | Excellent | Excellent | Excellent |

Each of the liquid crystal display devices of Examples 45 to 52 had a high VHR and small ID. Furthermore, in the evaluation of image-sticking, no afterimage was observed.

Examples 53 to 64

FFS liquid crystal display devices of Examples 53 to 64 were produced as in Example 45 except that the following liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 22

| Compounds | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph-Ph3—CFFO—Ph3—F | 2 |
| 3-Cy-Cy-Ph1—Ph3—F | 2 |
| 3-Cy-Ph—Ph3—Ph1—OCFFF | 7 |
| Tni/° C. | 80.6 |
| Δn | 0.122 |
| Δε | 6.0 |
| γ1/mPa · s | 65 |
| η/mPa · s | 11.1 |
| Liquid crystal composition 13 | |
| 3-Cy-Cy-1d0 | 29 |
| 5-Cy-Cy-1d1 | 8 |
| 3-Cy-Cy-1d1 | 13 |
| 5-Ph—Ph-1 | 2 |
| 2-Ph—Ph1—Ph-3 | 6 |
| 2-Ph—Ph1—Ph-4 | 6 |
| 2-Ph—Ph1—Ph-5 | 6 |
| 3-Cy-Ph—Ph-Cy-3 | 4 |
| 3-Ph—Ph1—Ph3—F | 9 |
| 2-Ph—Ph3—Ph3—F | 7 |
| 3-Ph—Ph3—CFFO—Ph3—F | 4 |
| 3-Cy-Ph—Cl | 3 |
| 3-Cy-Cy-Ph1—Ph3—F | 3 |
| Tni/° C. | 74.9 |
| Δn | 0.121 |
| Δε | 4.1 |
| γ1/mPa · s | 60 |
| η/mPa · s | 10.8 |
| Liquid crystal composition 14 | |
| 3-Cy-Cy-1d0 | 10 |
| 3-Cy-Cy-1d1 | 6 |
| 3-Cy-Cy-1d1-F | 28 |
| 0d1-Cy-Cy-Ph-1 | 11 |
| 0d3-Cy-Cy-Ph-1 | 10 |

TABLE 22-continued

| Compounds | Content (%) |
| --- | --- |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| Tni/° C. | 80.0 |
| Δn | 0.110 |
| Δε | 5.9 |
| γ1/mPa·s | 68 |
| η/mPa·s | 11.6 |

TABLE 23

|  | Example 53 | Example 54 | Example 55 | Example 56 |
| --- | --- | --- | --- | --- |
| Liquid crystal composition | Liquid crystal composition 12 | Liquid crystal composition 12 | Liquid crystal composition 12 | Liquid crystal composition 12 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.2 | 99.3 | 99.4 | 99.4 |
| ID | 49 | 45 | 39 | 33 |
| Image-sticking | Good | Excellent | Excellent | Excellent |

TABLE 24

|  | Example 57 | Example 58 | Example 59 | Example 60 |
| --- | --- | --- | --- | --- |
| Liquid crystal composition | Liquid crystal composition 13 | Liquid crystal composition 13 | Liquid crystal composition 13 | Liquid crystal composition 13 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.4 | 99.5 | 99.6 | 99.6 |
| ID | 19 | 49 | 16 | 30 |
| Image-sticking | Excellent | Excellent | Excellent | Excellent |

TABLE 25

|  | Example 61 | Example 62 | Example 63 | Example 64 |
| --- | --- | --- | --- | --- |
| Liquid crystal composition | Liquid crystal composition 14 | Liquid crystal composition 14 | Liquid crystal composition 14 | Liquid crystal composition 14 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.2 | 99.3 | 99.4 | 99.5 |
| ID | 52 | 42 | 34 | 29 |
| Image-sticking | Good | Good | Excellent | Excellent |

Each of the liquid crystal display devices of Examples 53 to 64 had a high VHR and small ID. Furthermore, in the evaluation of image-sticking, no afterimage was observed, or an acceptable degree of slight afterimage was observed, if any.

Examples 65 to 72

Figure 15:
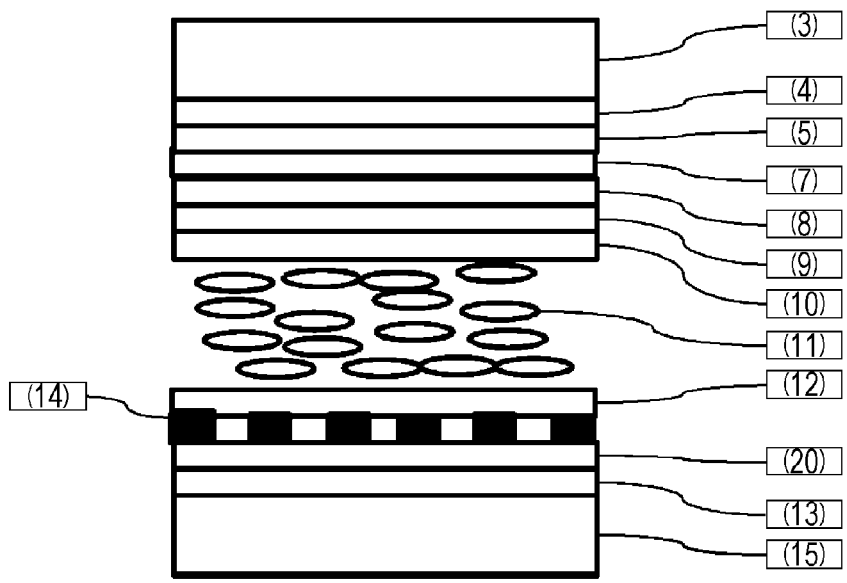
FIG. 15 illustrates another example of the liquid crystal display device of the present invention.

The color filter layer (4) was attached to the first light-transmitting substrate (3), and then a planarization layer (5) was formed thereon. The polymerizable liquid crystal composition 5 was applied onto the planarization layer (5) with a spin coater, dried at 80° C. for 2 minutes, subsequently cooled at room temperature, and irradiated with 500 mJ/cm$^2$ of ultraviolet light emitted from a high pressure mercury lamp to form the first retardation layer (7) of a positive C plate. The alignment film (8) for a retardation film was formed on the first retardation layer (7). The alignment film (8) for a retardation film was slightly rubbed, and then the polymerizable liquid crystal composition 1 was applied thereto with a spin coater, dried at 80° C. for 2 minutes, subsequently cooled at room temperature, and irradiated with 500 mJ/cm$^2$ of ultraviolet light emitted from a high pressure mercury lamp to form the second retardation layer (9) of a positive A plate. The transparent electrode layer (13) was attached to the second light-transmitting substrate (15), and then the insulating layer (20) was formed thereon. The pixel electrode layer (14) was attached to the insulating layer (20), and the alignment film (12) was subsequently formed thereon and then slightly rubbed. The following liquid crystal composition was put into the liquid crystal layer (11) positioned between the second retardation layer (9) and the alignment layer (12) to yield an FFS liquid crystal display device of Example 65. FIG. 15 illustrates the liquid crystal display device of Example 1.

Liquid crystal display devices of Examples 66 to 72 were produced as in Example 65 except that the following polymerizable liquid crystal compositions were used.

The VHRs and ID of the produced liquid crystal display devices were measured. The liquid crystal display devices were subjected to the evaluation of image-sticking. The following tables show results of the measurement and evaluation.

TABLE 26

|  | Example 65 | Example 66 | Example 67 | Example 68 |
| --- | --- | --- | --- | --- |
| Liquid crystal composition | Liquid crystal composition 10 | Liquid crystal composition 10 | Liquid crystal composition 10 | Liquid crystal composition 10 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 2 | Polymerizable liquid crystal composition 2 | Polymerizable liquid crystal composition 2 |
| VHR | 99.4 | 99.6 | 99.7 | 99.7 |
| ID | 38 | 31 | 23 | 17 |
| Image-sticking | Excellent | Excellent | Excellent | Excellent |

TABLE 27

|  | Example 69 | Example 70 | Example 71 | Example 72 |
| --- | --- | --- | --- | --- |
| Liquid crystal composition | Liquid crystal composition 11 | Liquid crystal composition 11 | Liquid crystal composition 11 | Liquid crystal composition 11 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 2 | Polymerizable liquid crystal composition 2 | Polymerizable liquid crystal composition 2 |
| VHR | 99.4 | 99.3 | 99.4 | 99.5 |
| ID | 42 | 33 | 36 | 27 |
| Image-sticking | Excellent | Excellent | Excellent | Excellent |

Each of the liquid crystal display devices of Examples 65 to 72 had a high VHR and small ID. Furthermore, in the evaluation of image-sticking, no afterimage was observed.

Examples 73 to 76

Figure 16:
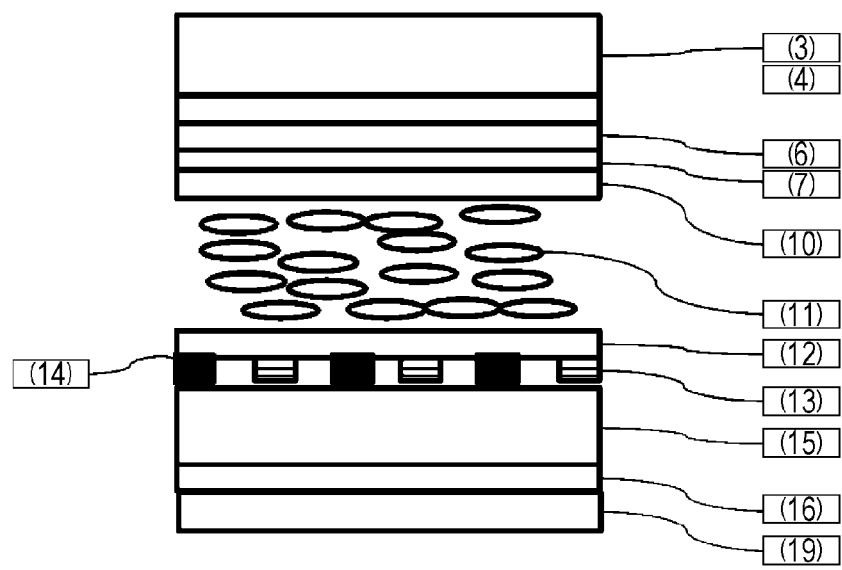
FIG. 16 illustrates another example of the liquid crystal display device of the present invention.

The color filter layer (4) was attached to the first light-transmitting substrate (3), and then the alignment film (6) for a retardation film was formed thereon. The polymerizable liquid crystal composition 5 was applied to the alignment film (6) for a retardation film with a spin coater, dried at 80° C. for 2 minutes, subsequently cooled at room temperature, and irradiated with 500 mJ/cm² of ultraviolet light emitted from a high pressure mercury lamp to form the first retardation layer (7) of a positive C plate. The alignment film (10) was formed on the first retardation layer (7) and slightly rubbed. An adhesive layer (16) and a stretched film (19) were formed on one side of the second light-transmitting substrate (15). The transparent electrode layer (13) and the pixel electrode layer (14) were attached to the other side of the second light-transmitting substrate (15), and then the alignment film (12) was formed and slightly rubbed. The liquid crystal composition 12 used in Example 53 was put into the liquid crystal layer (11) positioned between the alignment film (10) and the alignment film (12) to yield an IPS liquid crystal display device of Example 73. FIG. 16 illustrates the liquid crystal display device of Example 73.

Liquid crystal display devices of Examples 74 to 76 were produced as in Example 73 except that the following polymerizable liquid crystal compositions were used.

The VHRs and ID of the produced liquid crystal display devices were measured. The liquid crystal display devices were subjected to the evaluation of image-sticking. The following table shows results of the measurement and evaluation.

TABLE 28

|  | Example 73 | Example 74 | Example 75 | Example 76 |
|---|---|---|---|---|
| Liquid crystal composition | Liquid crystal composition 12 | Liquid crystal composition 12 | Liquid crystal composition 12 | Liquid crystal composition 12 |
| Polymerizable liquid crystal composition for first retardation layer | Polymerizable liquid crystal composition 5 | Polymerizable liquid crystal composition 6 | Polymerizable liquid crystal composition 7 | Polymerizable liquid crystal composition 8 |
| Second retardation layer | COP film | COP film | COP film | COP film |
| VHR | 99.2 | 99.3 | 99.4 | 99.2 |
| ID | 44 | 34 | 29 | 38 |
| Image-sticking | Excellent | Excellent | Excellent | Excellent |

Each of the liquid crystal display devices of Examples 73 to 76 had a high VHR and small ID. Furthermore, in the evaluation of image-sticking, no afterimage was observed.

Examples 77 to 80

FFS liquid crystal display devices of Examples 77 to 80 were produced as in Example 45 except that the following liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 29

| Compounds | Content (%) |
|---|---|
| Liquid crystal composition 15 | |
| 3-Cy-Cy-1d0 | 44 |
| 3-Cy-Ph—O1 | 4 |
| 0d1-Cy-Cy-Ph-1 | 10 |
| 3-Cy-Cy-VO—Ph-Cy-3 | 4 |
| 3-Ph—Ph1—Ph3—O1-1d0 | 6 |
| 2-Cy-Ph—Ph3—O1—Ph3—F | 5 |
| 3-Cy-Ph—Ph3—O1—Ph3—F | 5 |
| 3-Ph3—O1-Oc-Ph—Ph3—F | 4.5 |
| 4-Ph3—O1-Oc-Ph—Ph3—F | 4.5 |
| 5-Ph3—O1-Oc-Ph—Ph3—F | 4 |
| 3-Ph3—O1-Oc-Ph1—Ph3—F | 5 |
| 5-Ph3—O1-Oc-Ph1—Ph3—F | 4 |
| TNI/° C. | 86.9 |
| T→N | −24 |
| Δn | 0.099 |
| no | 1.484 |
| Δε | 8.7 |
| ε⊥ | 3.7 |
| γ1/mPa · s | 68 |
| η/mPa · s | 14.0 |
| Vth/Vrms | 1.54 |
| Liquid crystal composition 16 | |
| 3-Cy-Cy-1d0 | 44 |
| 5-Cy-Cy-1d0 | 2 |
| 0d1-Cy-Cy-Ph-1 | 6 |
| 0d3-Cy-Cy-Ph-1 | 5 |
| 1-Ph—Ph1—Ph-3d0 | 4 |
| 2-Ph—Ph1—Ph-3d0 | 6 |
| 2-Cy-Cy-Ph1—F | 2 |
| 3-Cy-Cy-Ph1—F | 3 |
| 3-Ph—Ph3—CFFO—Np3—F | 12 |
| 4-Cy-Ph—Ph3—O1—Ph3—F | 4 |
| 3-Ph3—O1-Oc-Ph1—Ph3—F | 4 |
| 4-Ph3—O1-Oc-Ph1—Ph3—F | 5 |
| 5-Ph3—O1-Oc-Ph1—Ph3—F | 3 |

TABLE 29-continued

| Compounds | Content (%) |
|---|---|
| TNI/° C. | 79.8 |
| T→N | −29 |
| Δn | 0.106 |
| no | 1.488 |
| Δε | 8.1 |
| ε⊥ | 3.5 |
| γ1/mPa · s | 59 |
| η/mPa · s | 12.3 |
| Vth/Vrms | 1.63 |

TABLE 30

|  | Example 77 | Example 78 | Example 79 | Example 80 |
|---|---|---|---|---|
| Liquid crystal composition | Liquid crystal composition 15 | Liquid crystal composition 15 | Liquid crystal composition 15 | Liquid crystal composition 15 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.3 | 99.3 | 99.5 | 99.6 |
| ID | 45 | 42 | 30 | 19 |
| Image-sticking | Excellent | Excellent | Excellent | Excellent |

TABLE 31

|  | Example 81 | Example 82 | Example 83 | Example 84 |
|---|---|---|---|---|
| Liquid crystal composition | Liquid crystal composition 16 | Liquid crystal composition 16 | Liquid crystal composition 16 | Liquid crystal composition 16 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.2 | 99.3 | 99.5 | 99.5 |
| ID | 49 | 46 | 22 | 23 |
| Image-sticking | Good | Good | Excellent | Excellent |

Each of the liquid crystal display devices of Examples 77 to 84 had a high VHR and small ID. Furthermore, in the evaluation of image-sticking, no afterimage was observed, or an acceptable degree of slight afterimage was observed, if any.

Examples 85 to 92

FFS liquid crystal display devices of Examples 85 to 92 were produced as in Example 45 except that the following liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 32

| Compounds | Content (%) |
|---|---|
| Liquid crystal composition 17 | |
| 3-Cy-Cy-1d0 | 31 |
| 0d1-Cy-Cy-Ph-1 | 13 |

TABLE 32-continued

| Compounds | Content (%) |
|---|---|
| 2-Cy-Cy-Ph1—F | 10 |
| 3-Cy-Cy-Ph1—F | 14 |
| 2-Cy-Cy-Ph—Ph1—F | 2 |
| 3-Cy-Cy-Ph—Ph1—F | 4 |
| 3-Cy-Ph1—Np3—F | 7 |
| 3-Ph3—O1—Ph—Np3—F | 8 |
| 2-Ph3—O1-Cy-Ph3—Ph3—F | 6 |
| 3-Ph3—O1-Cy-Ph3—Ph3—F | 5 |
| TNI/° C. | 97.7 |
| T→N | −56 |
| Δn | 0.101 |
| no | 1.488 |
| Δε | 7.9 |
| ε⊥ | 3.4 |
| γ1/mPa · s | 87 |
| η/mPa · s | 18.5 |
| Vth/Vrms | 1.71 |
| Liquid crystal composition 18 | |
| 3-Cy-Cy-1d0 | 38 |
| 0d1-Cy-Cy-Ph-1 | 14 |
| 0d3-Cy-Cy-Ph-1 | 12 |
| 1-Ph—Ph1—Ph-3d0 | 4 |
| 2-Ph—Ph1—Ph-3d0 | 6 |
| 3-Ph—Ph1—Ph-3d0 | 8 |

TABLE 32-continued

| Compounds | Content (%) |
|---|---|
| 3-Cy-Ph—Ph3—O1—Ph3—F | 5 |
| 3-Ph3—O1-Oc-Ph—Ph3—F | 3 |
| 4-Ph3—O1-Oc-Ph—Ph3—F | 3 |
| 3-Ph3—O1-Oc-Ph1—Ph3—F | 4 |
| 5-Ph3—O1-Oc-Ph1—Ph3—F | 3 |
| TNI/° C. | 102.1 |
| T→N | −36 |
| Δn | 0.121 |
| no | 1.494 |
| Δε | 4.8 |
| ε⊥ | 3.1 |
| γ1/mPa · s | 63 |
| η/mPa · s | 13.4 |
| Vth/Vrms | 2.45 |

TABLE 33

|  | Example 85 | Example 86 | Example 87 | Example 88 |
|---|---|---|---|---|
| Liquid crystal composition | Liquid crystal composition 17 | Liquid crystal composition 17 | Liquid crystal composition 17 | Liquid crystal composition 17 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.1 | 99.2 | 99.4 | 99.5 |
| ID | 53 | 41 | 29 | 25 |
| Image-sticking | Good | Excellent | Excellent | Excellent |

TABLE 34

|  | Example 89 | Example 90 | Example 91 | Example 92 |
|---|---|---|---|---|
| Liquid crystal composition | Liquid crystal composition 18 | Liquid crystal composition 18 | Liquid crystal composition 18 | Liquid crystal composition 18 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 99.1 | 99.3 | 99.3 | 99.4 |
| ID | 58 | 45 | 42 | 33 |
| Image-sticking | Good | Good | Excellent | Excellent |

Each of the liquid crystal display devices of Examples 85 to 92 had a high VHR and small ID. Furthermore, in the evaluation of image-sticking, no afterimage was observed, or an acceptable degree of slight afterimage was observed, if any.

Examples 93 to 96

The liquid crystal composition and polymerizable liquid crystal compositions shown in the following table were used, and a photo-alignment film containing a photo-alignment material was used as the alignment film (8) for a retardation layer; except for these changes, liquid crystal display devices of Examples 93 to 96 were produced as in Example 65. The VHRs and ID thereof were measured. The liquid crystal display devices were subjected to the evaluation of image-sticking. The following table shows results of the measurement and evaluation.

The photo-alignment film was formed as follows. A photo-alignment agent composition for a retardation layer was applied to a light-transmitting substrate with a spin coater, and then the resulting product was prebaked on a hot plate at 80° C. for 120 seconds to form a coating film having a thickness of 0.1 μm. The coating film was post-baked in an oven at 200° C. for an hour, thereby forming a cured film. In the case of using photo-alignment agent composition 1 or 2 for a retardation layer, the cured film was irradiated with 300 J/m$^2$ of linear polarized light having a wavelength of 313 nm.

TABLE 35

|  | Example 93 | Example 94 | Example 95 | Example 96 |
|---|---|---|---|---|
| Liquid crystal composition | Liquid crystal composition 10 | Liquid crystal composition 10 | Liquid crystal composition 10 | Liquid crystal composition 10 |
| Photo-alignment agent composition for second retardation layer | Photo-alignment agent composition 1 | Photo-alignment agent composition 1 | Photo-alignment agent composition 1 | Photo-alignment agent composition 1 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 99.4 | 99.5 | 99.7 | 99.7 |
| ID | 37 | 31 | 22 | 18 |
| Image-sticking | Excellent | Excellent | Excellent | Excellent |

Each of the liquid crystal display devices of Examples 85 to 88 had a high VHR and small ID. Furthermore, in the evaluation of image-sticking, no afterimage was observed, or an acceptable degree of slight afterimage was observed, if any.

Example 97

Figure 17:
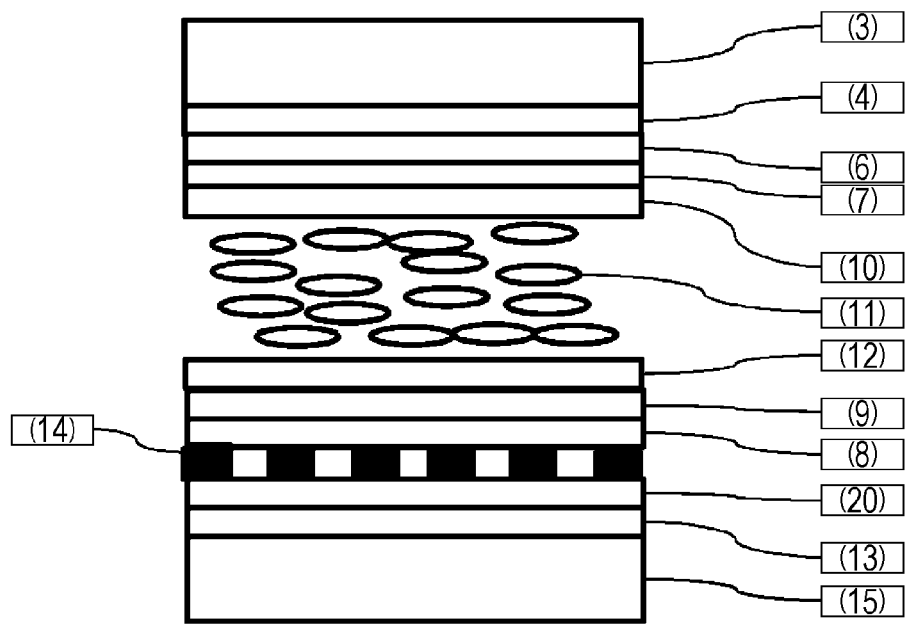
FIG. 17 illustrates another example of the liquid crystal display device of the present invention.

The color filter layer (4) was attached to a polarization layer (1) including a polarization layer (1), an adhesive layer (2), and the first light-transmitting substrate (3); and then the planarization layer (5) was formed. The polymerizable liquid crystal composition 5 was applied onto the planarization layer (5) with a spin coater, dried at 80° C. for 2 minutes, subsequently cooled at room temperature, and irradiated with 500 mJ/cm$^2$ of ultraviolet light emitted from a high pressure mercury lamp to form the first retardation layer (7) of a positive C plate. The alignment film (8) for a retardation film was formed on the first retardation layer (7). The alignment film (8) for a retardation film was slightly rubbed, and then the polymerizable liquid crystal composition 1 was applied thereto with a spin coater, dried at 80° C. for 2 minutes, subsequently cooled at room temperature, and irradiated with 500 mJ/cm$^2$ of ultraviolet light emitted from a high pressure mercury lamp to form the second retardation layer (9) of a positive A plate. The transparent electrode (13) was attached to a polarization layer (17) including a polarization layer (17), the adhesive layer (16), and the second light-transmitting substrate (15); and then the insulating layer (20) was formed thereon. The pixel electrode layer (14) was attached to the insulating layer (20), and then the alignment film (12) was formed thereon and then slightly rubbed. The following liquid crystal composition was put into the liquid crystal layer (11) positioned between the second retardation layer (9) and the alignment layer (12) to yield an FFS liquid crystal display device of Example 97. FIG. 17 illustrates the liquid crystal display device of Example 97.

The VHR and ID of the produced liquid crystal display device were measured. The liquid crystal display device was subjected to the evaluation of image-sticking. The following table shows results of the measurement and evaluation.

TABLE 36

|  | Example 97 |
|---|---|
| Liquid crystal composition | Liquid crystal composition 10 |
| Polymerizable liquid crystal composition for first retardation layer | Polymerizable liquid crystal composition 6 |
| Polymerizable liquid crystal composition for second retardation layer | Polymerizable liquid crystal composition 2 |
| VHR | 99.4 |
| ID | 30 |
| Image-sticking | Excellent |

The liquid crystal display device of Example 97 had a high VHR and small ID. Furthermore, in the evaluation of image-sticking, no afterimage was observed.

Comparative Examples 1 to 3

IPS liquid crystal display devices of Comparative Examples 1 to 3 were produced as in Example 1 except that the following comparative liquid crystal composition and polymerizable liquid crystal compositions were used. The VHRs and ID thereof were measured. The liquid crystal display devices were subjected to the evaluation of image-sticking. The following table show results of the measurement and evaluation.

TABLE 37

Comparative liquid crystal composition 1

| Compounds | Content (%) |
|---|---|
| 4-Cy-VO—Ph-1 | 27 |
| 5-Cy-VO—Ph-1 | 20 |
| 5-Cy-VO—Ph-3 | 20 |
| 3-Ph—Ph3—CFFO—Ph3—F | 8 |
| 3-Cy-Cy-CFFO—Ph3—F | 13 |
| 3-Ph—Ph1—Ph3—CFFO—Ph3—F | 12 |
| Tni/° C. | 69.3 |
| Δn | 0.096 |
| Δε | 4.8 |
| η/mPa · s | 30.3 |

TABLE 38

| | Comparative Example 1 | Comparative Example 2 | Comparative Example 3 |
|---|---|---|---|
| Liquid crystal composition | Comparative liquid crystal composition 1 | Comparative liquid crystal composition 1 | Comparative liquid crystal composition 1 |
| Polymerizable liquid crystal composition for first retardation layer | Polymerizable liquid crystal composition 5 | Polymerizable liquid crystal composition 6 | Polymerizable liquid crystal composition 8 |
| Polymerizable liquid crystal composition for second retardation layer | Polymerizable liquid crystal composition 1 | Polymerizable liquid crystal composition 1 | Polymerizable liquid crystal composition 1 |
| VHR | 98.2 | 98.3 | 98.2 |
| ID | 120 | 105 | 116 |
| Image-sticking | Poor | Poor | Poor |

Each of the liquid crystal display devices of Comparative Examples 1 to 3 had a lower VHR and larger ID than the liquid crystal display device of the present invention. Moreover, in the evaluation of image-sticking, an unacceptable degree of afterimage was observed.

Comparative Examples 4 to 9

IPS liquid crystal display devices of Comparative Examples 4 to 9 were produced as in Example 1 except that the following comparative liquid crystal compositions and polymerizable liquid crystal compositions were used. The VHRs and ID thereof were measured. The liquid crystal display devices were subjected to the evaluation of image-sticking. The following tables show results of the measurement and evaluation.

TABLE 39

| Compounds | Content (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |
| Tni/° C. | 75.7 |
| Δn | 0.093 |
| γ1/mPa · s | 146 |
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| Tni/° C. | 75.0 |
| Δn | 0.093 |
| γ1/mPa · s | 139 |

TABLE 40

| | Comparative Example 4 | Comparative Example 5 | Comparative Example 6 |
|---|---|---|---|
| Liquid crystal composition | Comparative liquid crystal composition 2 | Comparative liquid crystal composition 2 | Comparative liquid crystal composition 2 |
| Polymerizable liquid crystal composition for first retardation layer | Polymerizable liquid crystal composition 5 | Polymerizable liquid crystal composition 6 | Polymerizable liquid crystal composition 8 |
| Polymerizable liquid crystal composition for second retardation layer | Polymerizable liquid crystal composition 2 | Polymerizable liquid crystal composition 2 | Polymerizable liquid crystal composition 2 |
| VHR | 98.2 | 98.4 | 98.3 |
| ID | 130 | 198 | 112 |
| Image-sticking | Poor | Bad | Poor |

TABLE 41

| | Comparative Example 7 | Comparative Example 8 | Comparative Example 9 |
|---|---|---|---|
| Liquid crystal composition | Comparative liquid crystal composition 3 | Comparative liquid crystal composition 3 | Comparative liquid crystal composition 3 |
| Polymerizable liquid crystal composition for first retardation layer | Polymerizable liquid crystal composition 5 | Polymerizable liquid crystal composition 6 | Polymerizable liquid crystal composition 8 |
| Polymerizable liquid crystal composition for second retardation layer | Polymerizable liquid crystal composition 3 | Polymerizable liquid crystal composition 3 | Polymerizable liquid crystal composition 3 |
| VHR | 98.2 | 98.5 | 98.3 |
| ID | 128 | 96 | 110 |
| Image-sticking | Poor | Bad | Poor |

Each of the liquid crystal display devices of Comparative Examples 4 to 9 had a lower VHR and larger ID than the liquid crystal display device of the present invention. Moreover, in the evaluation of image-sticking, an unacceptable degree of afterimage was observed.

Comparative Examples 10 to 13

IPS liquid crystal display devices of Comparative Examples 10 to 13 were produced as in Example 25 except that the comparative liquid crystal composition and polymerizable liquid crystal compositions shown in the following tables were used. The VHRs and ID thereof were measured. The liquid crystal display devices were subjected to the evaluation of image-sticking. The following table shows results of the measurement and evaluation.

TABLE 42

Comparative liquid crystal composition 4

| Compounds | Content (%) |
|---|---|
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 5 |
| 3-Cy-Ph1—Ph3—F | 8 |
| 5-Cy-Ph1—Ph3—F | 7 |
| 3-Ph-Ph1—Ph3—F | 3 |
| 3-Cy-Cy-Ph1—Ph3—F | 8 |
| Tni/° C. | 101.0 |
| $\Delta n$ | 0.095 |
| $\Delta \varepsilon$ | 8.2 |
| $\gamma 1$/mPa · s | 115 |
| $\eta$/mPa · s | 23.6 |

TABLE 43

| | Comparative Example 10 | Comparative Example 11 | Comparative Example 12 | Comparative Example 13 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Polymerizable liquid crystal composition for first retardation layer | Polymerizable liquid crystal composition 5 | Polymerizable liquid crystal composition 6 | Polymerizable liquid crystal composition 5 | Polymerizable liquid crystal composition 6 |
| Polymerizable liquid crystal composition for second retardation layer | Polymerizable liquid crystal composition 1 | Polymerizable liquid crystal composition 1 | Polymerizable liquid crystal composition 2 | Polymerizable liquid crystal composition 2 |
| VHR | 98.1 | 98.3 | 98.3 | 98.5 |
| ID | 143 | 117 | 115 | 101 |
| Image-sticking | Poor | Poor | Poor | Poor |

Each of the liquid crystal display devices of Comparative Examples 10 to 13 had a lower VHR and larger ID than the liquid crystal display device of the present invention. Moreover, in the evaluation of image-sticking, an unacceptable degree of afterimage was observed.

Comparative Examples 14 to 17

IPS liquid crystal display devices of Comparative Examples 14 to 17 were produced as in Example 41 except that the comparative liquid crystal composition and polymerizable liquid crystal compositions shown in the following tables were used. The VHRs and ID thereof were measured. The liquid crystal display devices were subjected to the evaluation of image-sticking. The following table shows results of the measurement and evaluation.

TABLE 44

Comparative liquid crystal composition 5

| Compounds | Content (%) |
|---|---|
| 2-Cy-Cy-1d0 | 32 |
| 0d1-Cy-Cy-Ph-1 | 4 |
| 2-Ph-Ph1-Ph-3 | 10 |
| 2-Ph-Ph1-Ph-5 | 11 |
| 3-Ph-Ph1-Ph-5 | 7 |
| 2-Cy-Cy-Ph-F | 6 |
| 3-Cy-Cy-Ph-F | 21 |
| 5-Cy-Ph-Ph-F | 7 |
| 3-Cy-Ph-Ph3-F | 2 |
| Tni/° C. | 77.2 |
| $\Delta n$ | 0.135 |
| $\Delta \varepsilon$ | 4.5 |
| $\gamma 1$/mPa · s | 57 |
| $\eta$/mPa · s | 10.5 |

TABLE 45

|  | Comparative Example 14 | Comparative Example 15 | Comparative Example 16 | Comparative Example 17 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 98.1 | 98.2 | 98.2 | 98.4 |
| ID | 145 | 125 | 122 | 108 |
| Image-sticking | Poor | Poor | Poor | Bad |

Each of the liquid crystal display devices of Comparative Examples 14 to 17 had a lower VHR and larger ID than the liquid crystal display device of the present invention. Moreover, in the evaluation of image-sticking, an unacceptable degree of afterimage was observed.

Comparative Examples 18 to 21

FFS liquid crystal display devices of Comparative Examples 18 to 21 were produced as in Example 45 except that the comparative liquid crystal composition and polymerizable liquid crystal compositions shown in the following tables were used. The VHRs and ID thereof were measured. The liquid crystal display devices were subjected to the evaluation of image-sticking. The following table shows results of the measurement and evaluation.

TABLE 46

Comparative liquid crystal composition 6

| Compounds | Content (%) |
|---|---|
| 4-Cy-Cy-1d0 | 18 |
| 3-Cy-Cy-4 | 15 |
| 0d1-Cy-Cy-Ph-1 | 8 |
| 2-Ph-Ph1-Ph-3 | 10 |
| 2-Ph-Ph1-Ph-5 | 6 |
| 3-Ph-Ph1-Ph-5 | 6 |
| 2-Cy-Cy-Ph-F | 6 |
| 3-Cy-Cy-Ph-F | 10 |
| 5-Cy-Ph-Ph-F | 7 |
| 3-Cy-Ph-Ph3-F | 14 |
| Tni/° C. | 73.5 |

TABLE 46-continued

Comparative liquid crystal composition 6

| Compounds | Content (%) |
|---|---|
| Δn | 0.126 |
| Δε | 4.9 |
| γ1/mPa · s | 94 |
| η/mPa · s | 16.9 |

TABLE 47

|  | Comparative Example 18 | Comparative Example 19 | Comparative Example 20 | Comparative Example 21 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Polymerizable liquid crystal composition for first retardation layer | Polymerizable liquid crystal composition 1 | Polymerizable liquid crystal composition 1 | Polymerizable liquid crystal composition 2 | Polymerizable liquid crystal composition 2 |
| Polymerizable liquid crystal composition for second retardation layer | Polymerizable liquid crystal composition 5 | Polymerizable liquid crystal composition 6 | Polymerizable liquid crystal composition 5 | Polymerizable liquid crystal composition 6 |
| VHR | 98.1 | 98.2 | 98.3 | 98.3 |
| ID | 141 | 128 | 114 | 113 |
| Image-sticking | Poor | Poor | Bad | Bad |

Each of the liquid crystal display devices of Comparative Examples 18 to 21 had a lower VHR and larger ID than the liquid crystal display device of the present invention. Moreover, in the evaluation of image-sticking, an unacceptable degree of afterimage was observed.

Comparative Examples 22 and 23

IPS liquid crystal display devices of Comparative Examples 22 and 23 were produced as in Example 65 except that the comparative liquid crystal composition and polymerizable liquid crystal compositions shown in the following tables were used. The VHRs and ID thereof were measured. The liquid crystal display devices were subjected to the evaluation of image-sticking. The following table shows results of the measurement and evaluation.

TABLE 48

Comparative liquid crystal composition 7

| Compounds | Content (%) |
|---|---|
| 4-Cy-Cy-1d0 | 18 |
| 3-Cy-Cy-4 | 15 |
| 0d1-Cy-Cy-Ph-1 | 8 |
| 2-Ph-Ph1-Ph-3 | 10 |
| 2-Ph-Ph1-Ph-5 | 6 |
| 3-Ph-Ph1-Ph-5 | 5 |
| 2-Cy-Cy-Ph-F | 6 |
| 3-Cy-Cy-Ph-F | 5 |
| 5-Cy-Ph-Ph-F | 7 |
| 3-Cy-Ph-Ph3-F | 15 |
| 3-Cy-Cy-Ph1-Ph3-F | 5 |
| Tni/° C. | 75.5 |
| Δn | 0.125 |
| Δε | 5.5 |
| γ1/mPa · s | 103 |
| η/mPa · s | 18.4 |

TABLE 49

|  | Comparative Example 22 | Comparative Example 23 |
|---|---|---|
| Liquid crystal composition | Comparative liquid crystal composition 7 | Comparative liquid crystal composition 7 |
| Polymerizable liquid crystal composition for first retardation layer | Polymerizable liquid crystal composition 5 | Polymerizable liquid crystal composition 6 |
| Polymerizable liquid crystal composition for second retardation layer | COP film | COP film |
| VHR | 98.3 | 98.5 |
| ID | 119 | 97 |
| Image-sticking | Poor | Bad |

Each of the liquid crystal display devices of Comparative Examples 22 and 23 had a lower VHR and larger ID than the liquid crystal display device of the present invention. Moreover, in the evaluation of image-sticking, an unacceptable degree of afterimage was observed.

Comparative Examples 24 to 32

IPS liquid crystal display devices of Comparative Examples 24 to 32 were produced as in Example 1 except that the liquid crystal compositions and comparative polymerizable liquid crystal compositions shown in the following tables were used. The VHRs and ID thereof were measured. The liquid crystal display devices were subjected to the evaluation of image-sticking. The following tables show results of the measurement and evaluation.

TABLE 50

|  | Comparative Example 24 | Comparative Example 25 | Comparative Example 26 |
|---|---|---|---|
| Liquid crystal composition | Liquid crystal composition 1 | Liquid crystal composition 1 | Liquid crystal composition 1 |
| Polymerizable liquid crystal composition for first retardation layer | Comparative polymerizable liquid crystal composition 4 | Comparative polymerizable liquid crystal composition 5 | Comparative polymerizable liquid crystal composition 6 |
| Polymerizable liquid crystal composition for second retardation layer | Comparative polymerizable liquid crystal composition 1 | Comparative polymerizable liquid crystal composition 1 | Comparative polymerizable liquid crystal composition 1 |
| VHR | 97.8 | 98.1 | 98.0 |
| ID | 162 | 133 | 145 |
| Image-sticking | Poor | Poor | Poor |

TABLE 51

|  | Comparative Example 27 | Comparative Example 28 | Comparative Example 29 |
|---|---|---|---|
| Liquid crystal composition | Liquid crystal composition 2 | Liquid crystal composition 2 | Liquid crystal composition 2 |
| Polymerizable liquid crystal composition for first retardation layer | Comparative polymerizable liquid crystal composition 4 | Comparative polymerizable liquid crystal composition 5 | Comparative polymerizable liquid crystal composition 6 |
| Polymerizable liquid crystal composition for second retardation layer | Comparative polymerizable liquid crystal composition 2 | Comparative polymerizable liquid crystal composition 2 | Comparative polymerizable liquid crystal composition 2 |
| VHR | 97.9 | 98.2 | 98.1 |
| ID | 155 | 127 | 138 |
| Image-sticking | Poor | Poor | Poor |

TABLE 52

|  | Comparative Example 30 | Comparative Example 31 | Comparative Example 32 |
|---|---|---|---|
| Liquid crystal composition | Liquid crystal composition 3 | Liquid crystal composition 3 | Liquid crystal composition 3 |

TABLE 52-continued

|  | Comparative Example 30 | Comparative Example 31 | Comparative Example 32 |
|---|---|---|---|
| Polymerizable liquid crystal composition for first retardation layer | Comparative polymerizable liquid crystal composition 4 | Comparative polymerizable liquid crystal composition 5 | Comparative polymerizable liquid crystal composition 6 |
| Polymerizable liquid crystal composition for second retardation layer | Comparative polymerizable liquid crystal composition 3 | Comparative polymerizable liquid crystal composition 3 | Comparative polymerizable liquid crystal composition 3 |
| VHR | 97.8 | 98.2 | 98.0 |
| ID | 158 | 124 | 140 |
| Image-sticking | Poor | Poor | Poor |

Each of the liquid crystal display devices of Comparative Examples 24 to 32 had a lower VHR and larger ID than the liquid crystal display device of the present invention. Moreover, in the evaluation of image-sticking, an unacceptable degree of afterimage was observed.

Comparative Example 33

A TN liquid crystal display device of Comparative Example 33 was produced as in Example 29 except that the liquid crystal composition and comparative polymerizable liquid crystal compositions shown in the following table were used. The VHR and ID thereof were measured. The liquid crystal display device was subjected to the evaluation of image-sticking. The following table shows results of the measurement and evaluation.

TABLE 53

|  | Comparative Example 33 |
|---|---|
| Liquid crystal composition | Liquid crystal composition 7 |
| Polymerizable liquid crystal composition for first retardation layer | Comparative polymerizable liquid crystal composition 5 |
| Polymerizable liquid crystal composition for second retardation layer | Comparative polymerizable liquid crystal composition 2 |
| VHR | 98.3 |
| ID | 126 |
| Image-sticking | Poor |

The liquid crystal display device of Comparative Example 33 had a lower VHR and larger ID than the liquid crystal display device of the present invention. Moreover, in the evaluation of image-sticking, an unacceptable degree of afterimage was observed.

Comparative Example 34

An IPS liquid crystal display device of Comparative Example 34 was produced as in Example 41 except that the liquid crystal composition and comparative polymerizable liquid crystal compositions shown in the following table were used. The VHR and ID thereof were measured. The liquid crystal display device was subjected to the evaluation of image-sticking. The following table shows results of the measurement and evaluation.

TABLE 54

|  | Comparative Example 34 |
|---|---|
| Liquid crystal composition | Liquid crystal composition 7 |
| Polymerizable liquid crystal composition for first retardation layer | Comparative polymerizable liquid crystal composition 2 |
| Polymerizable liquid crystal composition for second retardation layer | Comparative polymerizable liquid crystal composition 5 |
| VHR | 98.2 |
| ID | 128 |
| Image-sticking | Poor |

The liquid crystal display device of Comparative Example 34 had a lower VHR and larger ID than the liquid crystal display device of the present invention. Moreover, in the evaluation of image-sticking, an unacceptable degree of afterimage was observed.

Comparative Example 35

An FFS liquid crystal display device of Comparative Example 35 was produced as in Example 45 except that the liquid crystal composition and comparative polymerizable liquid crystal compositions shown in the following table were used. The VHR and ID thereof were measured. The liquid crystal display device was subjected to the evaluation of image-sticking. The following table shows results of the measurement and evaluation.

TABLE 55

|  | Comparative Example 35 |
|---|---|
| Liquid crystal composition | Liquid crystal composition 10 |
| Polymerizable liquid crystal composition for first retardation layer | Comparative polymerizable liquid crystal composition 2 |
| Polymerizable liquid crystal composition for second retardation layer | Comparative polymerizable liquid crystal composition 5 |
| VHR | 98.1 |
| ID | 136 |
| Image-sticking | Poor |

The liquid crystal display device of Comparative Example 35 had a lower VHR and larger ID than the liquid crystal display device of the present invention. Moreover, in the evaluation of image-sticking, an unacceptable degree of afterimage was observed.

Comparative Example 36

An FFS liquid crystal display device of Comparative Example 36 was produced as in Example 65 except that the liquid crystal composition and comparative polymerizable liquid crystal compositions shown in the following table were used. The VHR and ID thereof were measured. The liquid crystal display device was subjected to the evaluation of image-sticking. The following table shows results of the measurement and evaluation.

TABLE 56

|  | Comparative Example 36 |
| --- | --- |
| Liquid crystal composition | Liquid crystal composition 10 |
| Polymerizable liquid crystal composition for first retardation layer | Comparative polymerizable liquid crystal composition 5 |
| Polymerizable liquid crystal composition for second retardation layer | Comparative polymerizable liquid crystal composition 2 |
| VHR | 98.0 |
| ID | 134 |
| Image-sticking | Excellent |

The liquid crystal display device of Comparative Example 35 had a lower VHR and larger ID than the liquid crystal display device of the present invention. Moreover, in the evaluation of image-sticking, an unacceptable degree of afterimage was observed.

Comparative Example 37

An IPS liquid crystal display device of Comparative Example 36 was produced as in Example 73 except that the liquid crystal composition and comparative polymerizable liquid crystal composition shown in the following table were used. The VHR and ID thereof were measured. The liquid crystal display device was subjected to the evaluation of image-sticking. The following table shows results of the measurement and evaluation.

TABLE 57

|  | Comparative Example 36 |
| --- | --- |
| Liquid crystal composition | Liquid crystal composition 12 |
| Polymerizable liquid crystal composition for first retardation layer | Comparative polymerizable liquid crystal composition 5 |
| Second retardation layer | COP film |
| VHR | 98.2 |
| ID | 122 |
| Image-sticking | Poor |

The liquid crystal display device of Comparative Example 36 had a lower VHR and larger ID than the liquid crystal display device of the present invention. Moreover, in the evaluation of image-sticking, an unacceptable degree of afterimage was observed.

Comparative Example 38

An FFS liquid crystal display device of Comparative Example 38 was produced as in Example 97 except that the liquid crystal composition and comparative polymerizable liquid crystal compositions shown in the following table were used. The VHR and ID thereof were measured. The liquid crystal display device was subjected to the evaluation of image-sticking. The following table shows results of the measurement and evaluation.

TABLE 58

|  | Comparative Example 38 |
| --- | --- |
| Liquid crystal composition | Liquid crystal composition 10 |
| Polymerizable liquid crystal composition for first retardation layer | Comparative polymerizable liquid crystal composition 5 |
| Polymerizable liquid crystal composition for second retardation layer | Comparative polymerizable liquid crystal composition 2 |

TABLE 58-continued

|  | Comparative Example 38 |
| --- | --- |
| VHR | 98.0 |
| ID | 133 |
| Image-sticking | Poor |

The liquid crystal display device of Comparative Example 38 had a lower VHR and larger ID than the liquid crystal display device of the present invention. Moreover, in the evaluation of image-sticking, an unacceptable degree of afterimage was observed.

The invention claimed is:

1. A liquid crystal display device comprising a first substrate, a second substrate, a liquid crystal layer disposed between the first and second substrates, a retardation layer disposed between the pair of substrates, and at least a pair of electrodes, wherein the liquid crystal layer contains a liquid crystal composition containing at least one compound represented by General Formula (I)

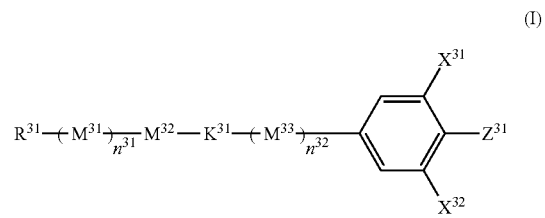

(I)

(where $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, at least one —$CH_2$— in the trans-1,4-cyclohexylene group is optionally substituted with —O— such that oxygen atoms are not directly bonded to each other, and at least one hydrogen atom in the phenylene group is optionally substituted with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $K^{31}$ represents —$CH_2O$—, —$OCH_2$—, —$CF_2O$—, or —$OCF_2$—; $n^{31}$ and $n^{32}$ each independently represent 0, 1, or 2, and $n^{31}+n^{32}$ is 0, 1, or 2; and in the case where $M^{31}$ and $M^{33}$ are multiple, corresponding ones of them may be the same as or different from each other) and at least one compound selected from the group consisting of compounds represented by General Formulae (II-a) to (II-f)

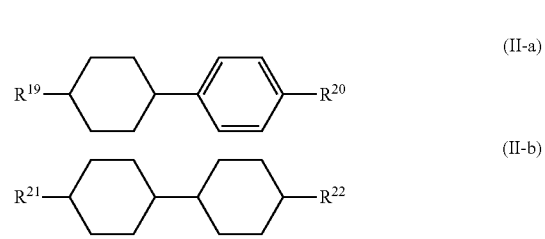

(II-a)

(II-b)

-continued

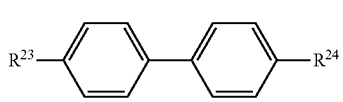
(II-c)

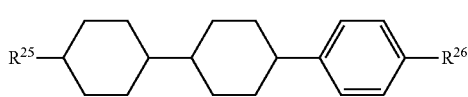
(II-d)

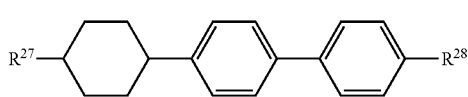
(II-e)

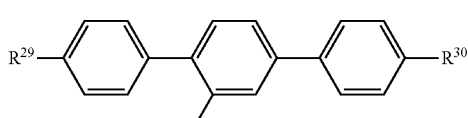
(II-f)

(where $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and the retardation layer is an optically anisotropic body formed through polymerization of a polymerizable liquid crystal composition containing 25 weight % or more of a liquid crystal compound having at least two polymerizable functional groups.

2. The liquid crystal display device according to claim 1, wherein a compound represented by General Formula (1) is used as the liquid crystal compound having at least two polymerizable functional groups $$P^1\text{-}(Sp^1)_{m1}\text{-MG-}R^1 \qquad (1)$$

(where $P^1$ represents a polymerizable functional group; $Sp^1$ represents an alkylene group having 0 to 18 carbon atoms (the alkylene group is optionally substituted with at least one halogen atom, CN, or alkyl group having 1 to 8 carbon atoms and a polymerizable functional group; and one $CH_2$ group or two or more $CH_2$ groups not adjoining each other in the alkylene group are each independently optionally substituted with —O—, —S—, —NH—, —N(CH$_3$)—, —CO—, —COO—, —OCO—, —OCOO—, —SCO—, —COS—, or —C≡C— such that oxygen atoms are not directly bonded to each other); m1 represents 0 or 1; MG represents a mesogenic group or a mesogenic supporting group; $R^1$ represents a hydrogen atom, a halogen atom, a cyano group, or an alkyl group having 1 to 18 carbon atoms; the alkyl group is optionally substituted with at least one halogen atom or CN; one $CH_2$ group or two or more $CH_2$ groups not adjoining each other in the alkyl group are each independently optionally substituted with —O—, —S—, —NH—, —N(CH$_3$)—, —CO—, —COO—, —OCO—, —OCOO—, —SCO—, —COS—, or —C≡C— such that oxygen atoms are not directly bonded to each other; alternatively, $R^1$ is represented by General Formula (1-a)

$$\text{-}(Sp^{1a})_{ma}\text{-}P^{1a} \qquad (1\text{-a})$$

(where $P^{1a}$ represents a polymerizable functional group, $Sp^{1a}$ has the same meaning as $Sp^1$, and ma represents 0 or 1); and MG is a mesogenic group or mesogenic supporting group represented by General Formula (1-b)

$$\text{—Z0-(A1-Z1)}_n\text{-(A2-Z2)}_l\text{-(A3-Z3)}_k\text{-A4-Z4-A5-Z5-} \qquad (1\text{-b})$$

(where A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoseleopheno[3,2-b]selenophene-2,7-diyl group, or a fluorene-2,7-diyl group and may have, as a substituent, at least one selected from F, Cl, CF$_3$, OCF$_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms or at least one substituent represented by General Formula (1-c)

(1-c)

(where $P^c$ represents a polymerizable functional group; A represents —O—, —COO—, —OCO—, —OCH$_2$—, —CH$_2$O—, —CH$_2$CH$_2$OCO—, —COOCH$_2$CH$_2$—, —OCOCH$_2$CH$_2$—, or a single bond; $Sp^{1c}$ has the same meaning as $Sp^1$; n1 represents 0 or 1; and mc represents 0 or 1); Z0, Z1, Z2, Z3, Z4, and Z5 each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms and optionally a halogen atom, or a single bond; and n, l, and k each independently represent 0 or 1 and satisfy the relationship of 0≤n+l+k≤3), where two or more polymerizable functional groups are present).

3. The liquid crystal display device according to claim 1, wherein the retardation layer is an optically anisotropic body formed through polymerization of a polymerizable liquid crystal composition containing a liquid crystal compound having two polymerizable functional groups.

4. The liquid crystal display device according to claim 3, wherein a compound represented by General Formula (2) is used as the liquid crystal compound having two polymerizable functional groups $$P^{2a}\text{-}(Sp^{2a})_{m2}\text{-Z0-(A1-Z1)}_n\text{-(A2-Z2)}_l\text{-(A3-Z3)}_k\text{-A4-Z4-A5-Z5-}(Sp^{2b})_{n2}\text{-}P^{2b} \qquad (2)$$

(where $P^{2a}$ and $P^{2b}$ each represent a polymerizable functional group; $Sp^{2a}$ and $Sp^{2b}$ each independently represent an alkylene group having 0 to 18 carbon atoms (the alkylene group is optionally substituted with at least one halogen atom or CN; and one $CH_2$ group or two or more $CH_2$ groups not adjoining each other in the alkylene group are each independently optionally substituted with —O—, —S—, —NH—, —N(CH$_3$)—, —CO—, —COO—, —OCO—, —OCOO—, —SCO—, —COS—, or —C≡C— such that oxygen atoms are not directly bonded to each other); m2 and n2 each independently represent 0 or 1;

n, l, and k each independently represent 0 or 1 and satisfy the relationship of 0≤n+l+k≤3;

A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group and may have, as a substituent, at least one selected from F, Cl, $CF_3$, $OCF_3$, a CN group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, and an alkenoyloxy group having 2 to 8 carbon atoms;

Z0, Z1, Z2, Z3, Z4, and Z5 each independently represent —COO—, —OCO—, —$CH_2$ $CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$OCO—, —COO$CH_2CH_2$—, —OCO$CH_2CH_2$—, —CONH—, —NHCO—, an alkyl group having 2 to 10 carbon atoms and optionally a halogen atom, or a single bond; and n2b, k2b, and l2b each independently represent 0 or 1 and satisfy the relationship of 0≤n+l+k≤3).

5. The liquid crystal display device according to claim 1, wherein the retardation layer is an optically anisotropic body formed through polymerization of a polymerizable liquid crystal composition further containing a liquid crystal compound having one polymerizable functional group.

6. The liquid crystal display device according to claim 5, wherein the amount of the liquid crystal compound having one polymerizable functional group in the polymerizable liquid crystal composition is in the range of 5 to 75 weight %.

7. The liquid crystal display device according to claim 5, wherein a compound represented by General Formula (4) is used as the liquid crystal compound having one polymerizable functional group $$P^4\text{-}(Sp^4)_{m4}\text{-}MG\text{-}R^4 \quad (4)$$

(where $P^4$ represents a polymerizable functional group; $Sp^4$ represents an alkylene group having 0 to 18 carbon atoms (the alkylene group is optionally substituted with at least one halogen atom or CN group; and one $CH_2$ group or two or more $CH_2$ groups not adjoining each other in the alkylene group are each independently optionally substituted with —O—, —S—, —NH—, —N($CH_3$)—, —CO—, —COO—, —OCO—, —OCOO—, —SCO—, —COS—, or —C≡C— such that oxygen atoms are not directly bonded to each other); m4 represents 0 or 1; MG represents a mesogenic group or a mesogenic supporting group;

$R^4$ represents a hydrogen atom, a halogen atom, a cyano group, or an alkyl group having 1 to 18 carbon atoms; the alkyl group is optionally substituted with at least one halogen atom or CN; and one $CH_2$ group or two or more $CH_2$ groups not adjoining each other in the alkyl group are each independently optionally substituted with —O—, —S—, —NH—, —N($CH_3$)—, —CO—, —COO—, —OCO—, —OCOO—, —SCO—, —COS—, or —C≡C— such that oxygen atoms are not directly bonded to each other).

8. The liquid crystal display device according to claim 1, wherein the retardation layer includes a positive A plate and/or a positive C plate.

9. The liquid crystal display device according to claim 1, further comprising a retardation layer disposed outside the pair of substrates.

10. The liquid crystal display device according to claim 9, wherein the retardation layer disposed outside the pair of substrates includes a stretched film.

11. The liquid crystal display device according to claim 1, wherein the compound represented by General Formula (I) is a compound represented by any of General Formulae (M-1) to (M-4) and (M-10) to (M-18)

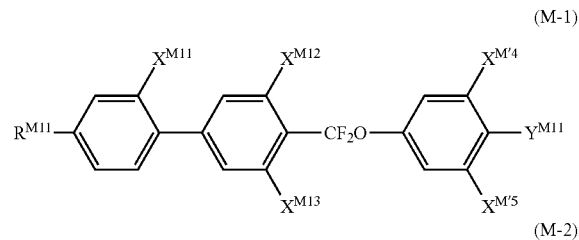

(M-1)

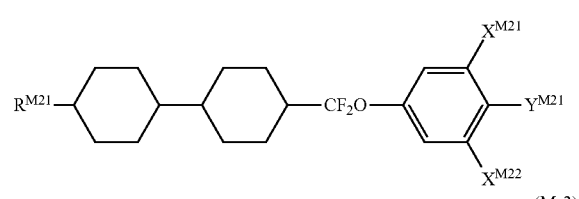

(M-2)

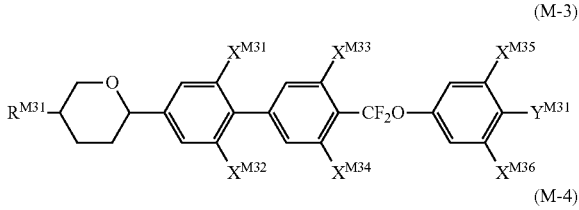

(M-3)

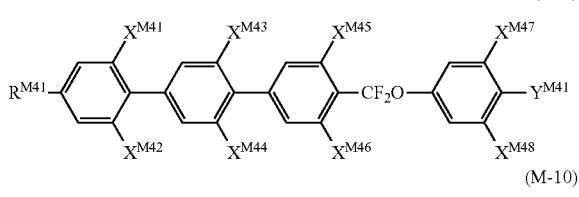

(M-4)

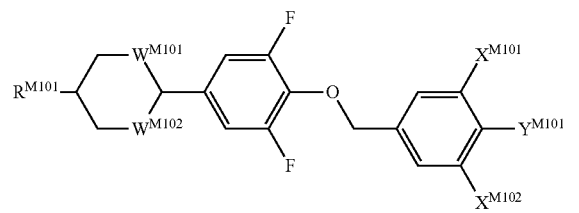

(M-10)

(M-11)
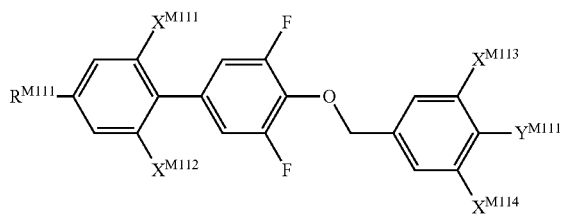

(M-12)
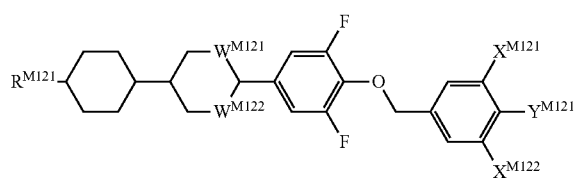

(M-13)
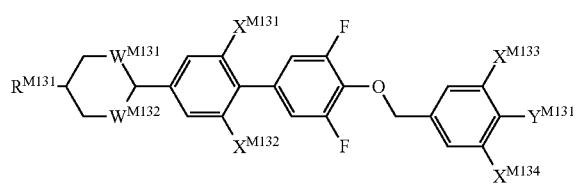

(M-14)
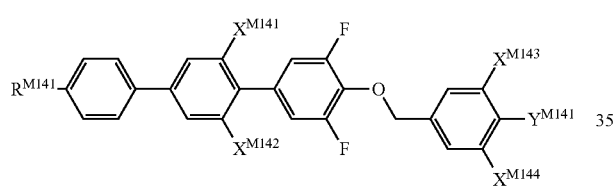

(M-15)
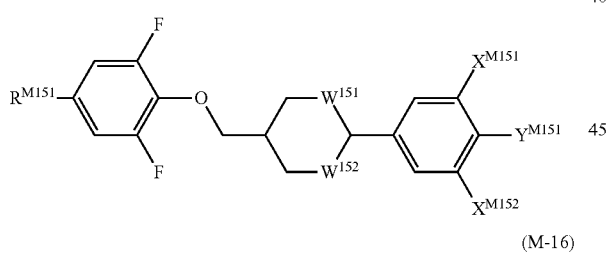

(M-16)
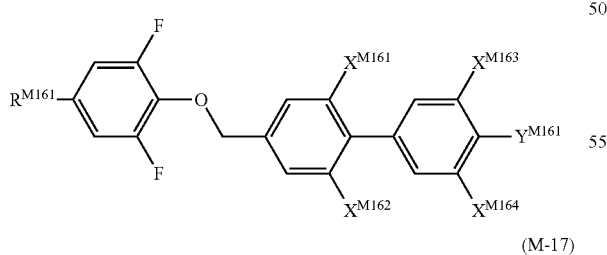

(M-17)
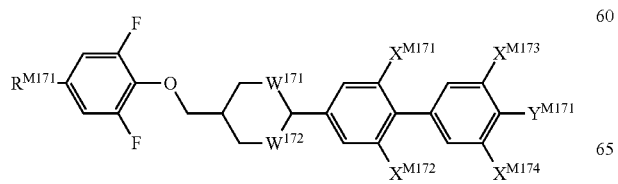

(M-18)
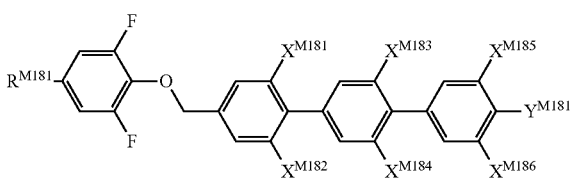

(where $R^{M11}$ to $R^{M181}$ each represent an alkyl group having 1 to 5 carbon atoms, an alkenyl group having 2 to 5 carbon atoms, or an alkoxy group having 1 to 4 carbon atoms; $X^{M11}$ to $X^{M186}$ each independently represent a hydrogen atom or a fluorine atom; $Y^{M11}$ to $Y^{M181}$ each represent a fluorine atom, a chlorine atom, or $OCF_3$; and $W^{M101}$ to $W^{M172}$ each independently represent —$CH_2$— or —O—).

12. The liquid crystal display device according to claim 1, wherein the liquid crystal composition further contains at least one compound selected from the group consisting of compounds represented by General Formulae (III-a) to (III-f)

(III-a)
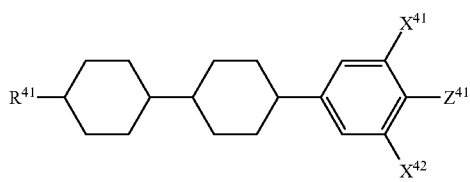

(III-b)
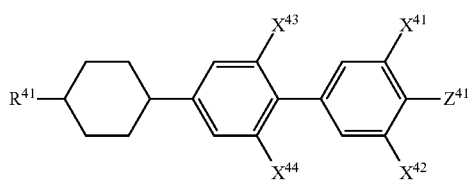

(III-c)
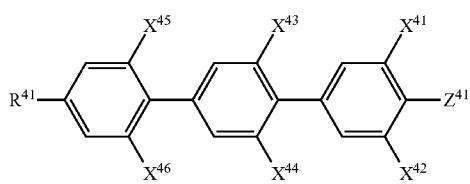

(III-d)
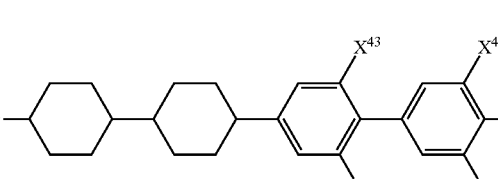

(III-e)
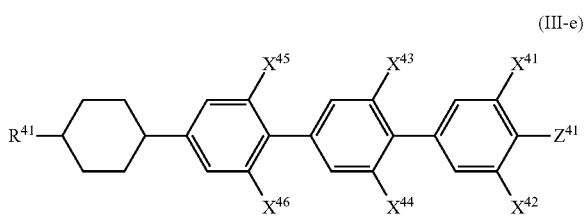

-continued (III-f)

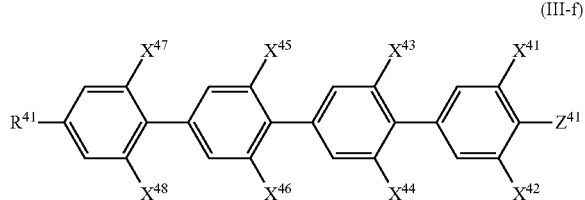

(where R⁴¹ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; X⁴¹ to X⁴⁸ each independently represent a hydrogen atom or a fluorine atom; and Z⁴¹ represents a fluorine atom, a trifluoromethoxy group, or a trifluoromethyl group).

13. The liquid crystal display device according to claim 1, wherein the liquid crystal layer contains a polymer produced through polymerization of a liquid crystal composition containing at least one polymerizable compound.

14. The liquid crystal display device according to claim 1, wherein the liquid crystal composition layer contains difunctional monomer represented by General Formula (V)

(V)

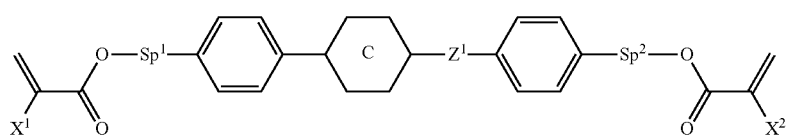

(where X¹ and X² each independently represent a hydrogen atom or a methyl group;

Sp¹ and Sp² each independently represent a single bond, an alkylene group having 1 to 8 carbon atoms, or —O—(CH₂)ₛ— (where s represents an integer from 2 to 7, and the oxygen atom is bonded to an aromatic ring); Z¹ represents —OCH₂—, —CH₂O—, —COO—, —OCO—, —CF₂O—, —OCF₂—, —CH₂CH₂—, —CF₂CF₂—, —CH═CH—COO—, —CH═CH—OCO—, —COO—CH═CH—, —OCO—CH═CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CY¹═CY²— (where Y¹ and Y² each independently represent a fluorine atom or a hydrogen atom), —C≡C—, or a single bond; and C represents a 1,4-phenylene group, a trans-1,4-cyclohexylene group, or a single bond, and in each 1,4-phenylene group in the formula, any hydrogen atom is optionally substituted with a fluorine atom).

15. A polymerizable liquid crystal composition according to claim 1.

16. The liquid crystal display device according to claim 2, wherein the retardation layer is an optically anisotropic body formed through polymerization of a polymerizable liquid crystal composition containing a liquid crystal compound having two polymerizable functional groups.

17. The liquid crystal display device according to claim 2, wherein the retardation layer is an optically anisotropic body formed through polymerization of a polymerizable liquid crystal composition further containing a liquid crystal compound having one polymerizable functional group.

18. The liquid crystal display device according to claim 2, wherein the compound represented by General Formula (I) is a compound represented by any of General Formulae (M-1) to (M-4) and (M-10) to (M-18)

(M-1)

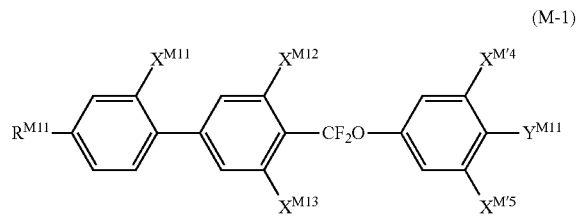

(M-2)

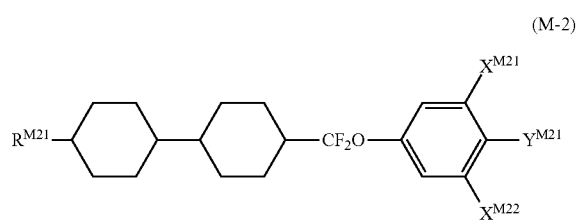

-continued (M-3)

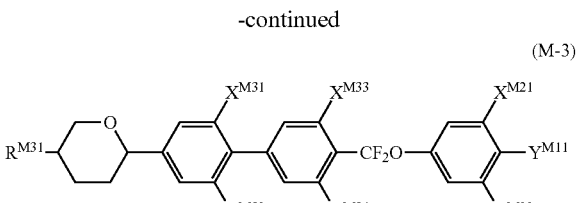

(M-4)

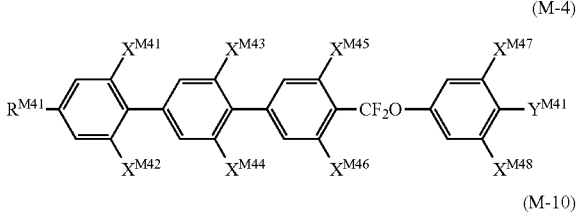

(M-10)

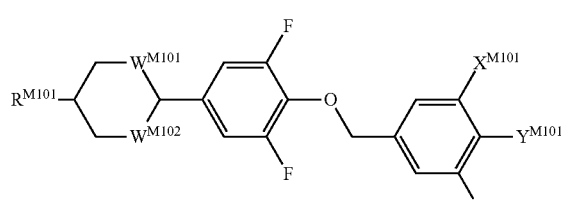

(M-11)

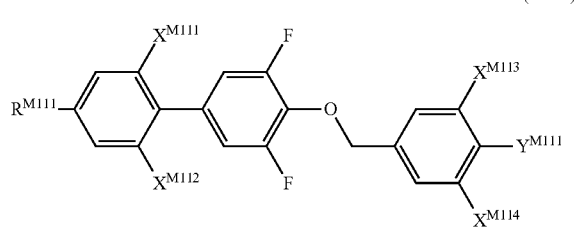

153
-continued (M-12)
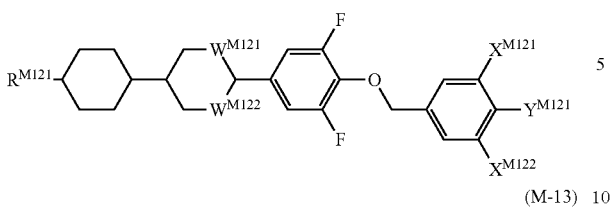

(M-13)
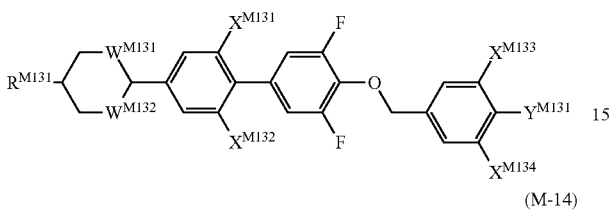

(M-14)
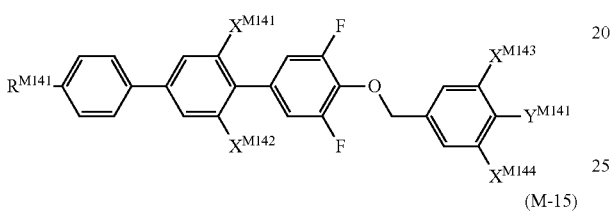

(M-15)
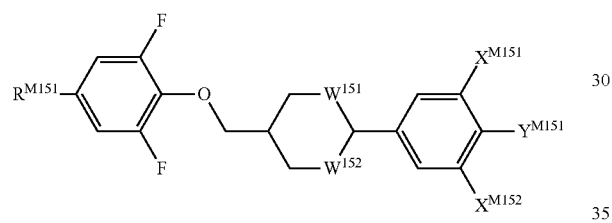

(M-16)
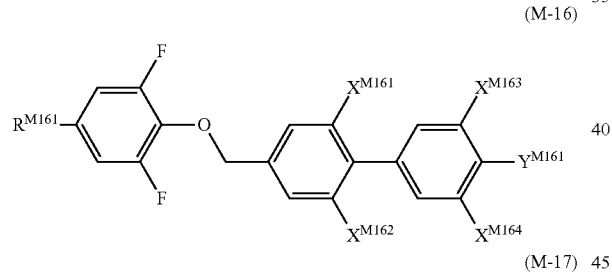

(M-17)
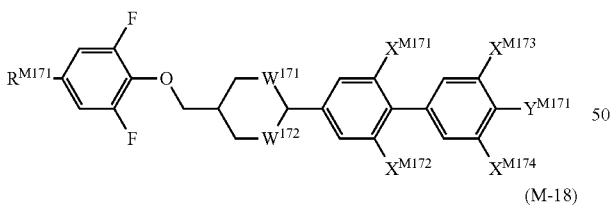

(M-18)
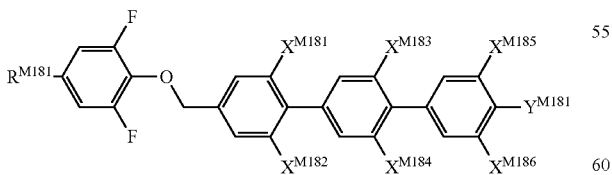

(where $R^{M11}$ to $R^{M181}$ each represent an alkyl group having 1 to 5 carbon atoms, an alkenyl group having 2 to 5 carbon atoms, or an alkoxy group having 1 to 4 carbon atoms; $X^{M11}$ to $X^{M186}$ each independently represent a hydrogen atom or a fluorine atom; $Y^{M11}$ to $Y^{M181}$ each represent a fluorine atom, a chlorine atom,

154 or $OCF_3$; and $W^{M101}$ to $W^{M172}$ each independently represent —$CH_2$— or —O—).

19. The liquid crystal display device according to claim 2, wherein the liquid crystal composition further contains at least one compound selected from the group consisting of compounds represented by General Formulae (III-a) to (III-f)

(III-a)

(III-b)
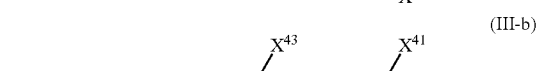

(III-c)
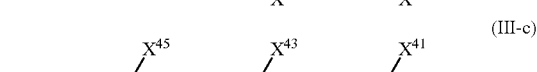

(III-d)
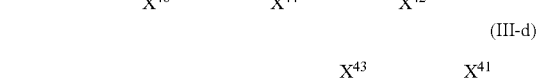

(III-e)
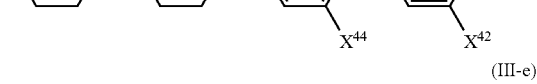

(III-f)
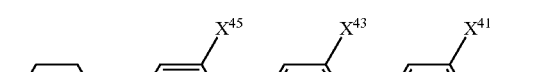

(where $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group).

20. The liquid crystal display device according to claim 2, wherein the liquid crystal composition layer contains difunctional monomer represented by General Formula (V)

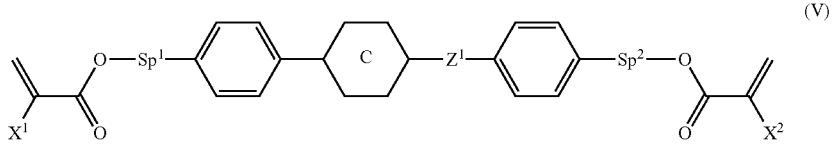

(V)

(where $X^1$ and $X^2$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer from 2 to 7, and the oxygen atom is bonded to an aromatic ring); $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond, and in each 1,4-phenylene group in the formula, any hydrogen atom is optionally substituted with a fluorine atom).

\* \* \* \* \*